United States Patent
Shimizu

(10) Patent No.: US 8,996,008 B2
(45) Date of Patent: Mar. 31, 2015

(54) WIRELESS COMMUNICATION NETWORK SYSTEM, WIRELESS COMMUNICATION APPARATUS, MOBILE TERMINAL, CONNECTION-TARGET SWITCH DETERMINING METHOD, AND CONNECTION-TARGET CHANGE DETERMINING METHOD

(75) Inventor: Masatsugu Shimizu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 13/594,294

(22) Filed: Aug. 24, 2012

(65) Prior Publication Data
US 2012/0322449 A1 Dec. 20, 2012

Related U.S. Application Data

(63) Continuation of application No. PCT/JP2010/053134, filed on Feb. 26, 2010.

(51) Int. Cl.
*H04W 36/00* (2009.01)
*H04W 36/24* (2009.01)
(Continued)

(52) U.S. Cl.
CPC .............. *H04W 36/24* (2013.01); *H04W 36/32* (2013.01); *H04W 36/08* (2013.01); *H04W 36/18* (2013.01); *H04W 36/0055* (2013.01)
USPC ........... 455/436; 455/437; 455/438; 455/439; 455/440; 455/441; 455/442; 455/443; 455/444; 370/331

(58) Field of Classification Search
CPC ..... H04W 36/18; H04W 36/32; H04W 36/08; H04W 36/00; H04W 84/005; H04W 36/04; H04W 36/0016; H04W 36/14; H04W 36/24; H04W 48/04; H04W 16/24; H04W 36/34

USPC .......................... 370/331; 455/436–444, 11.1
See application file for complete search history.

(56) References Cited

U.S. PATENT DOCUMENTS 5,278,891 A * 1/1994 Bhagat et al. .................. 455/431
6,345,186 B1 * 2/2002 Schultz et al. ................ 455/441
(Continued)

FOREIGN PATENT DOCUMENTS

| | | |
|---|---|---|
| JP | 2002-369241 | 12/2002 |
| JP | 2004-032155 | 1/2004 |
| JP | 2004-304351 | 10/2004 |
| JP | 2008-148241 | 6/2008 |
| JP | 2009-200634 | 9/2009 |

OTHER PUBLICATIONS

International Search Report issued for corresponding International Patent Application No. PCT/JP2010/053134 mailed Jun. 1, 2010.
(Continued)

*Primary Examiner* — Olumide T Ajibade Akonai
(74) *Attorney, Agent, or Firm* — Myers Wolin, LLC

(57) ABSTRACT

A wireless communication network system includes: a mobile terminal that transmits a switching request for requesting to switch a connection target from a currently connected first wireless communication apparatus to a second wireless communication apparatus mounted on a mobile body; and a wireless communication apparatus that determines permission or prohibition that the mobile terminal switches the connection target from its own apparatus to the second wireless communication apparatus, based on permission/prohibition setting of the connection target switching from the first wireless communication apparatus to the second wireless communication apparatus in accordance with a type of the first wireless communication apparatus.

8 Claims, 37 Drawing Sheets

(51) Int. Cl.
*H04W 36/18* (2009.01)
*H04W 36/32* (2009.01)
*H04W 36/08* (2009.01)

(56) References Cited

U.S. PATENT DOCUMENTS

| | | | |
|---|---|---|---|
| 7,343,160 B2 * | 3/2008 | Morton | 455/444 |
| 8,750,874 B2 * | 6/2014 | Chou et al. | 455/436 |
| 2003/0235165 A1 | 12/2003 | Wang | |
| 2008/0146237 A1 | 6/2008 | Shikama et al. | |
| 2010/0248619 A1 * | 9/2010 | Senarath et al. | 455/11.1 |

OTHER PUBLICATIONS

Notice of Reason for Rejection issued for corresponding Japanese Patent Application No. 2012-501602, mailed Jul. 23, 2013, with an English translation.

International preliminary report on patentability, with English translation, issued for corresponding International Patent Application No. PCT/JP2010/053134, mailed Sep. 27, 2012.

* cited by examiner

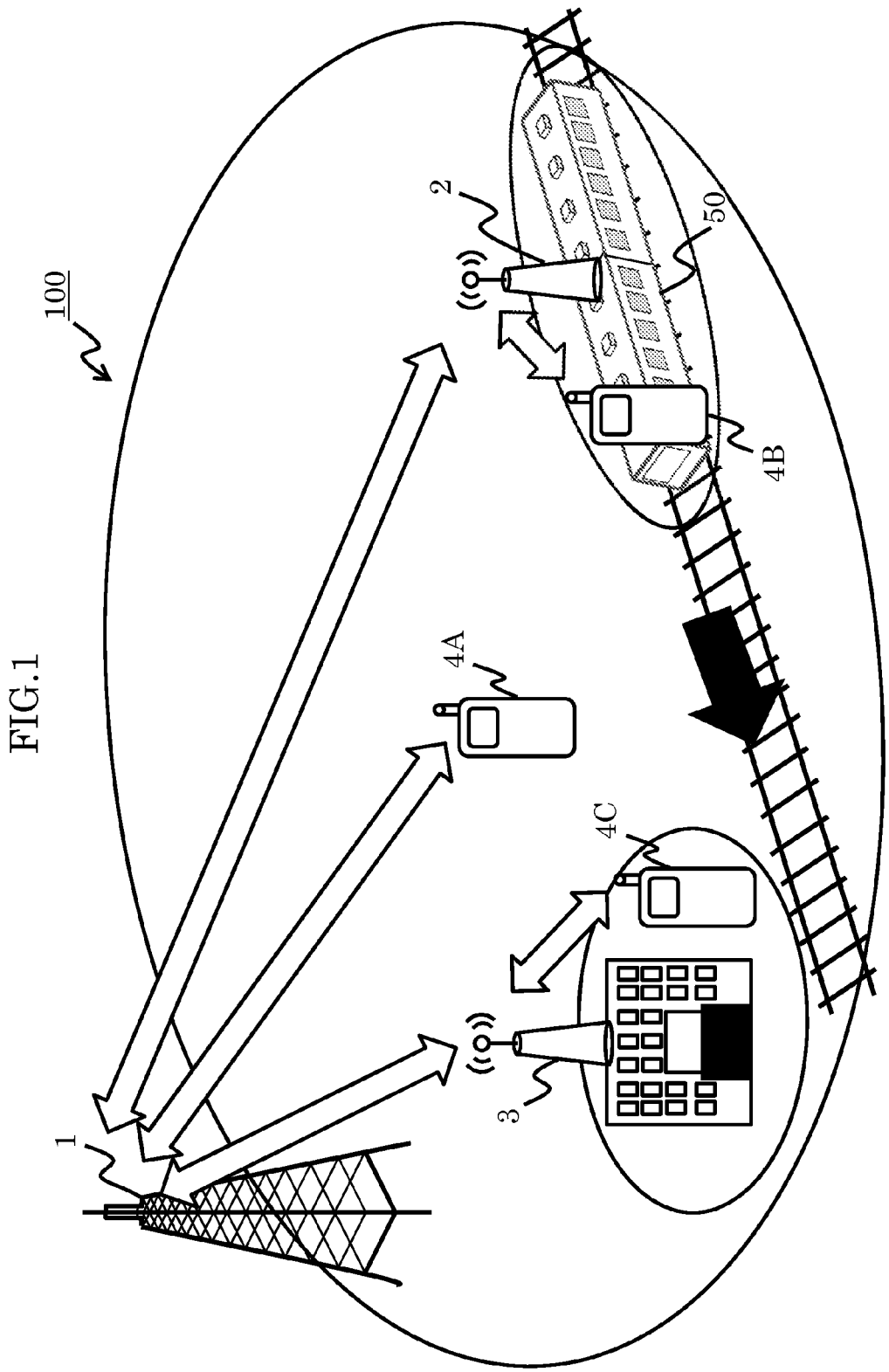

FIG.2

| | SELECTED STATION OF MOBILE TERMINAL | | | PERMISSION OR PROHIBITION OF HANDOVER AND RESELECTION |
|---|---|---|---|---|
| (a) | BASE STATION, FIXED RELAY STATION | → | BASE STATION, FIXED RELAY STATION | PERMITTED |
| (b) | BASE STATION, FIXED RELAY STATION OF TYPE 1 | → | MOBILE RELAY STATION | PERMITTED |
| (c) | BASE STATION, FIXED RELAY STATION OF TYPE 2 | → | MOBILE RELAY STATION | PERMITTED IN THE CASE WHERE HISTORY OF CONNECTION TO MOBILE RELAY STATION AS TRANSFER TARGET CANDIDATE IS HELD |
| (d) | MOBILE RELAY STATION | → | BASE STATION, FIXED RELAY STATION | PERMITTED |
| (e) | MOBILE RELAY STATION | → | MOBILE RELAY STATION | NOT PERMITTED |

TYPE 1: BASE STATION OR FIXED RELAY STATION INSTALLED NEAR BOARDING/EXITING FACILITY FOR MOBILE BODY
TYPE 2: BASE STATION OR FIXED RELAY STATION OTHER THAN TYPE 1

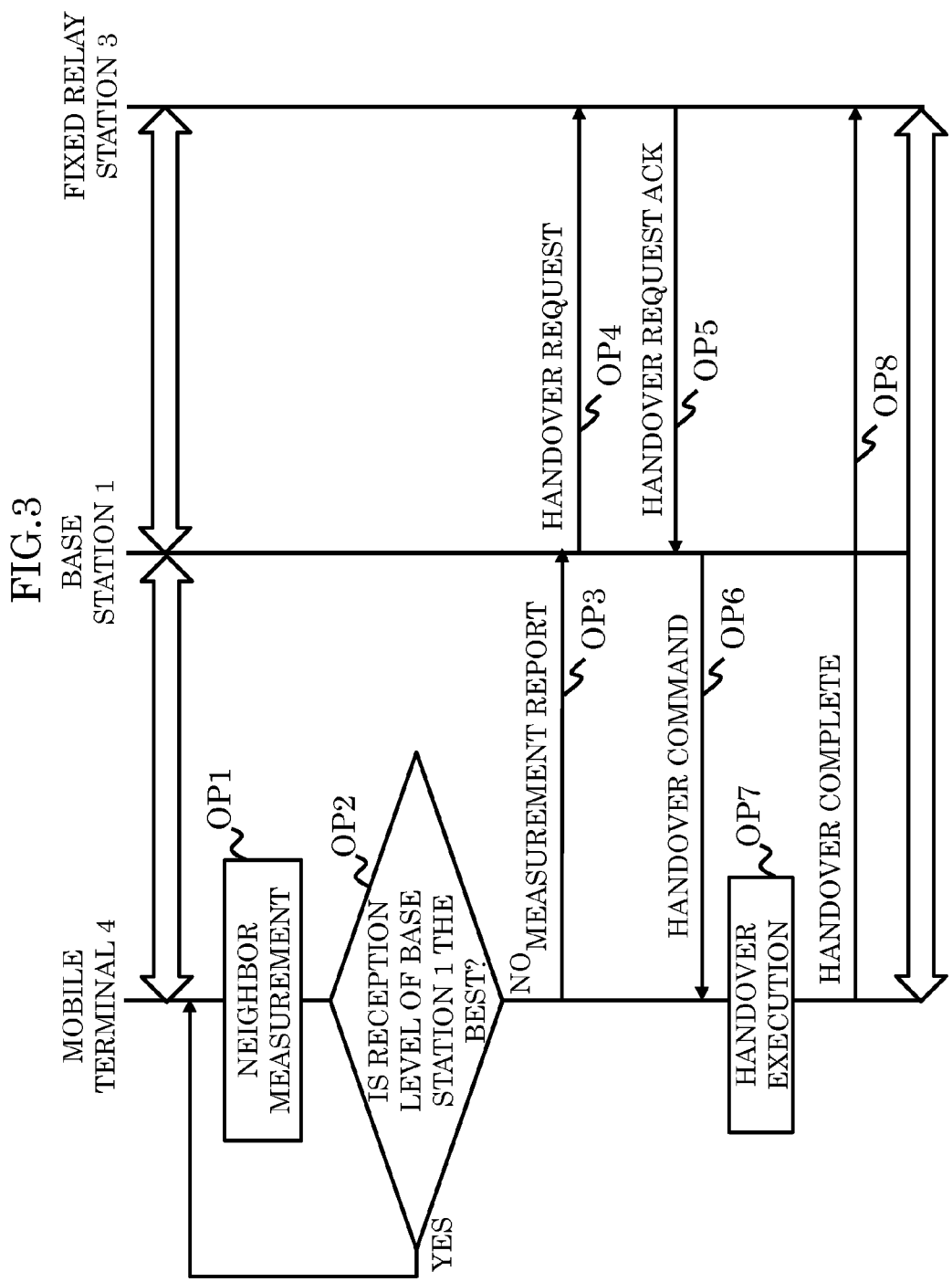

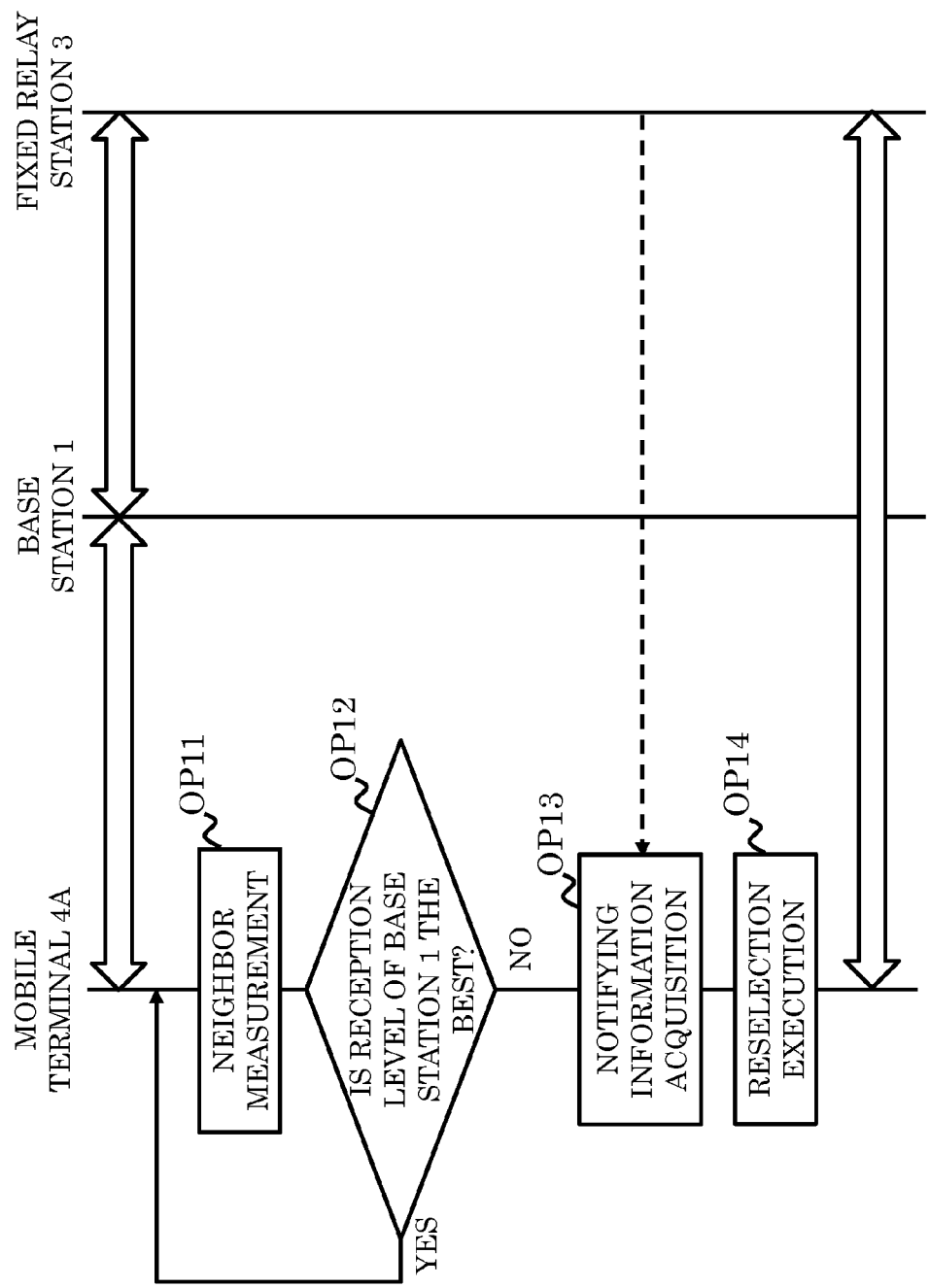

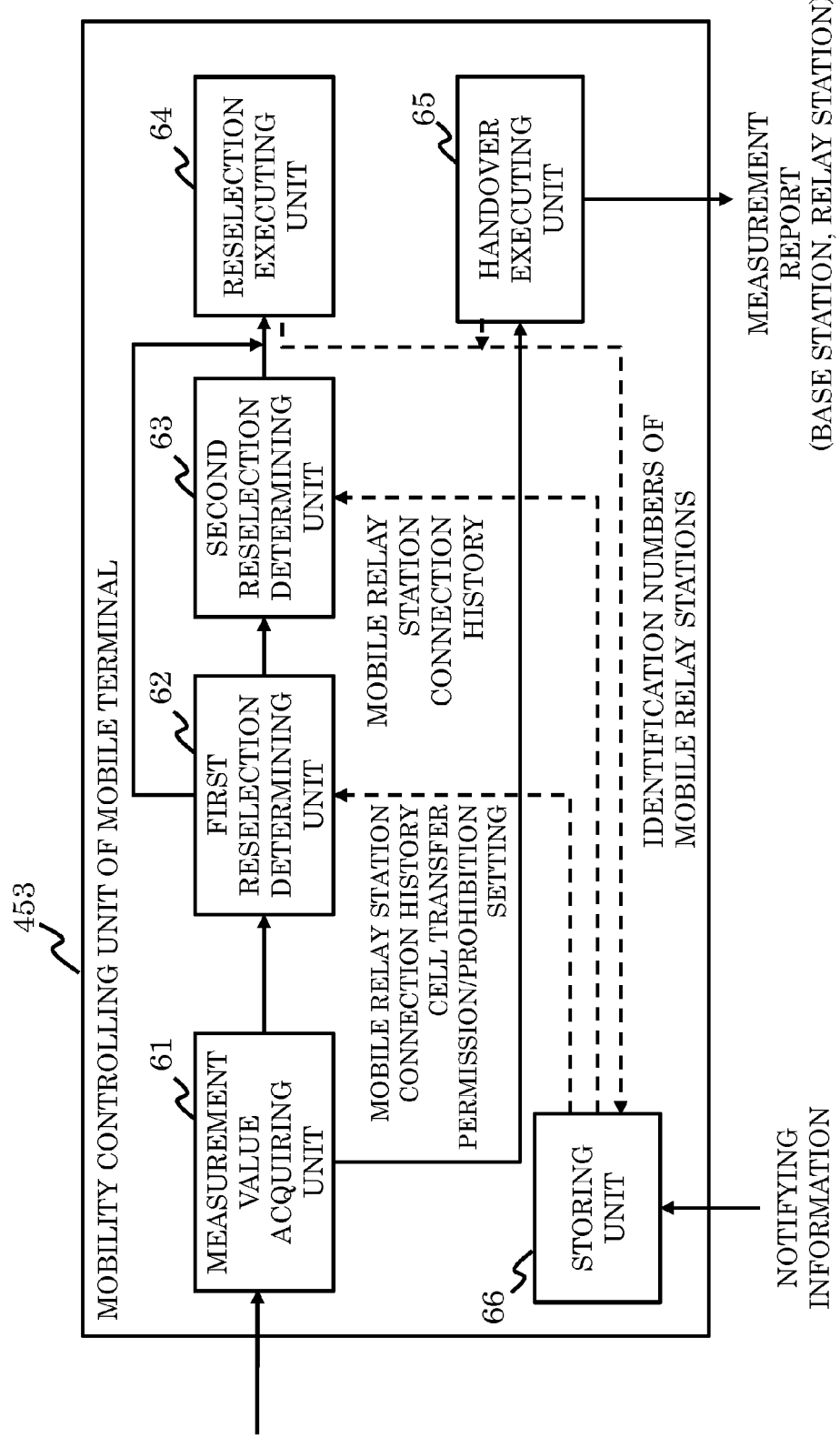

FIG.7

| | SELECTED STATION | CONNECTION HISTORY HOLDING INFORMATION |
|---|---|---|
| | INITIAL STATE: HISTORY OF CONNECTION TO MOBILE RELAY STATION DOES NOT EXIST (INVALID) | |
| (1) | FIXED RELAY STATION 3 | INVALID |
| | → | |
| (2) | MOBILE RELAY STATION 2 | IDENTIFICATION NUMBER OF MOBILE RELAY STATION 2 |
| | → | |
| (3) | BASE STATION 1 | IDENTIFICATION NUMBER OF MOBILE RELAY STATION 2 (NOT CHANGED) |
| | → | |
| (4) | MOBILE RELAY STATION 2 | IDENTIFICATION NUMBER OF MOBILE RELAY STATION 2 (OVERWRITTEN AND UPDATED) |
| | → | |
| (5) | FIXED RELAY STATION 3b | IDENTIFICATION NUMBER OF MOBILE RELAY STATION 2 (NOT CHANGED) |
| | → | (USER GETS OFF TRAIN 50, AND MOBILE RELAY STATION 2 IS NOT DETECTED ANY MORE DUE TO MOVEMENT OF USER) |
| | STATE: IDENTIFICATION NUMBER OF MOBILE RELAY STATION 2 IS DELETED, AND CONNECTION HISTORY DOES NOT EXIST (INVALID) | |

FIG.8

| TYPE OF STATION | CELL TRANSFER PERMISSION/PROHIBITION SETTING |
|---|---|
| BASE STATION AND FIXED RELAY STATION OF TYPE 1 | PERMITTED |
| BASE STATION AND FIXED RELAY STATION OF TYPE 2 | NOT PERMITTED |
| MOBILE RELAY STATION | NOT PERMITTED |

TYPE 1: BASE STATION OR FIXED RELAY STATION INSTALLED NEAR BOARDING/EXITING FACILITY FOR MOBILE BODY
TYPE 2: BASE STATION OR FIXED RELAY STATION OTHER THAN TYPE 1

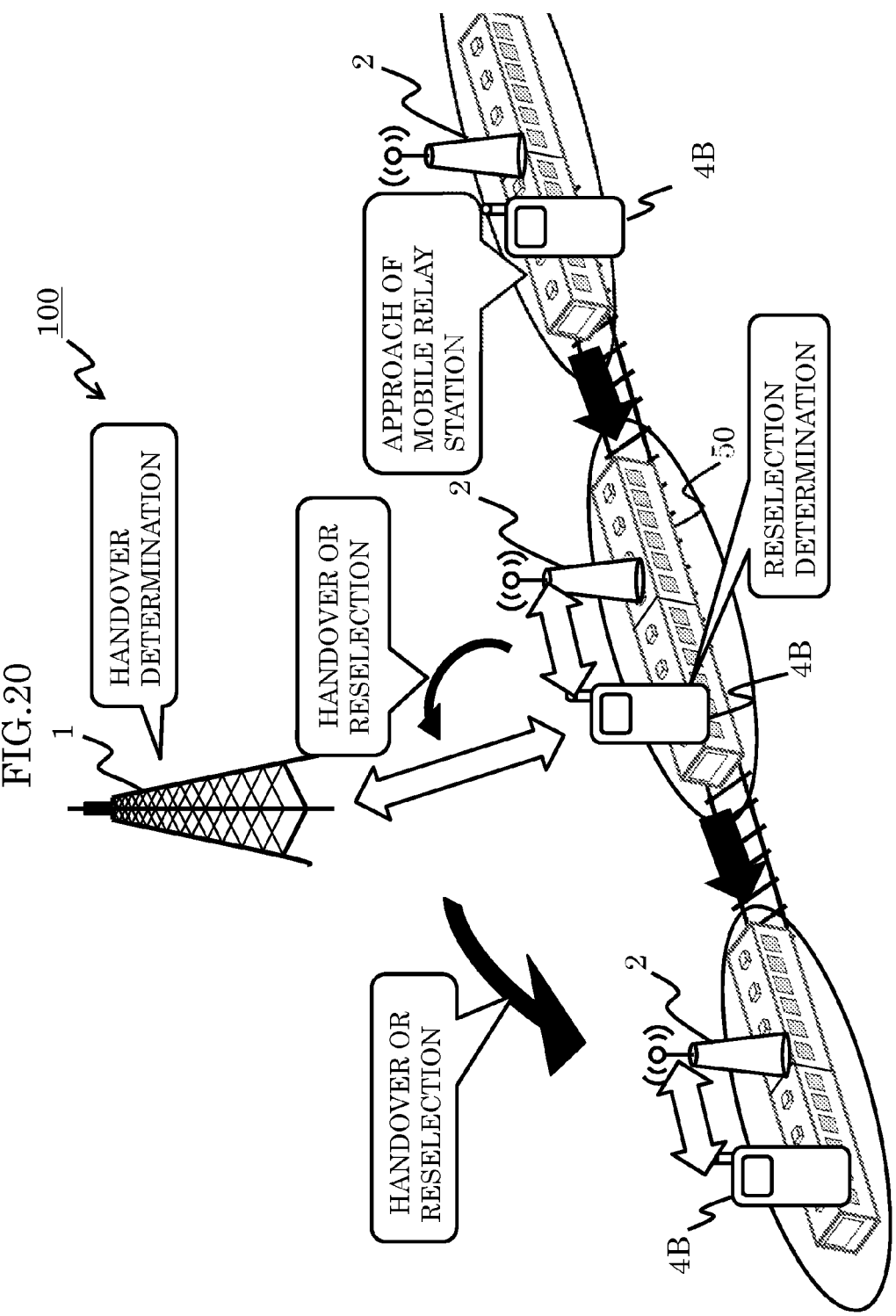

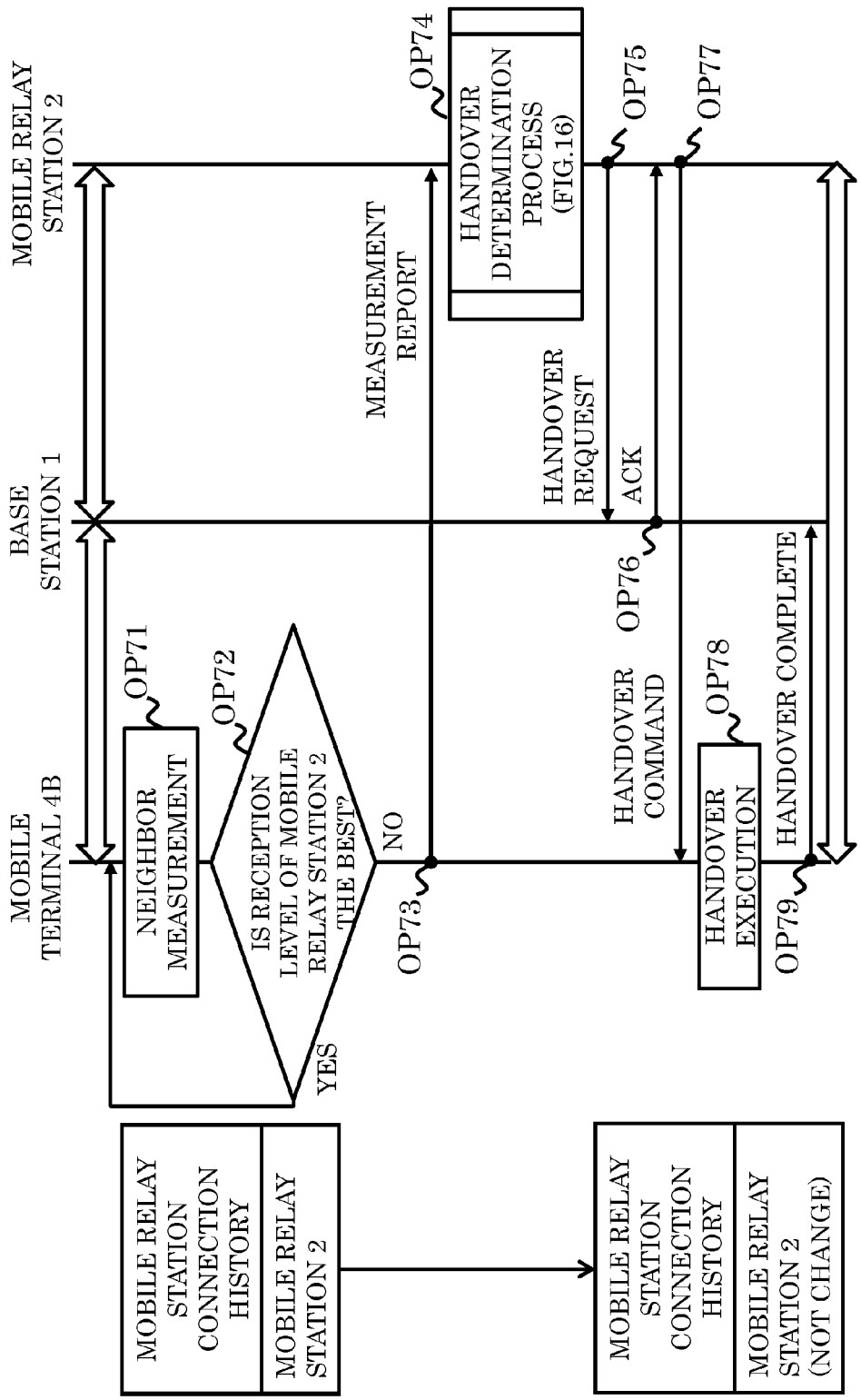

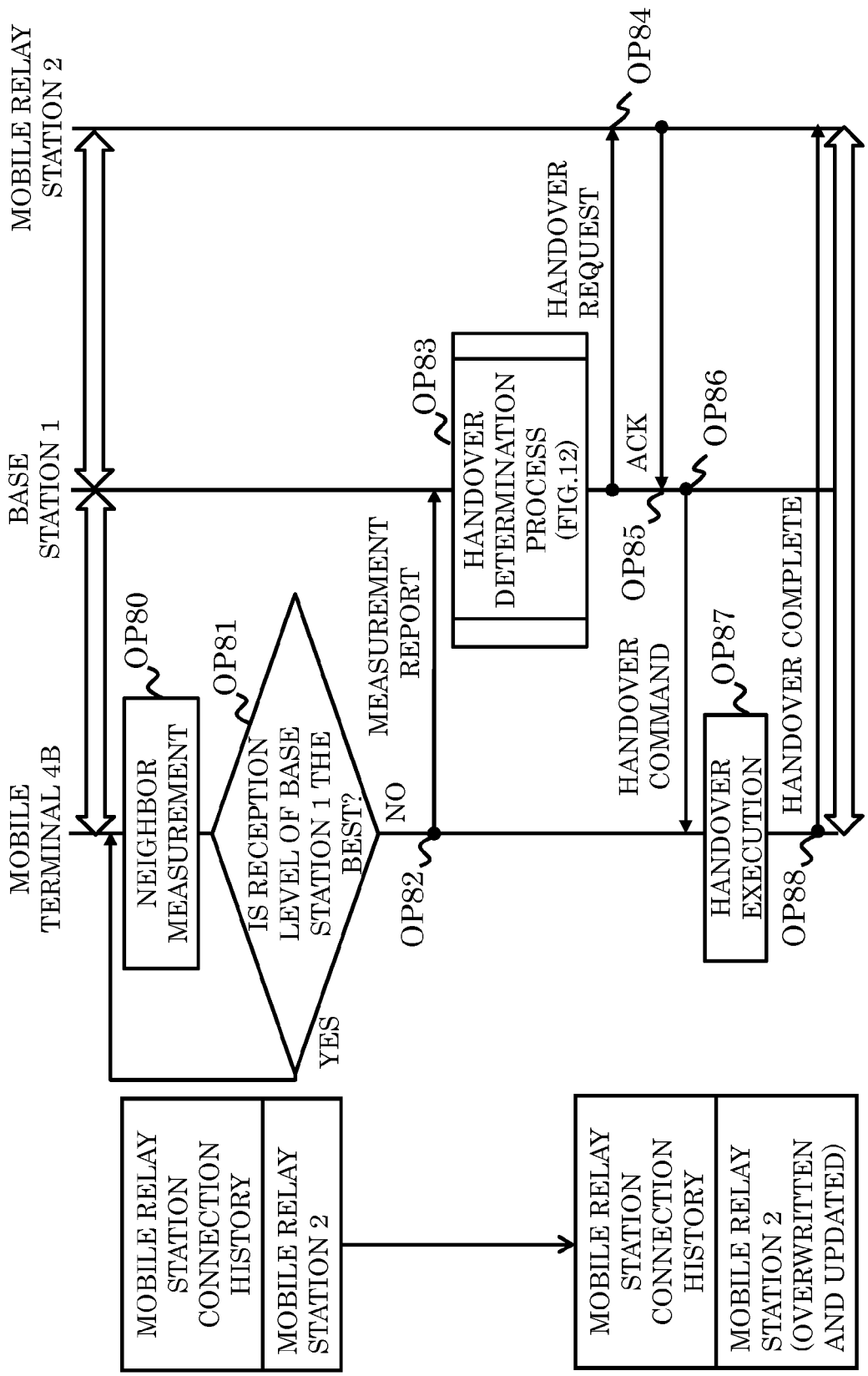

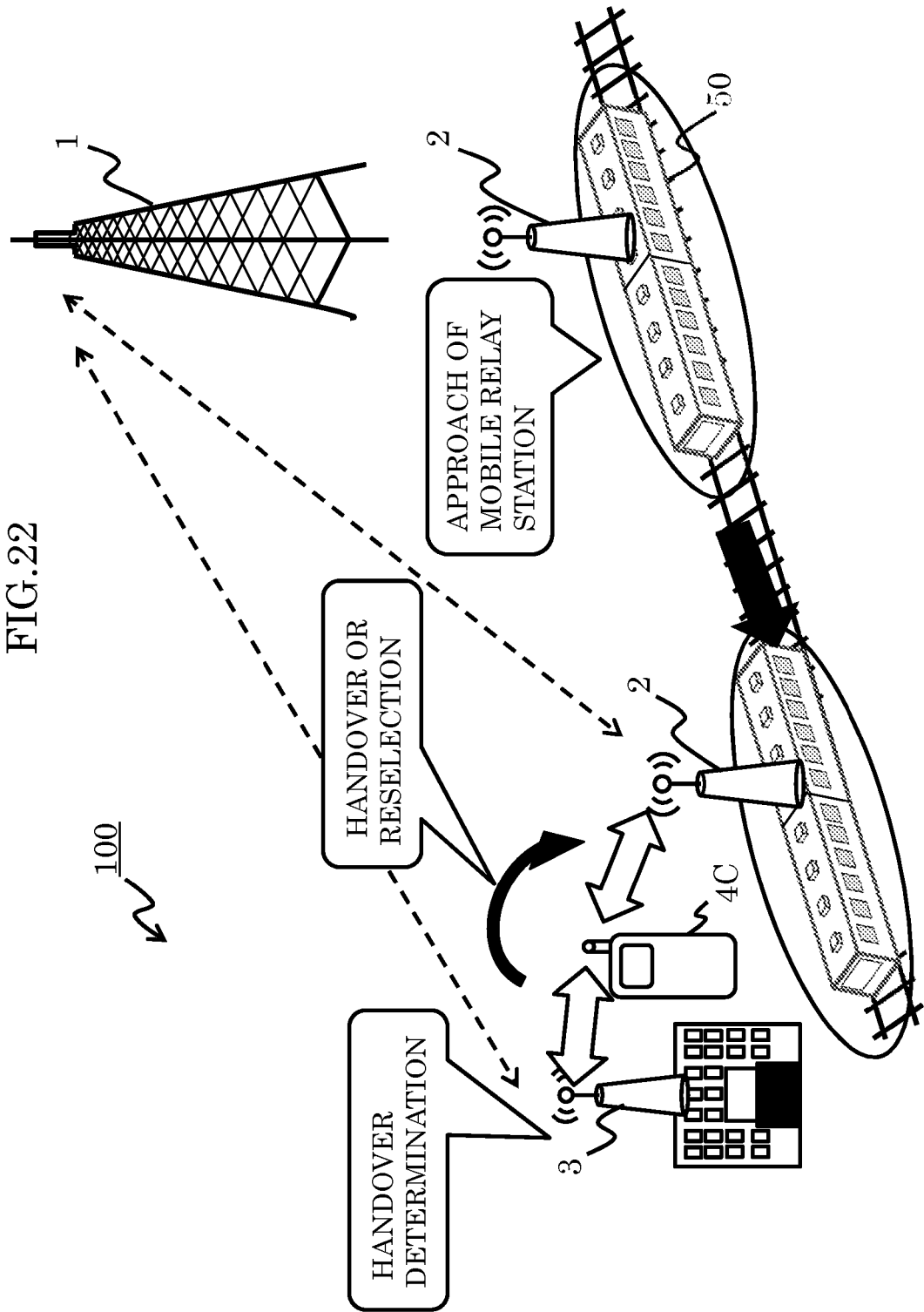

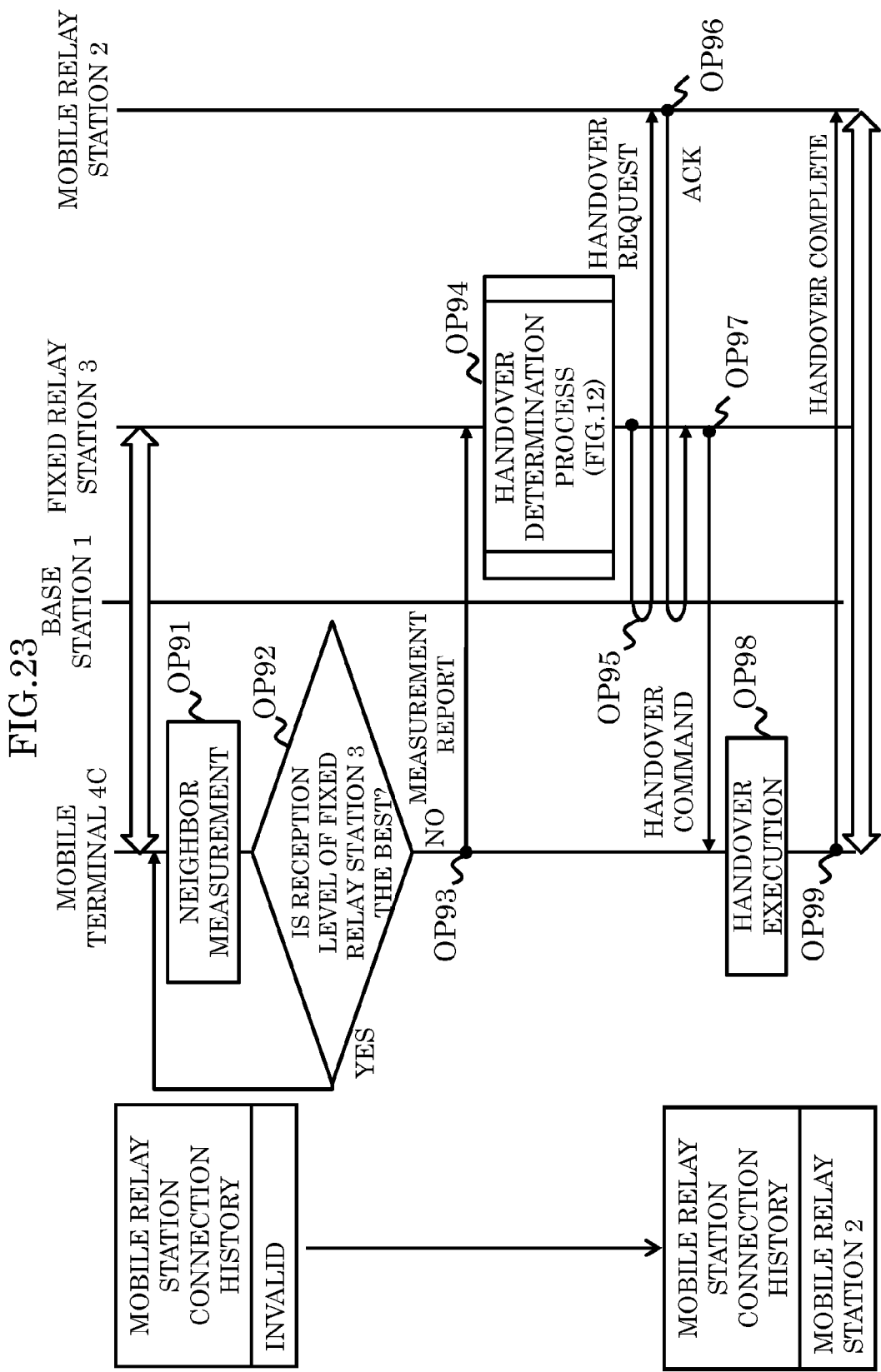

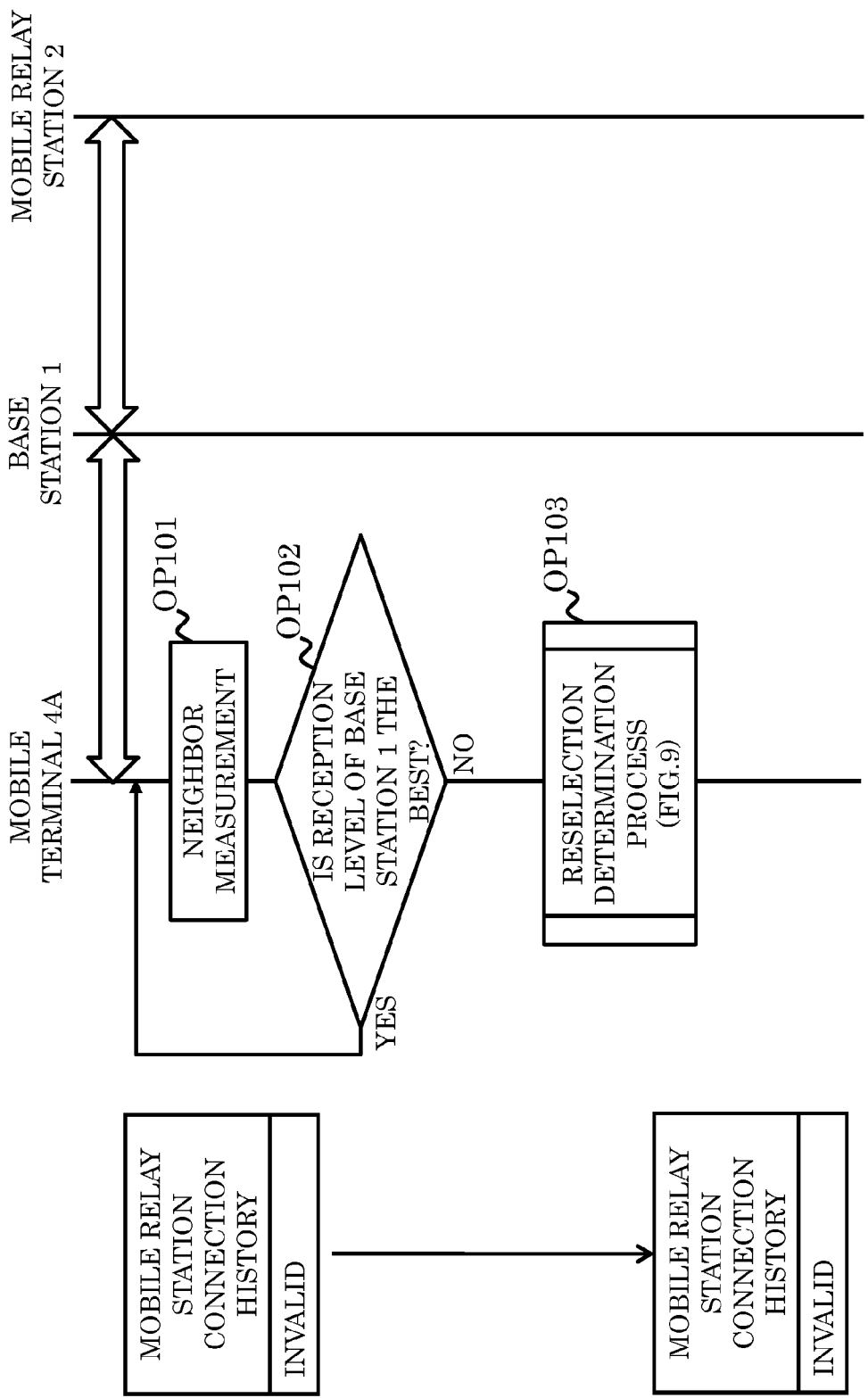

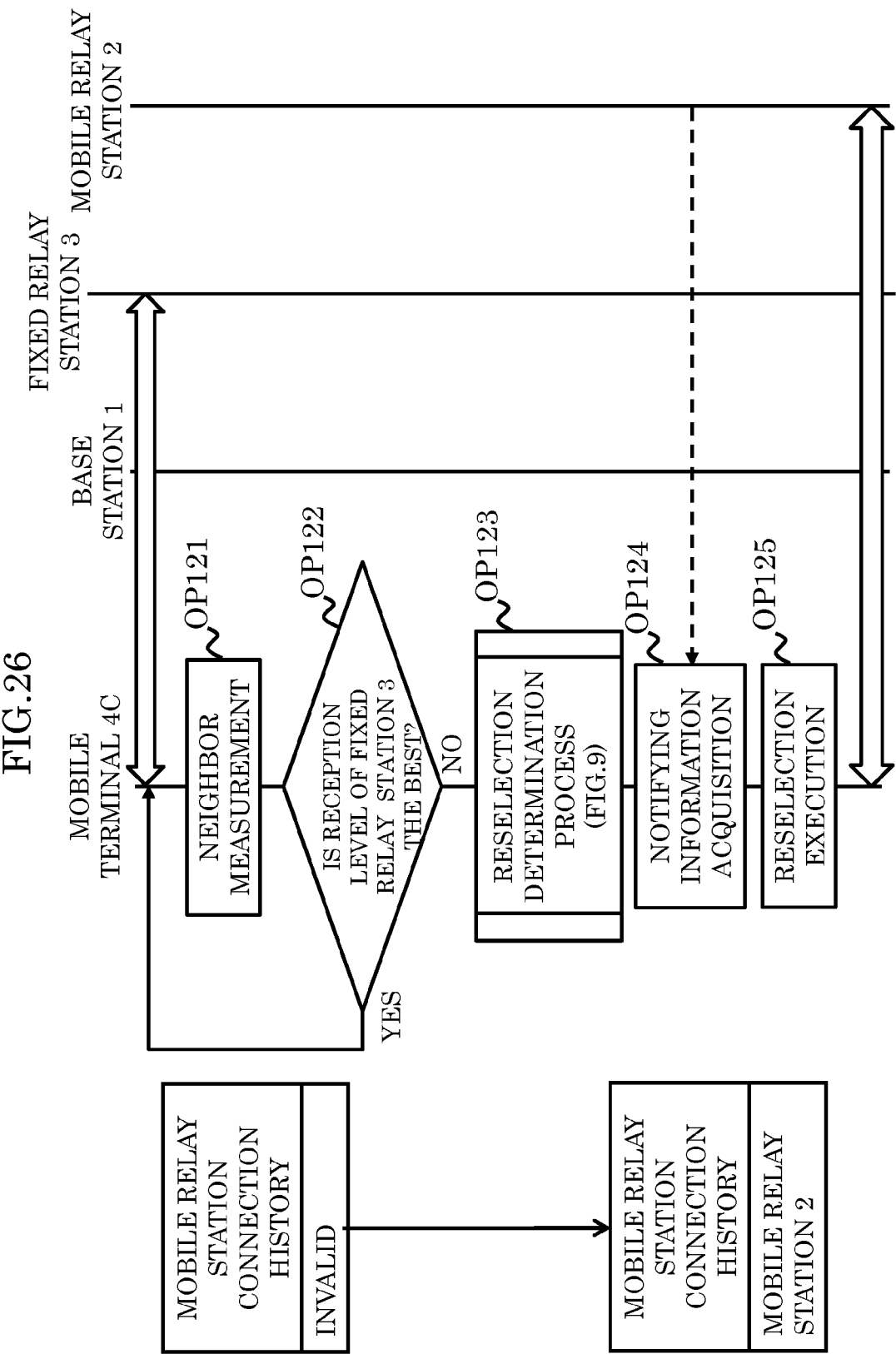

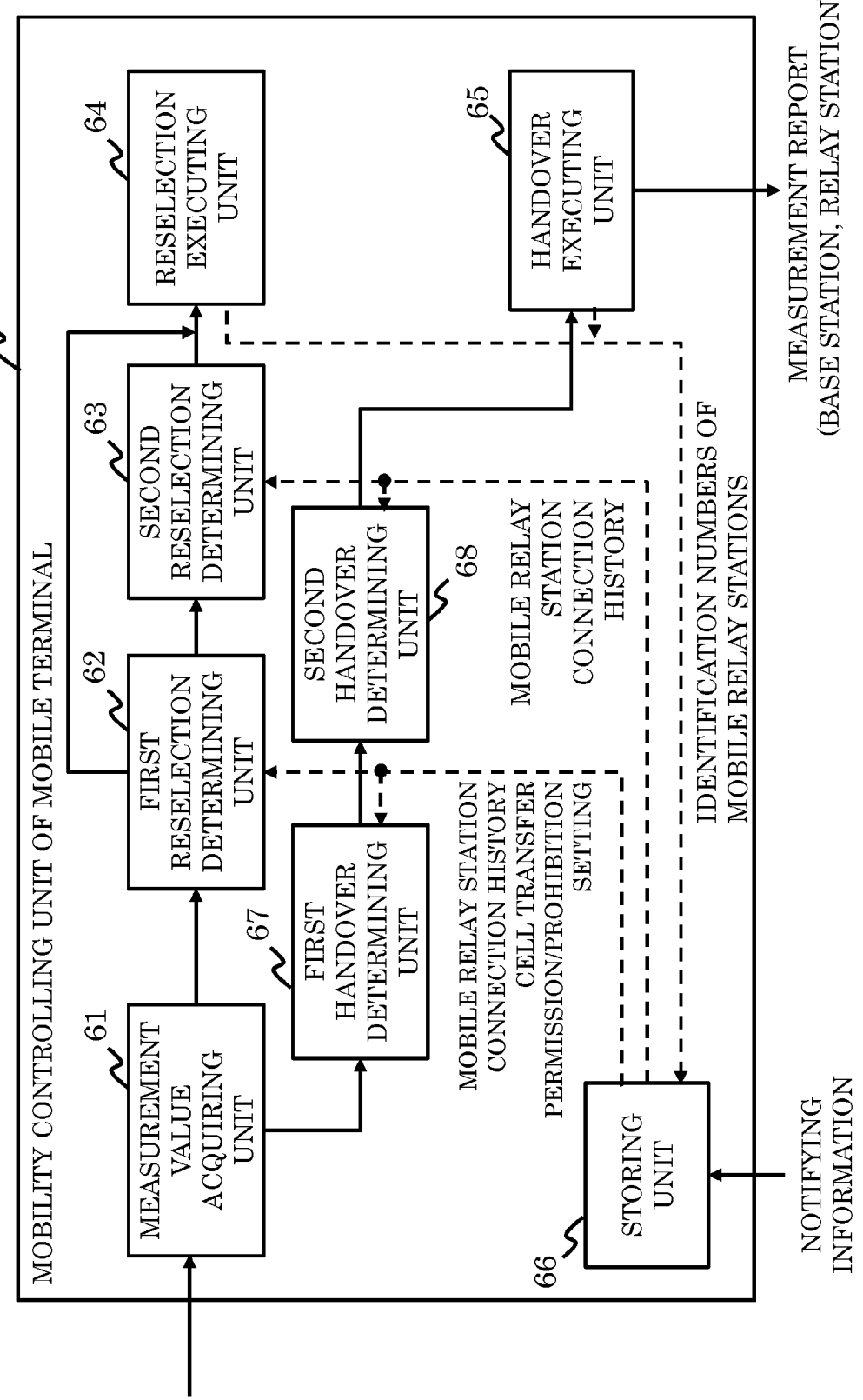

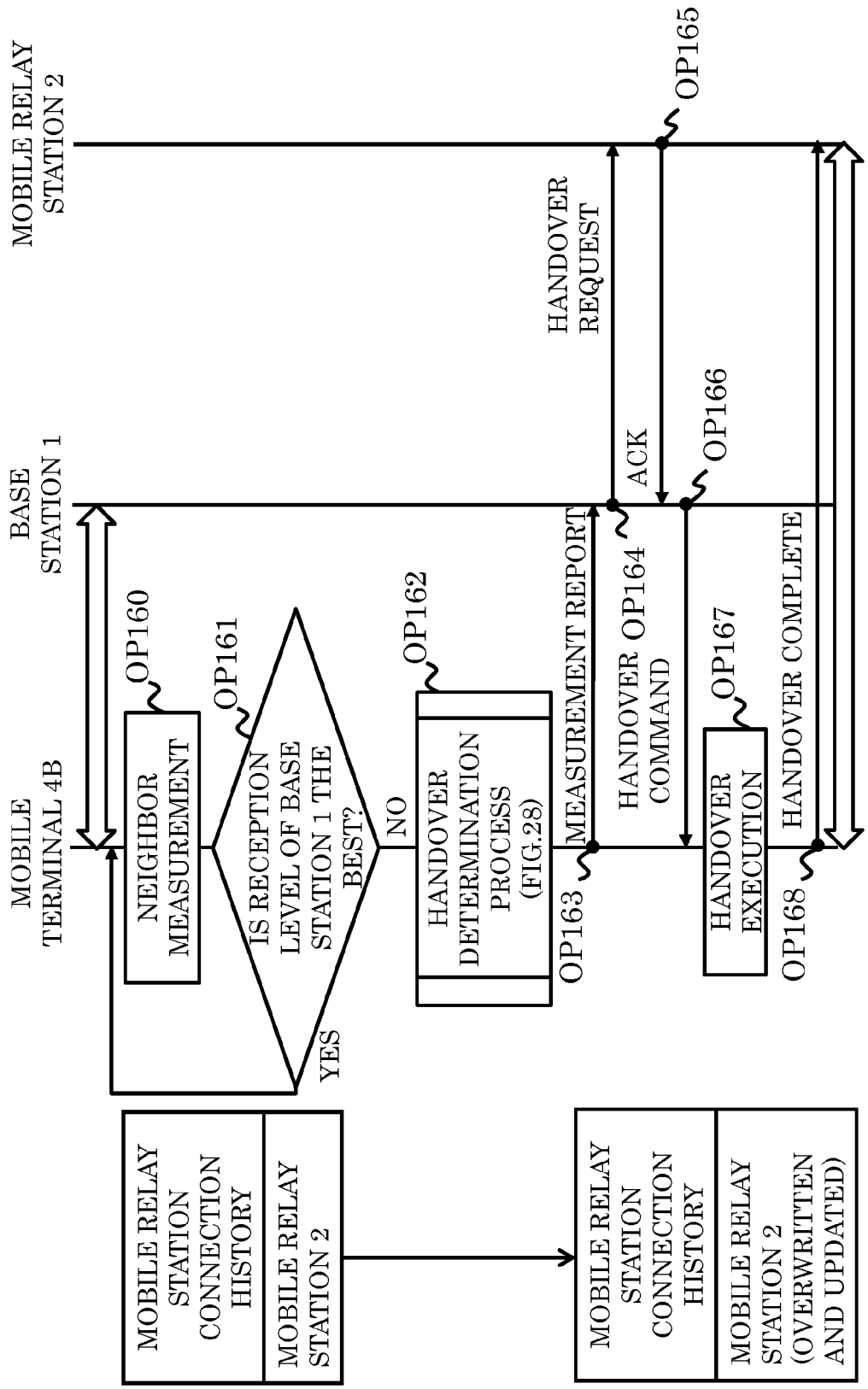

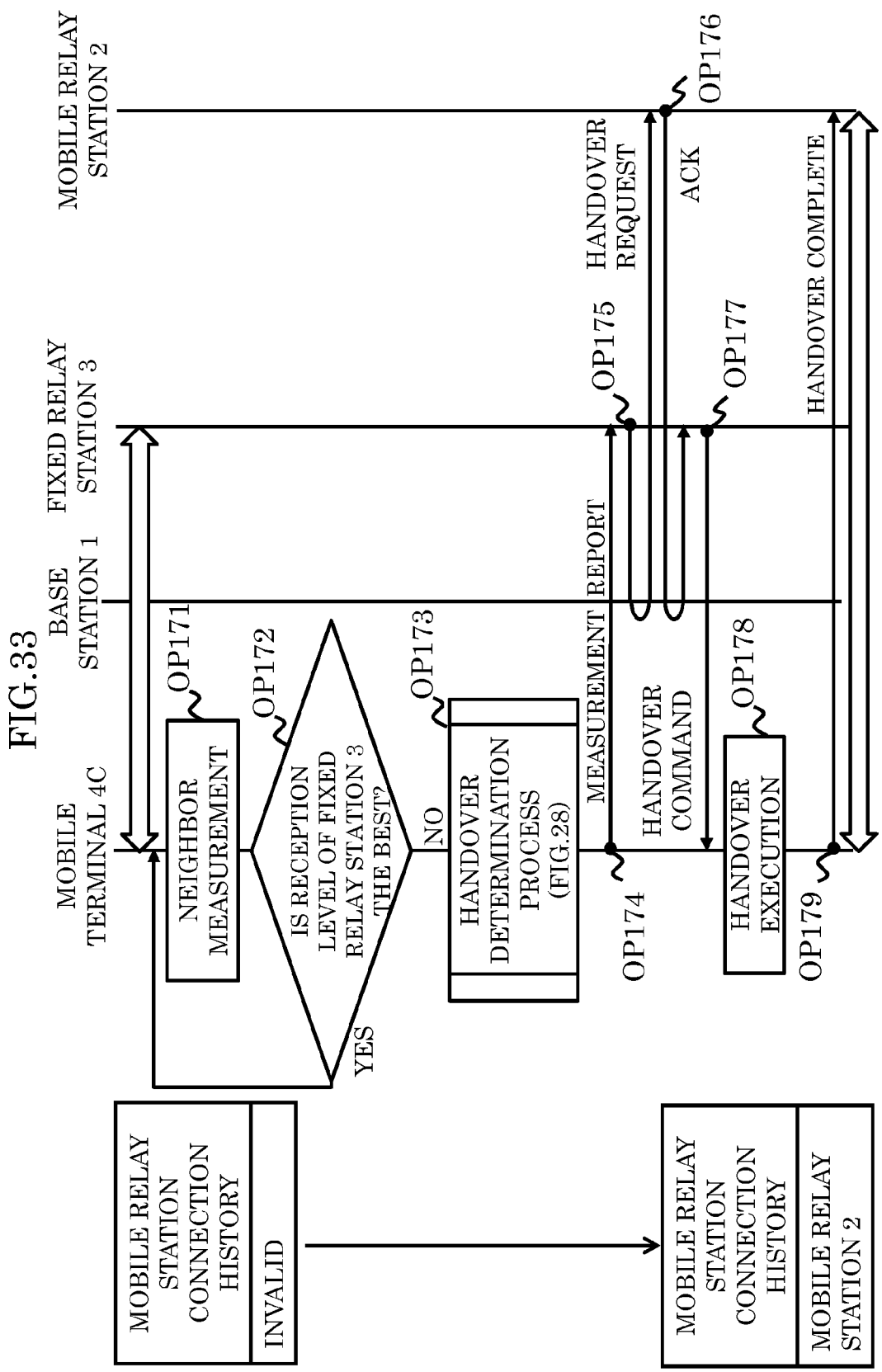

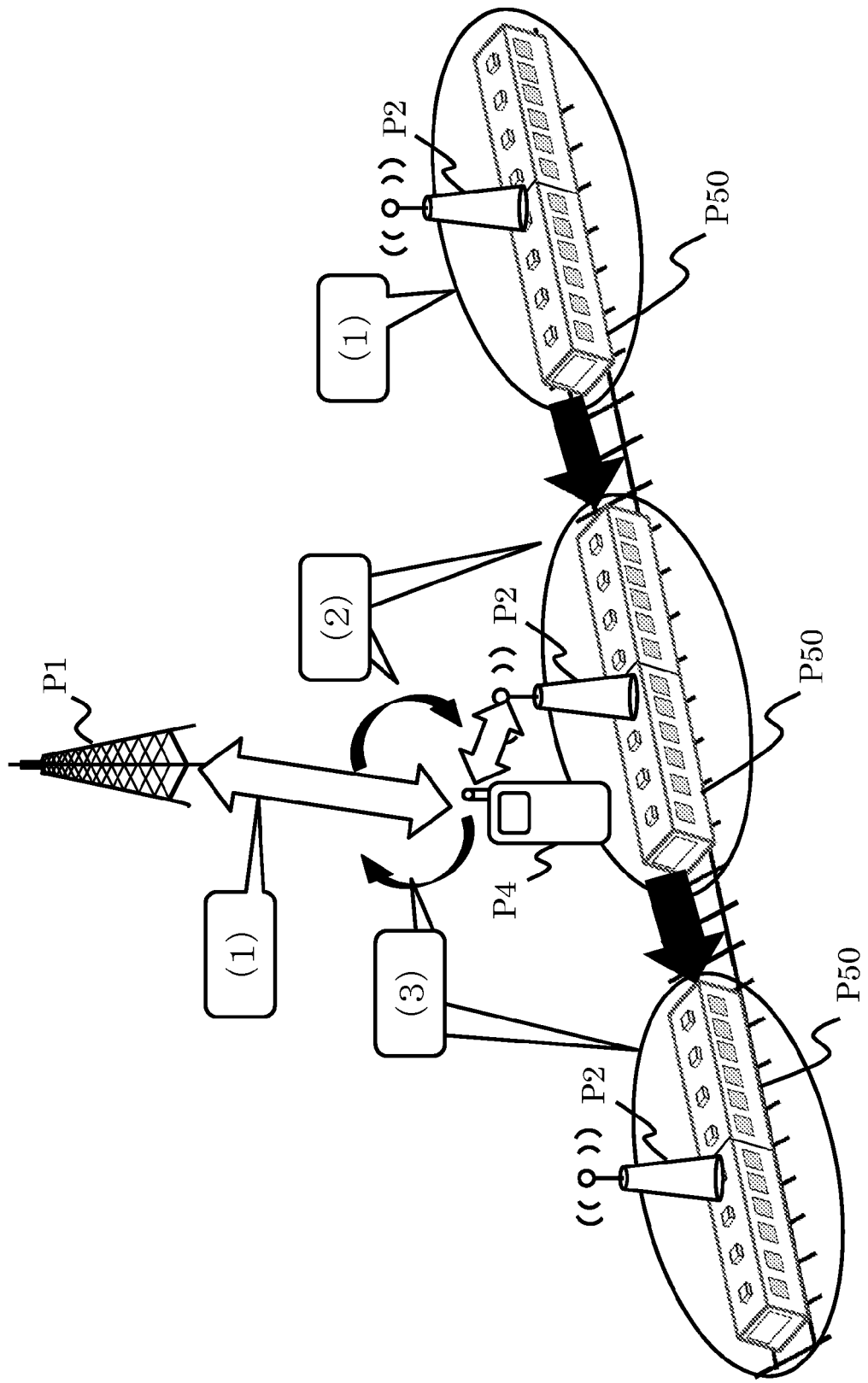

US 8,996,008 B2

WIRELESS COMMUNICATION NETWORK SYSTEM, WIRELESS COMMUNICATION APPARATUS, MOBILE TERMINAL, CONNECTION-TARGET SWITCH DETERMINING METHOD, AND CONNECTION-TARGET CHANGE DETERMINING METHOD

CROSS-REFERENCE TO RELATED APPLICATION

This application is a continuation application of International Application PCT/JP2010/53134, filed on Feb. 26, 2010, now pending, the contents of which are herein wholly incorporated by reference.

FIELD

The present invention relates to a wireless communication apparatus mounted on a mobile body, a wireless communication apparatus installed at a predetermined position, and a wireless communication network system including a mobile terminal.

BACKGROUND

In recent years, wireless communication provides not only voice communication but also various services such as access to the Internet, delivery of streaming broadcasts, and delivery of contents containing music and videos.

In order to provide these services anywhere with high quality, introduction of a relay station that relays communication between a terminal and a base station is studied in LTE (Long Term Evolution) Advanced, which is a next-generation standard of 3GPP (3rd Generation Partnership Project). The high-quality service here refers to, for example, a service that is provided to a wide connection area with high throughput.

PATENT DOCUMENT

[Patent document 1] Japanese Patent Laid-Open No. 2004-32155
[Patent document 2] Japanese Patent Laid-Open No. 2002-369241

The relay station includes: a fixed relay station the installation site of which is fixed; and a mobile relay station that serves to improve processing during high-speed movement and is mounted on a mobile body.

FIG. 34 is a diagram illustrating an example of a wireless communication network system including a mobile relay station. In the case where the mobile relay station is used in a switching process for a base station or a relay station to which a mobile terminal is connected, the following problem is expected to occur.

The wireless communication network system illustrated in FIG. 34 includes a base station P1, a mobile relay station P2 installed in a train P50, and a mobile terminal P4. The mobile terminal P4 is located in a cell of the base station P1, and is located along a railway track on which the train P50 passes.

(1) The mobile terminal P4 is connecting to the base station P1 to communicate with the other party. The mobile relay station P2 is located sufficiently far from the mobile terminal P4, and hence, for the mobile terminal P4, the reception quality of a signal from the base station P1 is better than the reception quality of a signal from the mobile relay station P2.

(2) A distance between the mobile terminal P4 and the mobile relay station P2 becomes smaller along with the movement of the train P50, and the mobile terminal P4 enters a cell of the mobile relay station P2. When the mobile terminal P4 enters the cell of the mobile relay station P2, for the mobile terminal P4, the reception quality of the signal from the mobile relay station P2 becomes better than the reception quality of the signal from the base station P1. At the timing at which the reception quality of the signal from the mobile relay station P2 becomes better than the reception quality of the signal from the base station P1, the mobile terminal P4 starts a process of switching its connection target from the base station P1 to the mobile relay station P2.

(3) As the mobile relay station P2 moves away from the mobile terminal P4 along with the movement of the train P50, the mobile terminal P4 comes out of the cell of the mobile relay station P2. When the mobile terminal P4 comes out of the cell of the mobile relay station P2, for the mobile terminal P4, the reception quality of the signal from the mobile relay station P2 decreases to be exceeded by the reception quality of the signal from the base station P1. At the timing at which the reception quality of the signal from the base station P1 becomes better than the reception quality of the signal from the mobile relay station P2, the mobile terminal P4 starts a process of switching its connection target from the mobile relay station P2 back to the base station P1.

Also with regard to cell selection when the mobile terminal P4 is in a stand-by state, a cell is selected again on the basis of the reception qualities of signals similarly to (1) to (3) described above. Note that the reception quality of a signal may be determined from, for example, the power level of a pilot signal from each station.

However, the switching of the connection target of the mobile terminal P4 as (1) to (3) described above is not preferable for the mobile terminal P4 that is stably connected to the base station P1.

In the case where the mobile terminal P4 is making communication, there occurs a period during which the communication is instantly interrupted due to the switching of the connection target. Such an instant interruption of the communication leads to unfavorable influences such as a decrease in throughput and an instant interruption of speech communication. In addition, for the network side such as the base station P1 and the mobile relay station P2, unnecessary communication occurs, so that the network load is increased.

In the case where the mobile terminal P4 is in a stand-by state, calling of this terminal may be missed during the execution of cell selection, and an incoming call may be delayed. In addition, electric power is consumed for the execution of unnecessary cell selection, so that a battery duration of the mobile terminal P4 shortens.

Accordingly, in wireless communication networks using mobile relay stations as the example illustrated in FIG. 34, the connection target of a mobile terminal may not be efficiently switched in some cases.

SUMMARY

An aspect of the present invention relates to a wireless communication network system. The wireless communication network system includes: a mobile terminal that transmits a switching request for switching connection target from a currently connected first wireless communication apparatus to a second wireless communication apparatus mounted on a mobile body; and a wireless communication apparatus that determines permission or prohibition of the connection target switching of the mobile terminal from its own apparatus to the second wireless communication apparatus, based on permission/prohibition setting of switching the connection target from the first wireless communication apparatus to the second wireless communication apparatus in accordance with a type of the first wireless communication apparatus.

Another aspect of the present invention relates to a wireless communication apparatus. The wireless communication apparatus includes: a storing unit that holds permission/prohibition setting of switching connection target: from a first wireless communication apparatus to which a mobile terminal is currently connected; to a second wireless communication apparatus mounted on a mobile body, in accordance with a type of the first wireless communication apparatus; and a determining unit that determines, when receiving a switching request from the mobile terminal, permission or prohibition of the connection target switching of the mobile terminal from its own apparatus to the second wireless communication apparatus, based on the permission/prohibition setting.

Another aspect of the present invention relates to a wireless communication apparatus. The wireless communication apparatus is a first wireless communication apparatus mounted on a first mobile body, the first wireless communication apparatus including a determining unit that does not permit a mobile terminal that connects to the first wireless communication apparatus to switch its connection target from the first wireless communication apparatus to a second wireless communication apparatus mounted on a second mobile body, and permits the mobile terminal to switch its connection target from the first wireless communication apparatus to a third wireless communication apparatus that is not mounted on a mobile body.

Another aspect of the present invention relates to a mobile terminal. The mobile terminal includes: a storing unit that holds permission/prohibition setting of connection target change from a currently connected first wireless communication apparatus to a second wireless communication apparatus mounted on a mobile body in accordance with a type of the first wireless communication apparatus; and a determining unit that determines permission or prohibition of the connection target change from the first wireless communication apparatus to the second wireless communication apparatus, based on the permission/prohibition setting held in the storing unit.

Another aspect of the present invention relates to a connection-target switch determining method and a connection-target change determining method for the wireless communication network system, the wireless communication apparatus, and the mobile terminal described above.

The object and advantage of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example of a wireless communication network system;

FIG. 2 is an example of a table illustrating restriction on a handover and a reselection in the wireless communication network system;

FIG. 3 is a diagram illustrating an operation example when a mobile terminal executes the handover from a base station to a fixed relay station;

FIG. 4 is a diagram illustrating an operation example when the mobile terminal executes the reselection from the base station to the fixed relay station;

FIG. 6 is a diagram illustrating a configuration example of a mobility controlling unit of the mobile terminal;

FIG. 7 is a table illustrating an example of a mobile relay station connection history;

FIG. 8 is a diagram illustrating an example of cell transfer permission/prohibition setting;

FIG. 20 is a diagram for describing Operation Example 2;

FIG. 21A is a diagram illustrating a flow of Operation Example 2;

FIG. 21B is a diagram illustrating the flow of Operation Example 2;

FIG. 22 is a diagram for describing Operation Example 3;

FIG. 23 is a diagram illustrating a flow of Operation Example 3;

FIG. 24 is a diagram illustrating a flow of Operation Example 4;

FIG. 26 is a diagram illustrating a flow of Operation Example 6;

FIG. 27 is a diagram illustrating a configuration example of the mobility controlling unit of the mobile terminal;

FIG. 32B is a diagram illustrating the flow of Operation Example 8;

FIG. 33 is a diagram illustrating a flow of Operation Example 9;

FIG. 34 is a diagram illustrating an example of a wireless communication network system including a mobile relay station;

DESCRIPTION OF EMBODIMENTS

Figure 5:
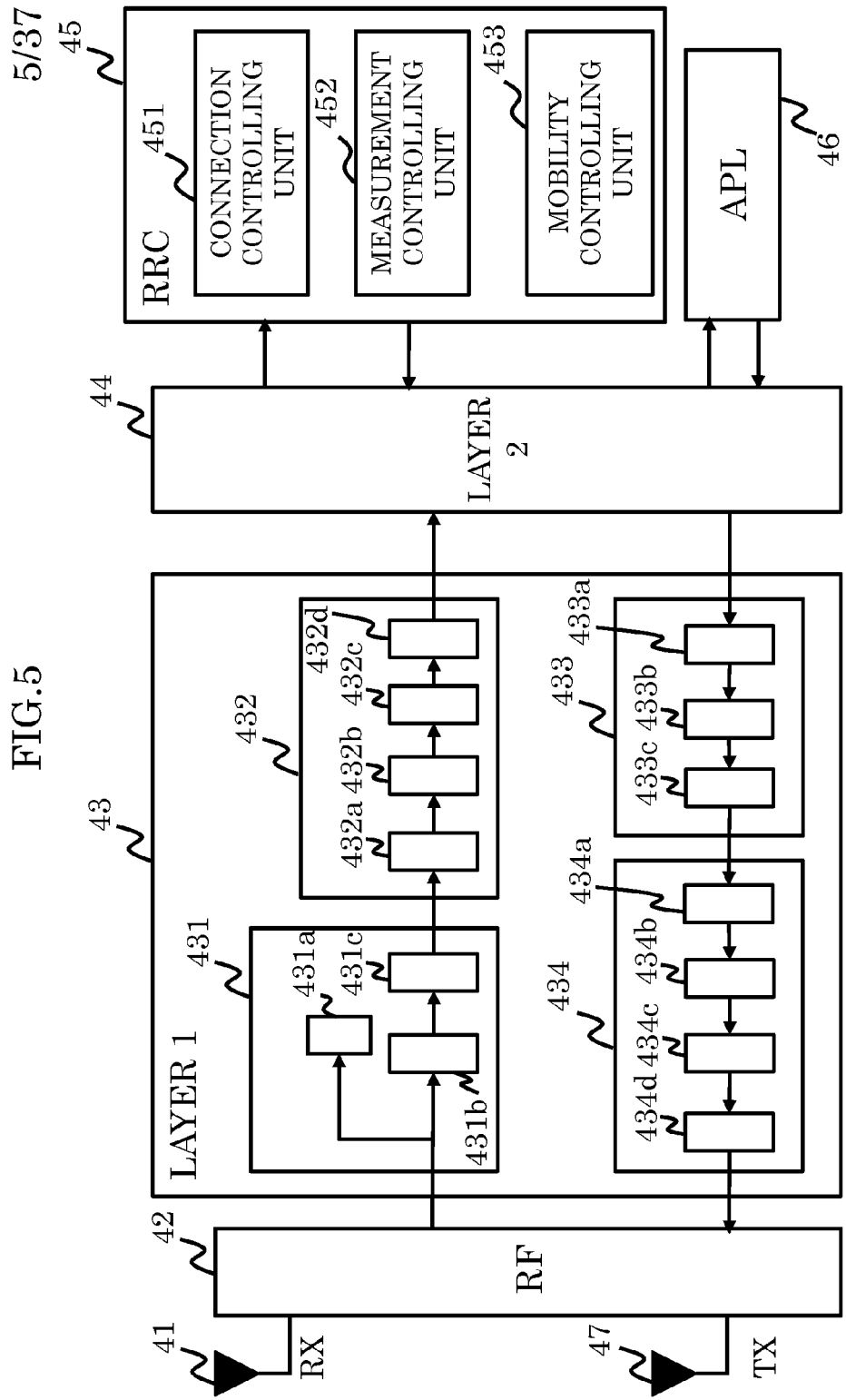
FIG. 5 is a diagram illustrating a configuration example of the mobile terminal.

Hereinafter, modes for carrying out the present invention (hereinafter, referred to as embodiments) are described with reference to the drawings. Configurations of the embodiments described below are given as examples, and the present invention is not limited to the configurations of the embodiments.

First Embodiment

FIG. 1 is a diagram illustrating a configuration example of a wireless communication network system. A wireless communication network system 100 illustrated in FIG. 1 includes: a base station 1; a mobile relay station 2 installed in a train 50 as a mobile body; a fixed relay station 3 installed in a train station at which the train 50 stops; and mobile terminals 4A, 4B, and 4C.

The base station 1 relays communication between a mobile terminal located in its own cell and a terminal with which the mobile terminal communicates. The base station 1 also relays communication between a mobile terminal located in a cell of the mobile relay station 2 and a terminal with which the mobile terminal communicates, via the mobile relay station 2. The base station 1 also relays communication between a mobile terminal located in a cell of the fixed relay station 3 and a terminal with which the mobile terminal communicates, via the fixed relay station 3.

The fixed relay station 3 is a relay station installed in the train station at which the train 50 stops. The fixed relay station 3 covers areas that are unreachable in a communicable level of a signal from the base station 1, for example, undergrounds and areas far from the base station 1. The fixed relay station 3 relays communication between the mobile terminal in the cell of the fixed relay station 3 and the base station 1. It is preferable that the fixed relay station 3 be installed in a boarding/exiting facility for a mobile body such as the train station at which the train 50 stops.

The mobile relay station 2 is a relay station mounted on the train 50. A cell range of the mobile relay station 2 is, for example, a range that roughly covers the train 50. In the case where the mobile relay station 2 enters the cell of the base station 1, the mobile relay station 2 relays communication with the base station 1, of the mobile terminal that connects to the mobile relay station 2.

The mobile terminal 4A is a mobile terminal that is located along a railway track on which the train 50 passes. In FIG. 1, the mobile terminal 4A is located in the cell of the base station 1, and is not in the cells of the mobile relay station 2 and the fixed relay station 3.

The mobile terminal 4B is a mobile terminal owned by a passenger in the train 50. That is, the mobile terminal 4B is located inside of the train 50. In FIG. 1, the mobile terminal 4B is located in the cell of the base station 1, and is located also in the cell of the mobile relay station 2. The mobile terminal 4B receives radio signals from both the base station 1 and the mobile relay station 2. The reception quality of the signal that the mobile terminal 4B receives from the mobile relay station 2 is better than the reception quality of the signal from the base station 1, and hence, at the time of communication, the mobile terminal 4B connects to the mobile relay station 2 to make communication.

The mobile terminal 4C is a mobile terminal located inside of the train station at which the train 50 stops. The mobile terminal 4C is located in the cell of the base station 1, and is located also in the cell of the fixed relay station 3. The mobile terminal 4C receives radio signals from both the base station 1 and the fixed relay station 3. The reception quality of the radio signal that the mobile terminal 4C receives from the fixed relay station 3 is better than the reception quality of the radio signal from the base station 1, and hence the mobile terminal 4C connects to the fixed relay station 3 to make communication.

During communication and in a stand-by state, the mobile terminals 4A, 4B, and 4C receive a signal from at least one of the base station 1, the mobile relay station 2, and the fixed relay station 3, and periodically measure the reception quality of the signal from each station. On the basis of the measurement result of the reception quality of the signal, the mobile terminals 4A, 4B, and 4C each select a station that is a transmission source of a signal having the best reception quality, as a station to be used for communication. Accordingly, in FIG. 1, at the time of communication, the mobile terminal 4A selects the base station 1 and connects thereto. The mobile terminal 4B selects the mobile relay station 2 and connects thereto. The mobile terminal 4C selects the fixed relay station 3 and connects thereto. In the case where the station that is the transmission source of the signal having the best reception quality has changed in accordance with a change in radio wave conditions due to the movement of the mobile terminal itself or the like, the mobile terminals 4A, 4B, and 4C each select another station (or the cell) to be used for communication.

Switching of the connection target station by the mobile terminal during communication is referred to as handover. Selecting of another connection target station (or cell) by the mobile terminal in a stand-by state is hereinafter referred to as reselection. A station that is selected as the connection target of the mobile terminal is hereinafter referred to as selected station. A station that is selected as a handover target or a reselection target is hereinafter referred to as transfer target candidate station. The base station, the mobile relay station, and the fixed relay station are collectively referred to as "station". The base station, the mobile relay station, and the fixed relay station correspond to the "wireless communication apparatus" according to one of the aspects of the present invention. The base station and the fixed relay station correspond to the "fixed apparatus" according to one of the aspects of the present invention. The mobile relay station corresponds to the "mobile apparatus" according to one of the aspects of the present invention.

Note that, for simplicity of description, it is assumed in FIG. 1 that the mobile terminals 4A, 4B, and 4C do not move.

In the wireless communication network system 100 illustrated in FIG. 1, for example, the following restrictions can be provided for the handover and reselection of the cellular phones 4A, 4B, and 4C.

(Restriction 1) The mobile terminal 4A the selected station of which is the base station 1 is prohibited from making the handover and the reselection from the base station 1 to the mobile relay station 2. This is because the mobile terminal 4A can communicate with the base station 1 without the intermediation of the relay station and such unfavorable handover and reselection from the base station 1 to the mobile relay station 2 cause an instant interruption or an increase in network load.

(Restriction 2) The mobile terminal 4B the selected station of which is the mobile relay station 2 can make the handover and the reselection from the mobile relay station 2 to the base station 1 in the case where the reception quality of the signal from the base station 1 is the best. When the mobile terminal 4B communicates directly with the base station 1 without the intermediation of the mobile relay station 2, more stable communication can be established in terms of throughput and the like. Hence, in the case where the reception quality from the base station 1 is better, the selected station is switched to the base station 1. In addition, when the reception quality of the signal from the mobile relay station 2 becomes the best as the train 50 moves away from the base station 1, the mobile terminal 4B can make the handover and the reselection from the base station 1 back to the mobile relay station 2. Similarly, the mobile terminal 4B can make the handover and the reselection from the mobile relay station 2 to the fixed relay station 3, and further can make the handover or the reselection from the fixed relay station 3 back to the mobile relay station 2.

(Restriction 3) The mobile terminal 4C the selected station of which is the fixed relay station 3 can make the handover and the reselection from the fixed relay station 3 to the mobile relay station 2, in reaction to the approach of the train 50. The fixed relay station 3 is a station installed in the train station. In addition, the owner of the mobile terminal 4C the selected station of which is the fixed relay station 3 may get on the train 50. Accordingly, in order to continue the communication even when the owner of the mobile terminal 4C gets on the train 50, the mobile terminal 4C can make the handover and the reselection from the fixed relay station 3 to the mobile relay station 2 in the case where the reception quality from the mobile relay station 2 is better. With this configuration, even in the case where the owner of the mobile terminal 4C does not get on the train 50, the mobile terminal 4C may make the handover and the reselection to the mobile relay station 2 in reaction to the approach of the train 50. In order to continue the communication even when the train 50 has moved away from the train station, the mobile terminal 4C can make the handover and the reselection from the mobile relay station 2 back to the fixed relay station 3 in the case where the reception quality from the fixed relay station 3 becomes better.

(Restriction 4) The mobile terminal 4B the selected station of which is the mobile relay station 2 is prohibited from making the handover and the reselection to another mobile relay station. For example, this is because, in FIG. 1, even if the mobile terminal 4B makes the handover to another mobile relay station mounted on a train (not illustrated) that passes by the train 50, the time of connection to the another mobile relay station is short.

In FIG. 1, also in the case where a base station is installed at the train station instead of the fixed relay station 3, Restriction 3 is applied to the base station. That is, even if the fixed relay station 3 in FIG. 1 is a base station, the restriction of (Restriction 1) to (Restriction 4) is put on the wireless communication network system 100. Accordingly, the type of station is as described below.

(Type 1) A base station or a fixed relay station installed near a boarding/exiting facility for a mobile body such as a train station and a bus stop (Type 2) A base station or a fixed relay station other than Type 1

(Type 3) A mobile relay station

Examples of the mobile body include a train, a bus, and an automobile. Note that, in the case where the base station or the fixed relay station is not particularly distinguished by Type 1 and Type 2, the base station or the fixed relay station is simply referred to as base station or fixed relay station.

FIG. 2 is a table in which (Restriction 1) to (Restriction 4) are put in order. That is, FIG. 2 is a table illustrating restriction on the handover and the reselection in the wireless communication network system 100. In FIG. 2, changes of the selected station of the mobile terminal are categorized into Cases (a) to (e), and description is given for each case.

(a) a Change of the Selected Station from a Base Station or a Fixed Relay Station to a Base Station or a Fixed Relay Station The handover and the reselection from a base station or a fixed relay station to a fixed relay station or a base station occur due to the movement of a mobile terminal, and thus are naturally permitted.

(b) a Change of the Selected Station from the Base Station or the Fixed Relay Station of Type 1 to a Mobile Relay Station The handover and the reselection from the base station or the fixed relay station (Type 1) installed near the boarding/exiting facility for the mobile body to a mobile relay station are permitted according to (Restriction 3).

(c) a Change of the Selected Station from the Base Station or the Fixed Relay Station of Type 2 to a Mobile Relay Station The handover and the reselection from the base station or the fixed relay station of Type 2 to a mobile relay station are permitted according to (Restriction 1) and (Restriction 2), in the case where a history of connection to the mobile relay station as the transfer target candidate station exists before connection to the currently selected station.

(d) A change of the selected station from a mobile relay station to a base station and a fixed relay station The handover and the reselection from a mobile relay station to a base station and a fixed relay station are permitted according to (Restriction 2).

(e) A change of the selected station from a mobile relay station to a mobile relay station The handover and the reselection from a mobile relay station to a mobile relay station are not permitted according to (Restriction 4).

According to the example illustrated in FIG. 2, in the wireless communication network system, in the case where the transfer target candidate station is a base station or a fixed relay station, the handover and the reselection are permitted without any condition. On the other hand, in the case where the transfer target candidate station is a mobile relay station, the permission or prohibition of the handover and the reselection is determined depending on the type of the currently selected station and the connection history.

The handover is a process in which a mobile terminal switches its connection target during communication via a base station, a fixed relay station, or a mobile relay station, and hence the permission or prohibition of the handover can be determined by any of the stations and the mobile terminal. On the other hand, the reselection is a process performed when a mobile terminal is in a stand-by state, and thus is closed to the mobile terminal.

In the first embodiment, description is given of the case where the permission or prohibition of the handover is determined by the stations.

Hereinafter, the mobile terminals 4A, 4B, and 4C are simply referred to as "mobile terminal 4" unless the mobile terminals 4A, 4B, and 4C are particularly distinguished from one another.

<Operation Example when Handover is Made from Base Station to Fixed Relay Station>

FIG. 3 is a diagram illustrating an operation example when the mobile terminal executes the handover from the base station to the fixed relay station. In the example illustrated in FIG. 3, in FIG. 1, the mobile terminal 4A makes the handover from the base station 1 to the fixed relay station 3.

The mobile terminal 4A is making communication while the base station 1 is its selected station. In addition, the fixed relay station 3 relays the communication between the base station 1 and the mobile terminal 4A.

The mobile terminal 4A periodically executes a detection process of neighboring stations and a measurement process of the reception quality of signals from the neighboring stations (OP1). The mobile terminal 4A determines whether or not the reception quality of the signal from the base station 1 as the currently selected station is the best (OP2).

If the reception quality of the signal from the base station 1 is the best (OP2: Yes), the processing returns to OP1.

If there is a station having a reception quality better than that of the signal from the base station 1 (OP2: No), the mobile terminal 4A determines to make the handover to a station having the best reception quality. In the example illustrated in FIG. 3, the reception quality of the signal from the fixed relay station 3 is the best for the mobile terminal 4A, and hence the mobile terminal 4A determines to make the handover from the base station 1 to the fixed relay station 3.

The mobile terminal 4A transmits a measurement report for requesting the handover to the fixed relay station 3, to the currently connected base station 1 (OP3). The measurement report transmitted by the mobile terminal 4A includes, for example: the identification number of each station detected by the mobile terminal 4A; and the identification number of the transfer target candidate station.

Upon the reception of the measurement report, the base station 1 transmits a handover request for requesting the handover, to the fixed relay station 3 as the transfer target candidate station included in the measurement report (OP4). The handover request is a message for inquiring of the transfer target candidate station whether or not the handover is possible. The fixed relay station 3 as the transfer target candidate station that has received the handover request permits the handover, and transmits a handover request ACK to the base station 1 (OP5).

If a response is returned from the fixed relay station 3, the base station 1 transmits a handover command to the mobile terminal 4A, and thus instructs the mobile terminal 4A to execute the handover (OP6). Upon the reception of the handover command, the mobile terminal 4A executes the handover from the base station 1 to the fixed relay station 3 (OP7). Upon the completion of the handover, the mobile terminal 4A issues a handover complete, to thereby report the completion of the handover to the fixed relay station 3 (OP8).

Upon the reception of the handover complete by the fixed relay station 3, a session is established between the mobile terminal 4A and the fixed relay station 3.

<Operation Example when Reselection is Made from Base Station to Fixed Relay Station>

FIG. 4 is a diagram illustrating an operation example when the mobile terminal executes the reselection from the base station to the fixed relay station. In the example illustrated in FIG. 4, in FIG. 1, the mobile terminal 4A makes the reselection from the base station 1 to the fixed relay station 3.

The mobile terminal 4A periodically executes a detection process of neighboring stations and a measurement process of the reception quality of signals from the neighboring stations (OP11). The mobile terminal 4A determines whether or not the reception quality of the signal from the base station 1 as the currently selected station is the best (OP12).

If the reception quality of the signal from the base station 1 is the best (OP12: Yes), the processing returns to OP11.

If there is a station having a reception quality better than that of the signal from the base station 1 (OP12: No), the mobile terminal 4A determines to change the selected station to a station having the best reception quality. In the example illustrated in FIG. 4, the reception quality of the signal from the fixed relay station 3 is the best, and hence the mobile terminal 4A determines to make the reselection from the base station 1 to the fixed relay station 3.

The mobile terminal 4A acquires notifying information from the fixed relay station 3 as the transfer target candidate station (OP13), and executes the reselection from the base station 1 as the currently selected station to the fixed relay station 3 (OP14).

<Apparatus Configuration>
<<Configuration Example of Mobile Terminal>>

FIG. 5 is a diagram illustrating a configuration example of the mobile terminal 4. The mobile terminal 4 includes a receiving antenna 41, a radio unit 42, a layer 1 processing unit 43, a layer 2 processing unit 44, a radio resource controlling unit 45, an application layer processing unit 46, and a transmitting antenna 47. These units are each implemented by software components or hardware components or by the combination thereof (see the section [Others]).

The mobile terminal 4 receives a signal transmitted by the base station 1, the mobile relay station 2, or the fixed relay station 3 through the receiving antenna 41. The reception signal received by the receiving antenna 41 is down-converted by the radio unit 42 from a radio-frequency signal to a baseband signal and is outputted to the layer 1 processing unit 43.

The layer 1 processing unit 43 executes a process that is performed in a physical layer corresponding to a layer 1 in LTE, on the inputted baseband signal. The layer 1 processing unit 43 includes a demodulating unit 431, a decoding unit 432, a coding unit 433, and a modulating unit 434.

The demodulating unit 431 receives the baseband signal from the radio unit 42, and performs a demodulation process on the received baseband signal. The demodulating unit 431 performs the demodulation process according to, for example, an OFDMA (Orthogonal Frequency Division Multiplexing Access) system. The demodulating unit 431 includes a measuring unit 431$a$, an FFT (Fast Fourier Transformation) unit 431$b$, and a demodulation executing unit 431$c$.

The measuring unit 431$a$ performs cell search and level measurement on the basis of the received baseband signal. The FFT unit 431$b$ executes fast Fourier transformation on an OFDMA symbol, and performs transformation from a time-domain signal to a frequency-domain signal. The demodulation executing unit 431$c$ demodulates the inputted signal (a multilevel-modulated symbol according to, for example, QPSK (Quadrature Phase Shift Keying), 16QAM (16 Quadrature Amplitude Modulation), and 64QAM), and thus obtains data. The demodulation executing unit 431$c$ outputs the obtained data to the decoding unit 432.

The decoding unit 432 performs a decoding process on the inputted data. The decoding unit 432 includes a de-rate matching unit 432$a$, an HARQ (Hybrid Automatic Repeat reQuest) combining unit 432$b$, a turbo decoding unit 432$c$, and a CRC (Cyclic Redundancy Check) unit 432$d$.

The de-rate matching unit 432$a$ restores data that has been expanded or reduced, in accordance with an allocated physical channel resource, and outputs the restored data to the HARQ combining unit 432$b$. The HARQ combining unit 432$b$ combines retransmitted data through an HARQ retransmission process, to thereby perform error recovery. The HARQ combining unit 432$b$ outputs the data obtained by the error recovery to the turbo decoding unit 432$c$. The turbo decoding unit 432$c$ decodes the inputted turbo encoded data, and outputs the decoded data to the CRC unit 432$d$. The CRC unit 432d checks whether or not the data inputted by the turbo decoding unit 432c is correct, and outputs the result to the layer 2 processing unit 44.

The coding unit 433 performs a coding process on a transmission data. The coding unit 433 includes a CRC adding unit 433a, a turbo coding unit 433b, and a rate matching unit 433c.

The CRC adding unit 433a calculates a CRC for the transmission data, and adds the CRC thereto. The CRC adding unit 433a outputs the transmission data to which the CRC has been added, to the turbo coding unit 433b.

The turbo coding unit 433b performs turbo coding on the transmission data inputted by the CRC adding unit 433a, and outputs the resultant data to the rate matching unit 433c.

The rate matching unit 433c expands or reduces the transmission data inputted by the turbo coding unit 433b, in accordance with an allocated physical channel resource. The rate matching unit 433c outputs the expanded or reduced transmission data to the modulating unit 434.

The modulating unit 434 performs a modulation process on the transmission data inputted by the coding unit 433. The modulating unit 434 applies, for example, SC-FDMA (Single Carrier Frequency Division Multiple Access) to the transmission data. The modulating unit 434 includes a modulation executing unit 434a, a DFT (Discrete Fourier Transform) unit 434b, a subcarrier mapping unit 434c, and an IFFT (Inverse FFT) unit 434d.

The modulation executing unit 434a performs multilevel modulation on the transmission data inputted by the coding unit 433. The modulation executing unit 434a outputs the multilevel-modulated symbol to the DFT unit 434b.

The DFT unit 434b performs discrete Fourier transform on the symbol inputted by the subcarrier modulation executing unit 434a. The DFT unit 434b outputs the symbol that has been subjected to the discrete Fourier transform, to the subcarrier mapping unit 434c.

The subcarrier mapping unit 434c allocates the symbol inputted by the DFT unit 434b, to a physical channel resource designated by the network. The subcarrier mapping unit 434c outputs the symbol allocated to the physical channel resource, to the IFFT unit 434d.

The IFFT unit 434d performs inverse fast Fourier transformation on the symbol that is inputted by the subcarrier mapping unit 434c and is allocated for each physical channel. The IFFT unit 434 outputs the symbol that has been subjected to the inverse fast Fourier transformation, to the radio unit 42.

The baseband signal outputted by the layer 1 processing unit 43 is transformed by the radio unit 42 into a radio-frequency signal, and is transmitted through the antenna 47.

The layer 2 processing unit 44 performs data coupling/decoupling in accordance with respective formats of an MAC (Media Access Control) layer, an RLC (Radio Link Control) layer, and a PDCP (Packet Data Convergence Protocol) layer included in a layer 2 in LTE. In addition, the layer 2 processing unit 44 also performs retransmission control and ordering of data.

The radio resource controlling unit 45 is in charge of radio resource control and entire apparatus control on the basis of the data inputted by the layer 2 processing unit 44. The radio resource controlling unit 45 includes a connection controlling unit 451, a measurement controlling unit 452, and a mobility controlling unit 453.

The connection controlling unit 451 performs an outgoing call/incoming call process, establishment and opening of a call and the like. The measurement controlling unit 452 manages and reports a measurement target cell, and controls a measurement threshold of the handover. The mobility controlling unit 453 controls the handover and the like. The detail of the mobility controlling unit 453 is described later.

The application layer processing unit 46 performs an upper layer process such as data processing corresponding each user.

FIG. 6 is a diagram illustrating a configuration example of the mobility controlling unit 453 of the mobile terminal 4. The mobility controlling unit 453 of the mobile terminal 4 includes a measurement value acquiring unit 61, a first reselection determining unit 62, a second reselection determining unit 63, a reselection executing unit 64, a handover executing unit 65, and a storing unit 66.

The storing unit 66 holds: a mobile relay station connection history of the mobile terminal 4; the identification numbers of neighboring stations detected by the mobile terminal 4; information on a mobile relay station list; and cell transfer permission/prohibition setting of each station neighboring the mobile terminal 4, the information and the cell transfer permission/prohibition setting being included in notifying information delivered by the base station. The mobile relay station list is, for example, a list of the identification numbers of mobile relay stations in the wireless communication network 100, and is one of pieces of information included in the notifying information delivered by each station.

FIG. 7 is a table illustrating an example of the mobile relay station connection history. The mobile relay station connection history stores the identification number of a mobile relay station that is last selected as the selected station. In the initial state of the mobile relay station connection history, a history of connection to the mobile relay station does not exist, and the setting value is Invalid. The identification number of the mobile relay station registered in the mobile relay station connection history is deleted when this mobile relay station is not detected any more by neighborhood monitoring of the mobile terminal. Upon the deletion of the identification number of the mobile relay station, the setting value becomes Invalid.

FIG. 7 illustrates a change in information that is set to the mobile relay station connection history when the mobile terminal 4 makes the handover or the reselection in order of the fixed relay station 3, the mobile relay station 2, the base station 1, the mobile relay station 2, and a fixed relay station 3b (not illustrated in FIG. 1) in the example illustrated in FIG. 1.

(1) For example, it is assumed that the mobile terminal 4 does not have a history of connection to any mobile relay station and that the fixed relay station 3 is selected as the selected station. In this case, Invalid is set to the mobile relay station connection history of the mobile terminal 3.

(2) The train 50 approaches the train station, the user who owns the mobile terminal 4 gets on the train 50, and the mobile terminal 4 makes the handover or the reselection to the mobile relay station 2. At this time, the identification number of the mobile relay station 2 is set to the mobile relay station connection history.

(3) Further, in the case where the mobile terminal 4 makes the handover or the reselection to the base station 1 due to the movement of the train 50, because the transfer target is not a mobile relay station, the mobile relay station connection history regarding the mobile relay station 2 is held.

(4) After that, when the mobile terminal 4 connects again to the mobile relay station 2, the mobile relay station connection history is updated with the identification number of the mobile relay station 2 (in this case, overwritten and updated).

(5) After that, the user who owns the mobile terminal 4 gets off the train, and the mobile terminal 4 makes the handover or the reselection to the fixed relay station 3b. When the mobile terminal 4 moves sufficiently away from the train 50 on which the mobile relay station 2 is mounted, the mobile relay station 2 is not detected any more, and hence the identification number of the mobile relay station 2 is deleted from the mobile relay station connection history. Invalid is set to the mobile relay station connection history.

In this way, the information on the last connected mobile relay station is held in the mobile relay station connection history.

FIG. 8 is a diagram illustrating an example of the cell transfer permission/prohibition setting. The cell transfer permission/prohibition setting is, for example, setting of the permission or non-permission of the handover and the reselection from each station to a mobile relay station, the setting being made in advance to each station by an administrator or the like of the wireless communication network. The cell transfer permission/prohibition setting of each station is one of pieces of information contained in the notifying information delivered by each station. FIG. 8 illustrates the cell transfer permission/prohibition setting for each type of station.

The base station and the fixed relay station (Type 1) installed near the boarding/exiting facility for the mobile body are permitted to make the handover and the reselection to a mobile relay station according to the table illustrated in FIG. 2. Accordingly, the cell transfer permission/prohibition setting of the fixed relay station 3 in FIG. 1 is "Permitted".

The base station and the fixed relay station (Type 2) other than Type 1 are not permitted to make the handover and the reselection to a mobile relay station according to (Restriction 1). Accordingly, the cell transfer permission/prohibition setting of the base station 1 in FIG. 1 is "Not Permitted".

A mobile relay station is not permitted to make the handover and the reselection to a mobile relay station according to the table illustrated in FIG. 2. Accordingly, the cell transfer permission/prohibition setting of the mobile relay station 2 in FIG. 1 is "Not Permitted".

The measurement value acquiring unit 61 obtains, as its input, a measurement result of each station neighboring the mobile terminal 4, the measurement result being obtained by the measuring unit 431a of the layer 1 processing unit 43. On the basis of a measurement result of the reception quality of a signal from each station, the measurement value acquiring unit 61 determines a station having the best measurement result as the transfer target candidate station, in the case where the measurement result exceeds a predetermined threshold. The predetermined threshold is, for example, a measurement threshold of the handover managed by the measurement controlling unit 452 of the radio resource controlling unit 45. The measurement value acquiring unit 61 reports the transfer target candidate station to the handover executing unit 65 and the first reselection determining unit 62.

The handover executing unit 65 is activated upon communication start of the mobile terminal 4. When the transfer target candidate station is reported by the measurement value acquiring unit 61 during the communication of the mobile terminal 4, the handover executing unit 65 determines whether or not the transfer target candidate station is the same as the currently selected station. If the transfer target candidate station is different from the currently selected station, that is, if the station having the best reception quality of the signal has changed, the handover executing unit 65 determines to make the handover to the transfer target candidate station. The handover executing unit 65 generates a measurement report for requesting the execution of the handover to the transfer target candidate station, and transmits the measurement report to the currently selected station. The measurement report includes: the identification numbers of the neighboring stations whose signal is detected by the mobile terminal 4; the identification number of the transfer target candidate station; the mobile relay station connection history and the like, on the basis of the information held in the storing unit 66.

Upon the completion of the handover, in the case where the transfer target station that has newly become the selected station is a mobile relay station, the handover executing unit 65 updates the mobile relay station connection history in the storing unit 66 with the identification number of the mobile relay station.

If the transfer target candidate station is reported by the measurement value acquiring unit 61 during a stand-by state of the mobile terminal 4, the first reselection determining unit 62 determines whether or not the transfer target candidate station is the same as the currently selected station. If the transfer target candidate station is different from the currently selected station, the first reselection determining unit 62 starts a reselection process in cooperation with the second reselection determining unit 63.

The first reselection determining unit 62 determines whether or not the currently selected station and the transfer target candidate station are mobile relay stations, and determines the permission or prohibition of the reselection from the currently selected station to the transfer target candidate station. As a result of the determination, if the reselection from the currently selected station to the transfer target candidate station is possible, the first reselection determining unit 62 instructs the reselection executing unit 64 to execute the reselection.

In the case where the permission or prohibition of the reselection is not determined by the first reselection determining unit 62, the second reselection determining unit 63 determines the permission or prohibition of the reselection from the currently selected station to the transfer target candidate station, on the basis of the mobile relay station connection history. As a result of the determination, if the transfer from the currently selected station to the transfer target candidate station is possible, the second reselection determining unit 63 instructs the reselection executing unit 64 to execute the reselection.

Upon the reception of the instruction to execute the reselection from the first reselection determining unit 62 or the second reselection determining unit 63, the reselection executing unit 64 executes the reselection from the currently selected station to the transfer target candidate station. At the time of the completion of the reselection, in the case where the station that has newly become the selected station is a mobile relay station, the reselection executing unit 64 updates the mobile relay station connection history in the storing unit 66 with the identification number of the mobile relay station.

The first reselection determining unit 62 and the second reselection determining unit 63 correspond to the "determining unit" according to one of the aspects of the present invention.

Figure 9:
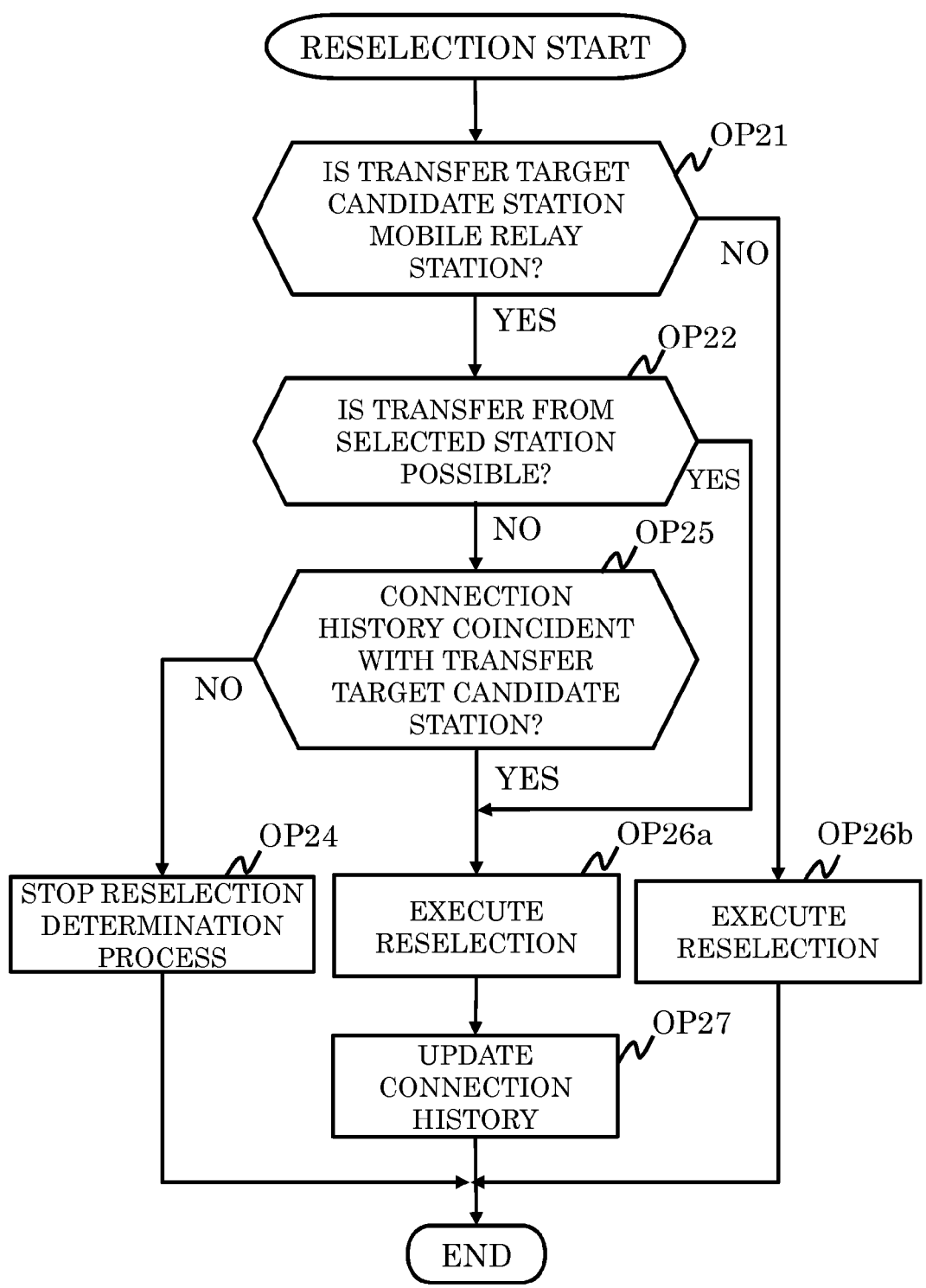
FIG. 9 is a diagram illustrating a flow example of a reselection determination process of the mobile terminal.

FIG. 9 is a diagram illustrating a flow example of a reselection determination process of the mobile terminal 4. At the timing at which a station having the best reception quality of the signal changes during a stand-by state of the mobile terminal 4, the mobile terminal 4 starts the reselection determination process with the station having the best reception quality being as the transfer target candidate station. That is, if the transfer target candidate station inputted by the measurement value acquiring unit 61 is different from the currently selected station, the first reselection determining unit 62 starts the reselection determination process.

The first reselection determining unit 62 determines whether or not the transfer target candidate station is a mobile relay station (OP21). The first reselection determining unit 62 compares the mobile relay station list held in the storing unit 66 with the identification number of the transfer target candidate station, to thereby determine whether or not the transfer target candidate station is a mobile relay station.

If the transfer target candidate station is not a mobile relay station (OP21: No), the reselection is permitted regardless of the type of the currently selected station (see FIG. 2). The first reselection determining unit 62 instructs the reselection executing unit 64 to execute the reselection from the currently selected station to the transfer target candidate station. The reselection executing unit 64 that has received the instruction executes the reselection from the currently selected station to the transfer target candidate station (OP26b), and ends the reselection determination process.

If the transfer target candidate station is a mobile relay station (OP21: Yes), the reselection to the mobile relay station as the transfer target candidate station is restricted depending on the type of the currently selected station (see FIG. 2). If the currently selected station is the base station and the fixed relay station (Type 1) installed near the boarding/exiting facility for the mobile body, the reselection from the currently selected station to the mobile relay station (transfer target candidate station) is permitted. If the currently selected station is the base station and the fixed relay station (Type 2) other than Type 1, the permission or prohibition of the reselection from the currently selected station to the mobile relay station (transfer target candidate station) is determined in accordance with the mobile relay station connection history. If the currently selected station is a mobile relay station, the reselection from the mobile relay station (currently selected station) to the mobile relay station (transfer target candidate station) is not permitted.

Accordingly, if the transfer target candidate station is a mobile relay station (OP21: Yes), the first reselection determining unit 62 determines whether or not the transfer from the currently selected station to the transfer target candidate station (mobile relay station) is possible (OP22). That is, the first reselection determining unit 62 determines whether or not the cell transfer permission/prohibition setting of the currently selected station held in the storing unit 66 is "Permitted".

If the cell transfer permission/prohibition setting of the currently selected station is "Permitted" (OP22: Yes), this means that the currently selected station is the base station and the fixed relay station (Type 1) installed near the boarding/exiting facility for the mobile body. In this case, the first reselection determining unit 62 instructs the reselection executing unit 64 to execute the reselection from the currently selected station to the mobile relay station (transfer target candidate station). The reselection executing unit 64 that has received the instruction executes the reselection from the currently selected station to the mobile relay station (transfer target candidate station) (OP26a). Upon the completion of the reselection, the reselection executing unit 64 updates the mobile relay station connection history in the storing unit 66 with the identification number of the mobile relay station as the transfer target (OP27). Upon the completion of the update of the mobile relay station connection history, the reselection determination process is ended.

If the cell transfer permission/prohibition setting of the currently selected station is "Not Permitted" (OP22: No), this means that the currently selected station is any of: the base station and the fixed relay station (Type 2) other than Type 1; and a mobile relay station. In this case, the permission or prohibition of the reselection is determined depending on whether or not the mobile relay station held in the mobile relay station connection history is coincident with the transfer target candidate station (see FIG. 2). Accordingly, the processing moves from the first reselection determining unit 62 to the second reselection determining unit 63, and the second reselection determining unit 63 refers to the mobile relay station connection history in the storing unit 66. The second reselection determining unit 63 determines whether or not the mobile relay station held in the mobile relay station connection history is coincident with the transfer target candidate station (OP25).

If the mobile relay station in the mobile relay station connection history is not coincident with the transfer target candidate station (OP25: No), the second reselection determining unit 63 determines the non-permission of the reselection, and stops the reselection determination process (OP24). This ends the reselection determination process.

If the mobile relay station in the mobile relay station connection history is coincident with the transfer target candidate station (OP25: Yes), the second reselection determining unit 63 determines the permission of the reselection, and instructs the reselection executing unit 64 to execute the reselection. The reselection executing unit 64 that has received the instruction executes the reselection from the currently selected station to the mobile relay station (transfer target candidate station) (OP26a). Upon the completion of the reselection, the reselection executing unit 64 updates the mobile relay station connection history in the storing unit 66 with the identification number of the mobile relay station as the transfer target (OP27). Upon the completion of the update of the mobile relay station connection history, the reselection determination process is ended.

Through the process in OP25, for example, the mobile terminal 4B in FIG. 1 can make the reselection from the mobile relay station 2 to the base station 1, and further can make the reselection from the base station 1 to the mobile relay station 2. Note that, in the flow illustrated in FIG. 9, a change of the selected station between mobile relay stations is not permitted, and hence information on a mobile relay station as the transfer target in such a change of the selected station between mobile relay stations is not set to the mobile relay station connection history. For this reason, even in the case where the currently selected station is a mobile relay station and where the transfer target candidate station is another mobile relay station, it is determined in OP22 that the transfer from the selected station is not possible, it is determined in OP25 that the mobile relay station connection history is not coincident with the transfer target candidate station, and the reselection is stopped in OP24. Accordingly, in the flow illustrated in FIG. 9, the reselection from a mobile relay station to another mobile relay station is not executed.

<<Configuration Example of Base Station>>

Figure 10:
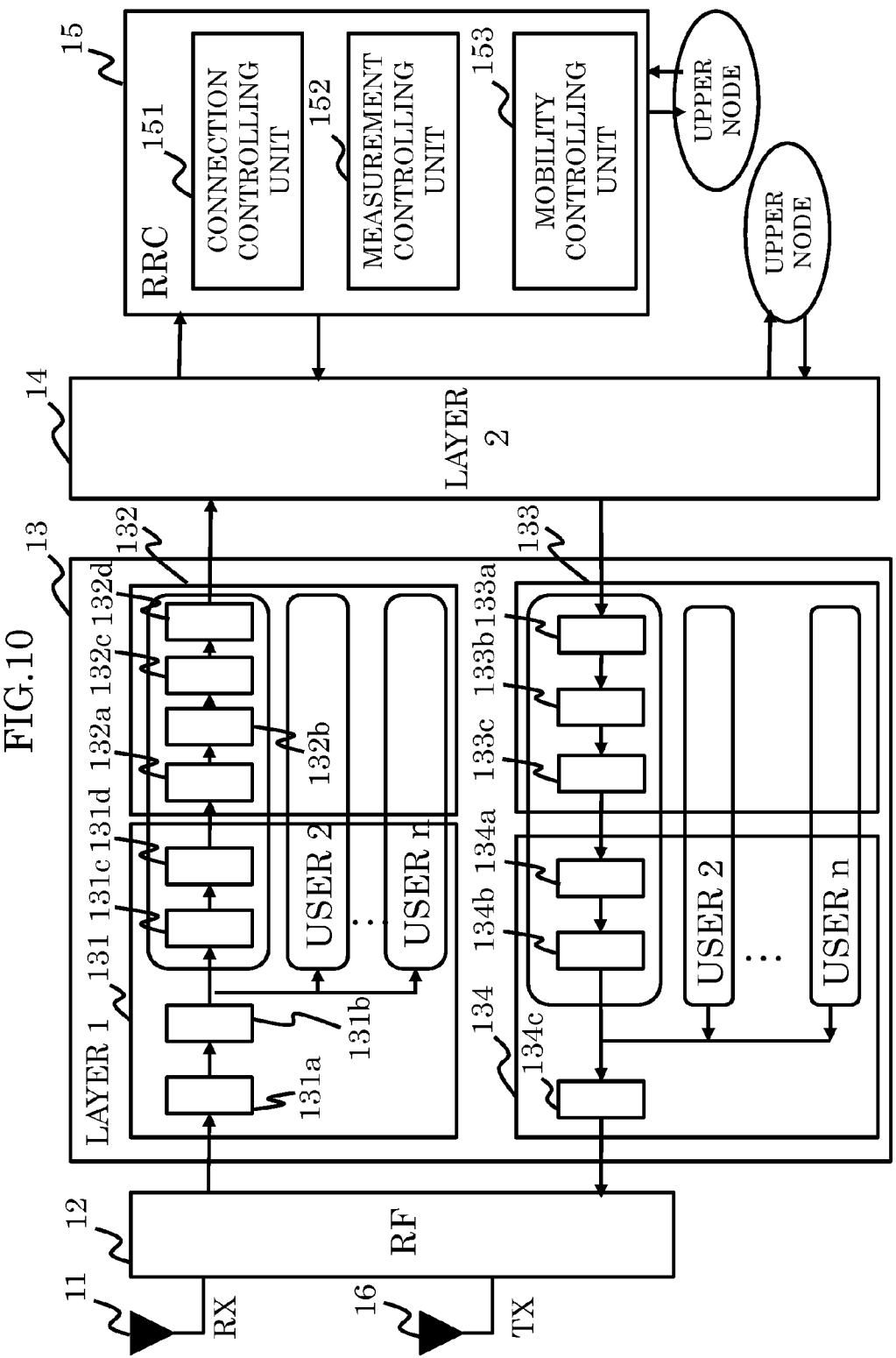
FIG. 10 is a diagram illustrating a configuration example of the base station.

FIG. 10 is a diagram illustrating a configuration example of the base station 1. The base station 1 includes a receiving antenna 11, a radio unit 12, a layer 1 processing unit 13, a layer 2 processing unit 14, a radio resource controlling unit 15, and a transmitting antenna 16. The layer 1 processing unit 13 includes a demodulating unit 131, a decoding unit 132, a coding unit 133, and a modulating unit 134. The demodulating unit 131 includes an FFT unit 131a, a subcarrier demapping unit 131b, an IDFT (Inverse DFT) unit 131c, and a demodulation executing unit 131d. The decoding unit 132 includes a de-rate matching unit 132a, an HARQ combining unit 132b, a turbo decoding unit 132c, and a CRC unit 132d. The coding unit 133 includes a CRC adding unit 133a, a turbo coding unit 133b, and a rate matching unit 133c. The modulating unit 134 includes a modulation executing unit 134a, a subcarrier mapping unit 134b, and an IFFT unit 134c. The radio resource controlling unit 15 includes a connection controlling unit 151, a measurement controlling unit 152, and a mobility controlling unit 153. These units are each implemented by software components or hardware components or by the combination thereof (see the section [Others]).

The processing units of the base station 1 perform processes similar to those of the corresponding processing units (see FIG. 5) with the same names of the mobile terminal 4, and hence description of the processing units is omitted. In the base station 1, unlike the mobile terminal 4, users are multiplexed by the subcarrier mapping unit 134b located before the input of the IFFT unit 134c located before transmission of physical channel data. Meanwhile, on the reception side of physical channel data, users are separated by the subcarrier demapping unit 131b. A set of the IDFT unit 131c, the demodulation executing unit 131d, the de-rate matching unit 132a, the HARQ combining unit 132b, the turbo decoding unit 132c, and the CRC unit 132d is provided for each user. Similarly, a set of the CRC adding unit 133a, the turbo coding unit 133b, the rate matching unit 133c, the modulation executing unit 134a, and the subcarrier mapping unit 134b is provided for each user. In the base station 1, data is subjected to a coding process and a modulation process and to a demodulation process and a decoding process on a user basis. In addition, the base station 1 is connected to an upper node.

Figure 11:
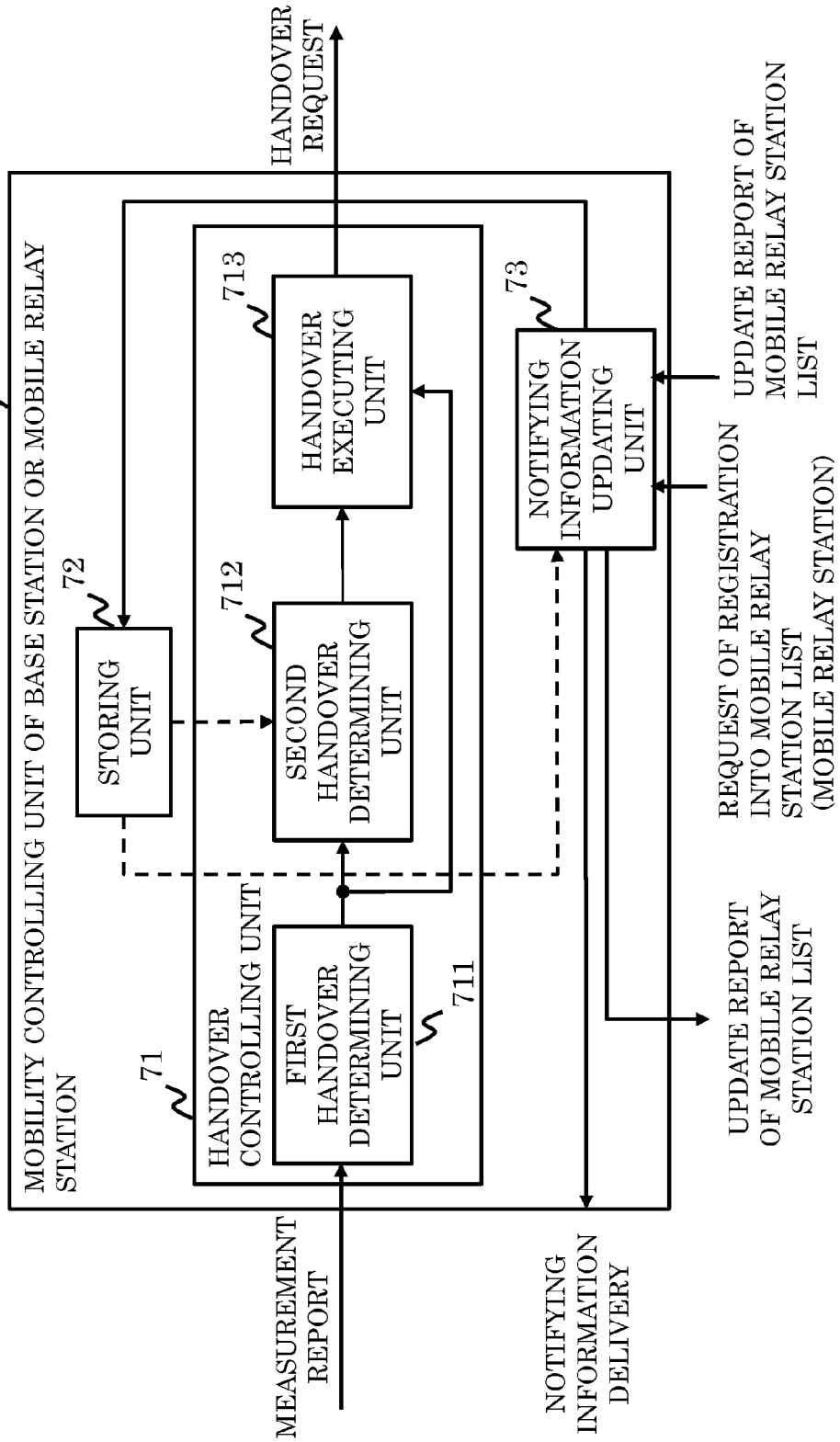
FIG. 11 is a diagram illustrating a configuration example of mobility controlling units of the base station and the fixed relay station.

FIG. 11 is a diagram illustrating a configuration example of the mobility controlling unit 153 of the base station 1. The mobility controlling unit 153 of the base station 1 includes a handover controlling unit 71, a storing unit 72, and a notifying information updating unit 73.

The notifying information updating unit 73 updates notifying information for reporting information on neighboring base stations to the mobile terminal 4, and delivers the updated information to the mobile terminal 4. The notifying information updating unit 73 delivers, to the mobile terminal, the notifying information including: the identification number of its own station; information on stations in neighboring cells including the cell in which the mobile terminal 4 is located; the cell transfer permission/prohibition setting of each station; and the mobile relay station list. The information on the base stations in the neighboring cells is, for example, used frequency of each station. In addition, the notifying information updating unit 73 updates the mobile relay station list when receiving a request of registration into the mobile relay station list from the mobile relay station or receiving an update report of the mobile relay station list from another station. The notifying information updating unit 73 updates the notifying information including the updated mobile relay station list, and delivers the updated information to the mobile terminal. At the same time, the notifying information updating unit 73 delivers the update report of the mobile relay station list to base stations and fixed relay stations under the base station 1. Each time the notifying information is updated, the notifying information updating unit 73 stores the updated notifying information into the storing unit 72.

The storing unit 72 holds the type of its own station, the cell transfer permission/prohibition setting of its own station, the mobile relay station list, components of the notifying information and the like. The type of its own station held in the storing unit 72 is information for identifying which of the base station, the fixed relay station, and the mobile relay station its own station is.

The handover controlling unit 71 controls the handover of the mobile terminal 4. The handover controlling unit 71 includes a first handover determining unit 711, a second handover determining unit 712, and a handover executing unit 713.

When the first handover determining unit 711 receives a measurement report that triggers the handover from the mobile terminal 4 that connects to its own station as the selected station through the layer 2 processing unit 14, the first handover determining unit 711 starts a handover determination process. The first handover determining unit 711 determines whether or not the transfer target candidate station of the mobile terminal 4 that is a transmission source of the measurement report is a mobile relay station, and determines the permission or prohibition of the handover from its own station as the currently selected station to the transfer target candidate station. As a result of the determination, if the handover from its own station to the transfer target candidate station is possible, the first handover determining unit 711 instructs the handover executing unit 713 to execute the handover.

In the case where the handover is not permitted by the first handover determining unit 711, the second handover determining unit 712 determines the permission or prohibition of the handover on the basis of the mobile relay station connection history of the mobile terminal 4 included in the measurement report. As a result of the determination, if the mobile terminal 4 can make the handover from its own station to the transfer target candidate station, the second handover determining unit 712 instructs the handover executing unit 713 to execute the handover.

Upon the reception of the instruction to execute the handover to the transfer target candidate station from the first handover determining unit 711 and the second handover determining unit 712, the handover executing unit 713 executes the handover to the transfer target candidate station. The handover executing unit 713 transmits, to the transfer target candidate station, a handover request for requesting the execution of the handover of the mobile terminal 4 that is a transmission source of the measurement report. If a handover request ACK as a response is returned from the transfer target candidate station, the handover executing unit 713 transmits a handover command for giving an instruction to execute the handover, to the mobile terminal 4 that is a request source of the handover.

The first handover determining unit 711 and the second handover determining unit 712 correspond to the "determining unit" according to one of the aspects of the present invention.

Figure 12:
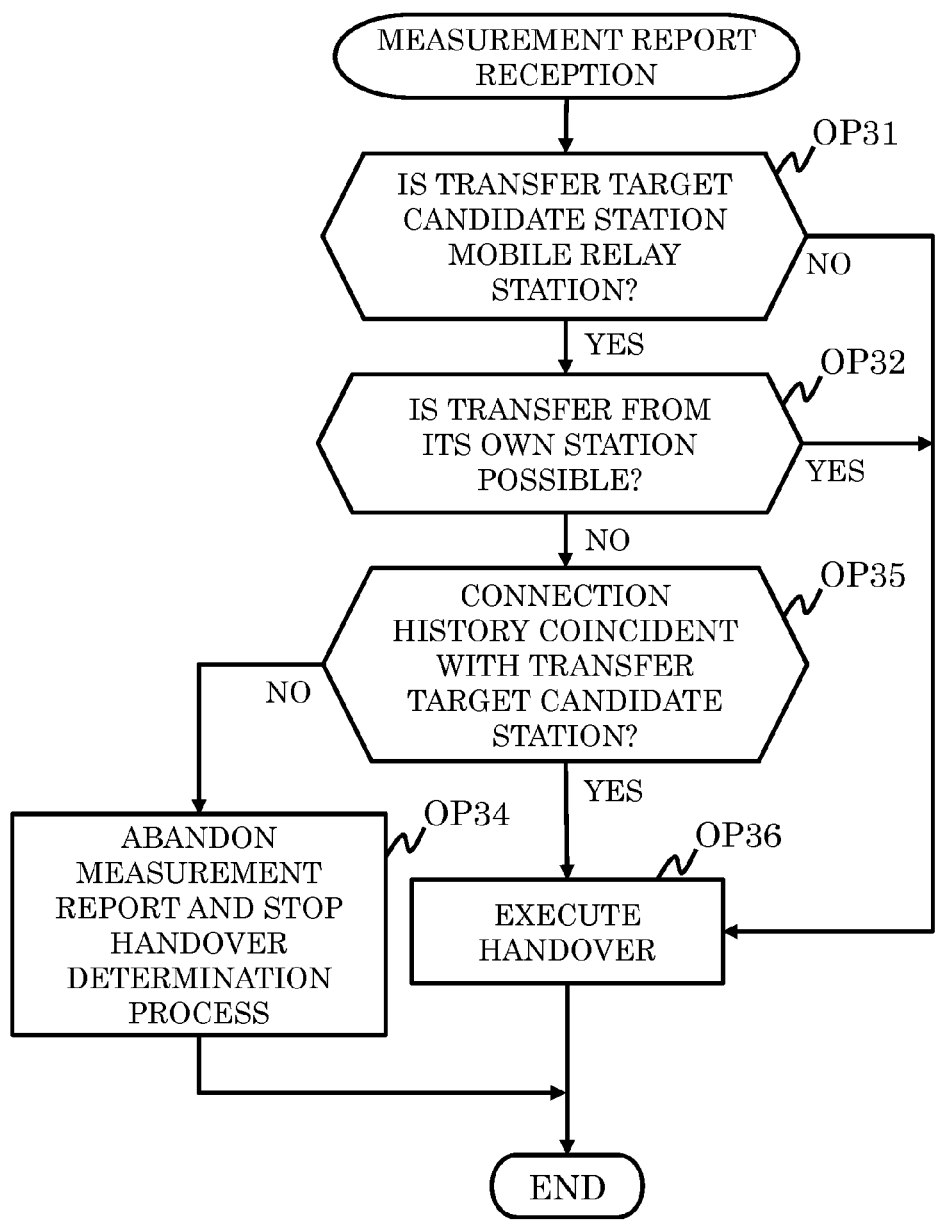
FIG. 12 is a diagram illustrating a flow example of a handover determination process of the base station.

FIG. 12 is a diagram illustrating a flow example of the handover determination process of the base station 1. Upon the reception of a measurement report from the mobile terminal 4 that connects to its own station as the selected station, the base station 1 starts the handover determination process.

The first handover determining unit 711 determines whether or not the transfer target candidate station of the mobile terminal 4 included in the measurement report is a mobile relay station (OP31). The first handover determining unit 711 compares the mobile relay station list held in the storing unit 72 with the identification number of the transfer target candidate station included in the measurement report, to thereby determine whether or not the transfer target candidate station is a mobile relay station.

If the transfer target candidate station is not a mobile relay station (OP31: No), the handover of the mobile terminal 4 from its own station (base station 1) to the transfer target candidate station is permitted (see FIG. 2). The first handover determining unit 711 instructs the handover executing unit 713 to execute the handover to the transfer target candidate station of the mobile terminal 4. The handover executing unit 713 that has received the instruction executes the handover to the transfer target candidate station of the mobile terminal 4 (OP36). A detailed process in OP36 by the handover executing unit 713 is as follows. The handover executing unit 713 transmits a handover request for requesting the handover, to the transfer target candidate station of the mobile terminal 4. If a handover request ACK as a response is returned from the transfer target candidate station of the mobile terminal 4, the handover executing unit 713 transmits a handover command for giving an instruction to execute the handover, to the mobile terminal 4, and ends the handover determination process.

If the transfer target candidate station is a mobile relay station (OP31: Yes), the handover to the mobile relay station as the transfer target candidate station is restricted depending on the type of the currently selected station of the mobile terminal 4 (see FIG. 2).

Accordingly, if the transfer target candidate station is a mobile relay station (OP31: Yes), the first handover determining unit 711 determines whether or not the transfer from its own station as the currently selected station of the mobile terminal 4 to the transfer target candidate station (mobile relay station) is possible (OP32). That is, the first handover determining unit 711 determines whether or not the cell transfer permission/prohibition setting of its own station held in the storing unit 72 is "Permitted".

If the cell transfer permission/prohibition setting of its own station as the currently selected station of the mobile terminal 4 is "Permitted" (OP32: Yes), the handover to the mobile relay station as the transfer target candidate station of the mobile terminal 4 is permitted. Note that, in the case where its own station is the base station (Type 1) installed near the boarding/exiting facility for the mobile body, the cell transfer permission/prohibition setting is set to "Permitted". In this case, the first handover determining unit 711 instructs the handover executing unit 713 to execute the handover from its own station to the mobile relay station (transfer target candidate station). The handover executing unit 713 that has received the instruction executes the handover from its own station to the mobile relay station (transfer target candidate station) (OP36).

If the cell transfer permission/prohibition setting of its own station is "Not Permitted" (OP32: No), this means that its own station is the base station (Type 2) other than Type 1 or a mobile relay station. In this case, the permission or prohibition of the handover is determined depending on whether or not the mobile relay station held in the mobile relay station connection history of the mobile terminal 4 is coincident with the transfer target candidate station (see FIG. 2). Accordingly, the processing moves from the first handover determining unit 711 to the second handover determining unit 712, and the second handover determining unit 712 refers to the mobile relay station connection history of the mobile terminal 4 included in the measurement report.

The second handover determining unit 712 determines whether or not the mobile relay station held in the mobile relay station connection history is coincident with the transfer target candidate station (OP35).

If the mobile relay station held in the mobile relay station connection history of the mobile terminal 4 is not coincident with the transfer target candidate station (OP35: No), the second handover determining unit 712 determines the non-permission of the handover, and stops the handover determination process (OP34). This ends the handover determination process.

If the mobile relay station held in the mobile relay station connection history of the mobile terminal 4 is coincident with the transfer target candidate station (OP35: Yes), the second handover determining unit 712 determines the permission of the handover, and instructs the handover executing unit 713 to execute the handover. The handover executing unit 713 that has received the instruction executes the handover from its own station to the mobile relay station (transfer target candidate station) (OP36).

Through the process in OP35, for example, the mobile terminal 4B in FIG. 1 can make the handover from the mobile relay station 2 to the base station 1, and further can make the handover from the base station 1 back to the mobile relay station 2.

<<Configuration Example of Fixed Relay Station>>

Figure 13:
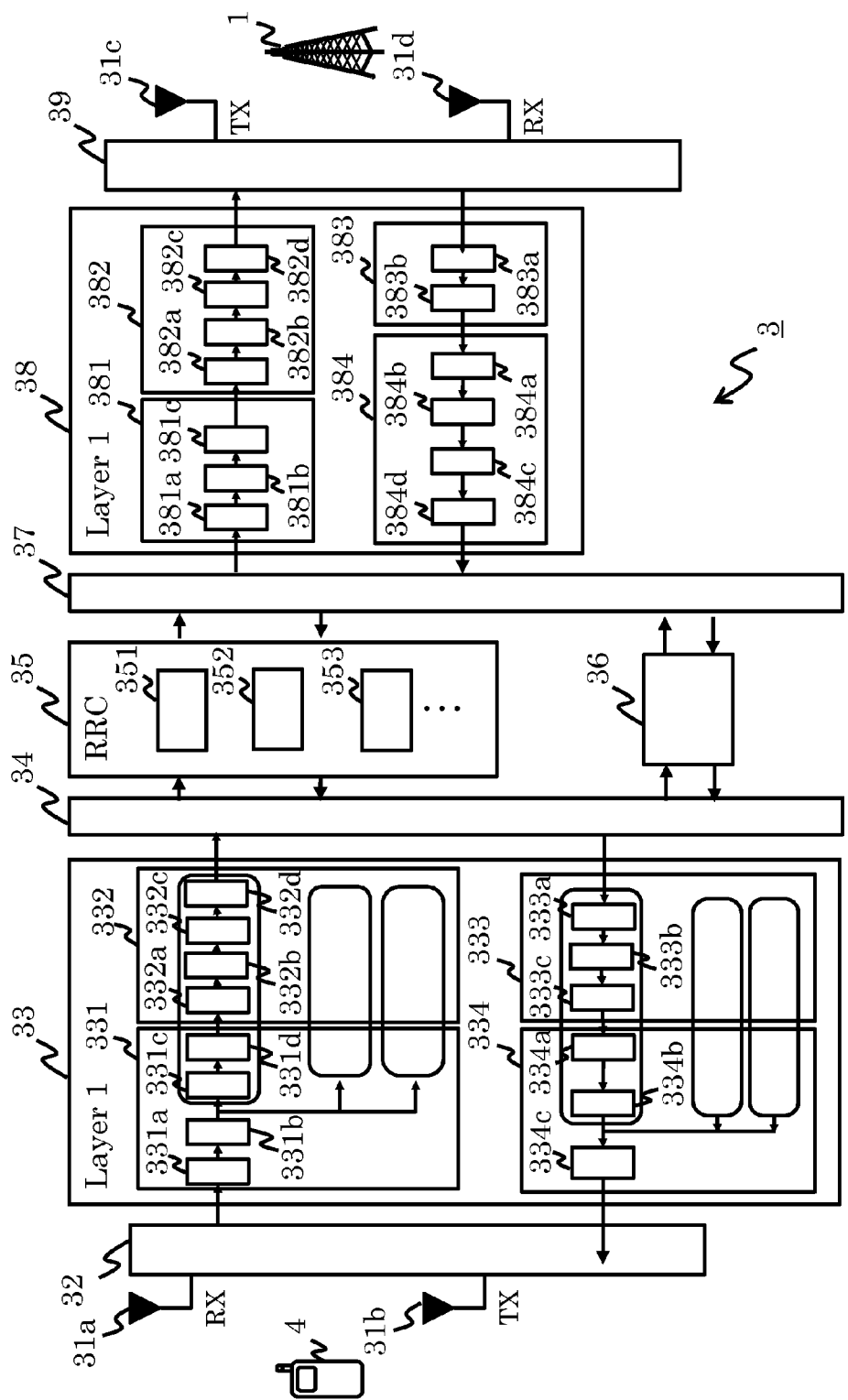
FIG. 13 is a diagram illustrating a configuration example of the fixed relay station.

FIG. 13 is a diagram illustrating a configuration example of the fixed relay station 3. The fixed relay station 3 is wirelessly connected to the mobile terminal 4 and the base station 1. A connection method between the fixed relay station 3 and the mobile terminal 4 is the same as a connection method between the base station 1 and the mobile terminal 4. A connection method between the fixed relay station 3 and the base station 1 is the same as the connection method between the mobile terminal 4 and the base station 1 assuming that the fixed relay station 3 behaves like the mobile terminal 4 with respect to the base station 1. Accordingly, the fixed relay station 3 has the configuration of the base station 1 and the configuration of the mobile terminal 4.

The fixed relay station 3 includes receiving antennas 31a and 31d, transmitting antennas 31b and 31c, radio units 32 and 39, layer 1 processing units 33 and 38, layer 2 processing units 34 and 37, a radio resource controlling unit 35, and a data reconstructing unit 36. These units are each implemented by software components or hardware components or by the combination thereof (see the section [Others]).

The layer 1 processing unit 33 includes a demodulating unit 331, a decoding unit 332, a coding unit 333, and a modulating unit 334. The demodulating unit 331 includes an FFT unit 331a, a subcarrier mapping unit 331b, an IDFT unit 331c, and a demodulation executing unit 331d. The decoding unit 332 includes a de-rate matching unit 332a, an HARQ combining unit 332b, a turbo decoding unit 332c, and a CRC unit 332d. The coding unit 333 includes a CRC adding unit 333a, a turbo coding unit 333b, and a rate matching unit 333c. The modulating unit 334 includes a modulation executing unit 334a, a subcarrier mapping unit 334b, and an IFFT unit 334c.

A set of the IDFT unit 331c, the demodulation executing unit 331d, the de-rate matching unit 332a, the HARQ combining unit 332b, the turbo decoding unit 332c, and the CRC unit 332d is provided for each user. Similarly, a set of the CRC adding unit 333a, the turbo coding unit 333b, the rate matching unit 333c, the modulation executing unit 334a, and the subcarrier mapping unit 334b is provided for each user.

The radio resource controlling unit 35 includes a connection controlling unit 351, a measurement controlling unit 352, and a mobility controlling unit 353.

The layer 1 processing unit 38 includes a coding unit 381, a modulating unit 382, a demodulating unit 383, and a decoding unit 384. The coding unit 381 includes a CRC adding unit 381a, a turbo coding unit 381b, and a rate matching unit 381c. The modulating unit 382 includes a modulation executing unit 382a, a DFT unit 382b, a subcarrier mapping unit 382c, and an IFFT unit 382d. The demodulating unit 383 includes an FFT unit 383a and a demodulation executing unit 383b.

The decoding unit 384 includes a de-rate matching unit 384a, an HARQ combining unit 384b, a turbo decoding unit 384c, and a CRC unit 384d.

The processing units included in the fixed relay station 3 perform processes similar to those of the corresponding processing units with the same names of the mobile terminal 4 (see FIG. 5) and the base station 1 (see FIG. 10), and hence description of the processing units is omitted.

The fixed relay station 3 includes the data reconstructing unit 36. In the case where the fixed relay station 3 relays pieces of data transmitted from the mobile terminals 4 to the base station 1, the fixed relay station 3 collectively transmits the pieces of data from a plurality of users (the plurality of mobile terminals 4). In the case where the fixed relay station 3 relays pieces of data transmitted from the base station 1 to the mobile terminals 4 under the fixed relay station 3, the fixed relay station 3 separates and processes the pieces of data for each mobile terminal 4. Accordingly, in the case of relaying the pieces of data transmitted from the mobile terminals 4 to the base station 1, the data reconstructing unit 36 performs data reconstruction for putting together the pieces of data from the plurality of users. In addition, in the case of relaying the pieces of data transmitted from the base station 1 to the mobile terminals 4, the data reconstructing unit 36 performs data reconstruction for separating the pieces of data for each mobile terminal 4.

The configuration of the mobility controlling unit 353 of the fixed relay station 3 is the same as that of the mobility controlling unit 153 of the base station 1 illustrated in FIG. 11, and the fixed relay station 3 executes the handover determination process illustrated in FIG. 12 similarly to the base station 1.

<<Configuration Example of Mobile Relay Station>>

Figure 14:
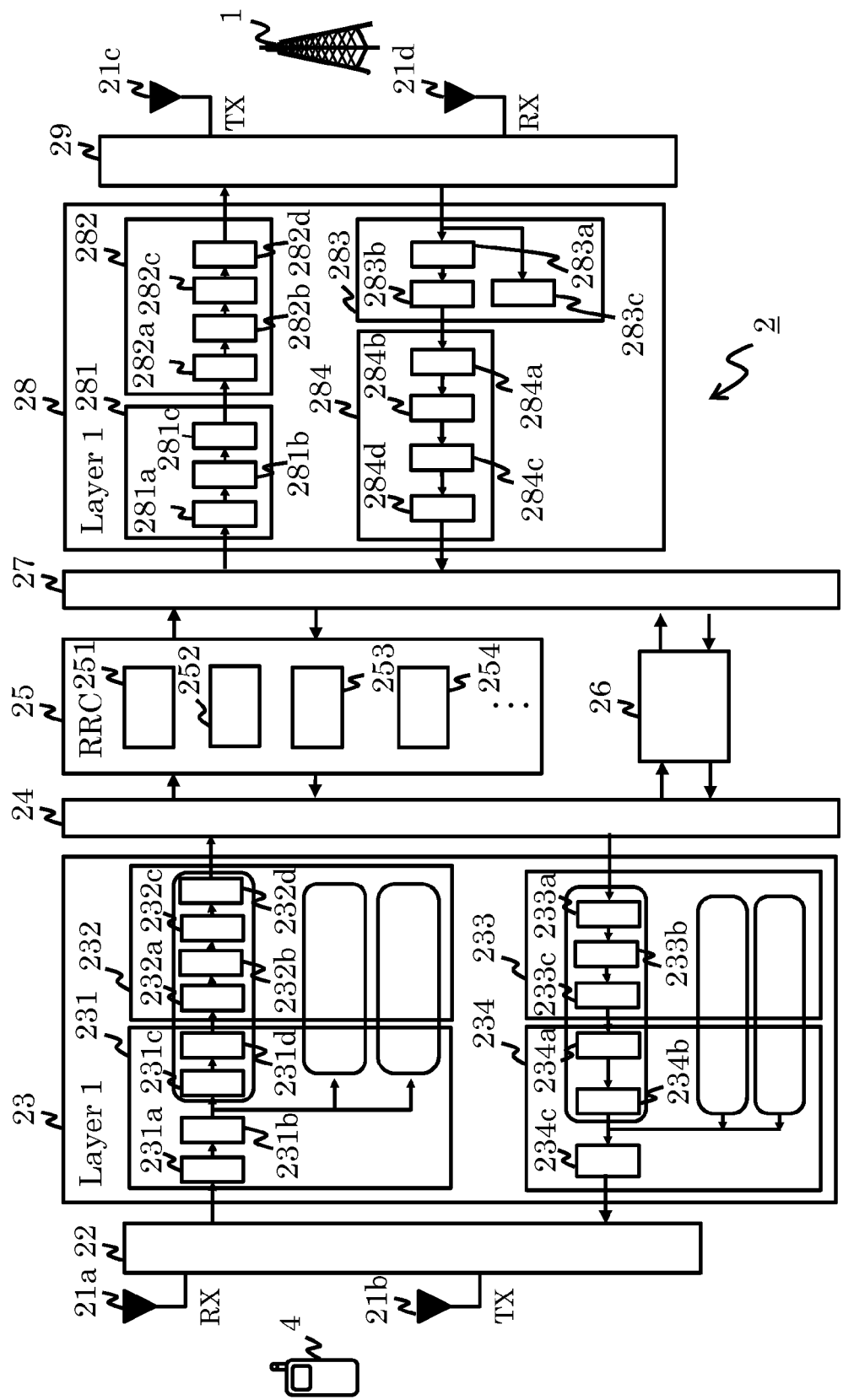
FIG. 14 is a diagram illustrating a configuration example of the mobile relay station.

FIG. 14 is a diagram illustrating a configuration example of the mobile relay station 2. Because the mobile relay station 2 itself makes a cell transfer, the mobile relay station 2 includes: a measuring unit 283c that measures neighboring cells; and a mobility controlling unit 254 that controls the cell transfer of the mobile relay station 2 itself. Except that, the configuration of the mobile relay station 2 is the same as that of the fixed relay station 3.

The mobile relay station 2 includes receiving antennas 21a and 21d, transmitting antennas 21b and 21c, radio units 22 and 29, layer 1 processing units 23 and 28, layer 2 processing units 24 and 27, a radio resource controlling unit 25, and a data reconstructing unit 26.

The layer 1 processing unit 23 includes a demodulating unit 231, a decoding unit 232, a coding unit 233, and a modulating unit 234. The demodulating unit 231 includes an FFT unit 231a, a subcarrier mapping unit 231b, an IDFT unit 231c, and a demodulation executing unit 231d. The decoding unit 232 includes a de-rate matching unit 232a, an HARQ combining unit 232b, a turbo decoding unit 232c, and a CRC unit 232d. The coding unit 233 includes a CRC adding unit 233a, a turbo coding unit 233b, and a rate matching unit 233c. Further, the modulating unit 234 includes a modulation executing unit 234a, a subcarrier mapping unit 234b, and an IFFT unit 234c.

A set of the IDFT unit 231c, the demodulation executing unit 231d, the de-rate matching unit 232a, the HARQ combining unit 232b, the turbo decoding unit 232c, and the CRC unit 232d is provided for each user. Similarly, a set of the CRC adding unit 233a, the turbo coding unit 233b, the rate matching unit 233c, the modulation executing unit 234a, and the subcarrier mapping unit 234b is provided for each user.

The radio resource controlling unit 25 includes a connection controlling unit 251, a measurement controlling unit 252, a mobility controlling unit 253, and the mobility controlling unit 254. The mobility controlling unit 253 controls the handover and the like of the mobile terminal 4 under the mobile relay station. The mobility controlling unit 254 controls the handover and the like of the mobile relay station itself.

The layer 1 processing unit 28 includes a coding unit 281, a modulating unit 282, a demodulating unit 283, and a decoding unit 284. The coding unit 281 includes a CRC adding unit 281a, a turbo coding unit 281b, and a rate matching unit 281c. The modulating unit 282 includes a modulation executing unit 282a, a DFT unit 282b, a subcarrier mapping unit 282c, and an IFFT unit 282d. The demodulating unit 283 includes an FFT unit 283a, a demodulation executing unit 283b, and the measuring unit 283c. The decoding unit 284 includes a de-rate matching unit 284a, an HARQ combining unit 284b, a turbo decoding unit 284c, and a CRC unit 284d.

The processing units other than the mobility controlling units 253 and 254 included in the mobile relay station 2 perform processes similar to those of the corresponding processing units with the same names of the fixed relay station 3 (see FIG. 13), and hence description of the processing units is omitted.

Figure 15:
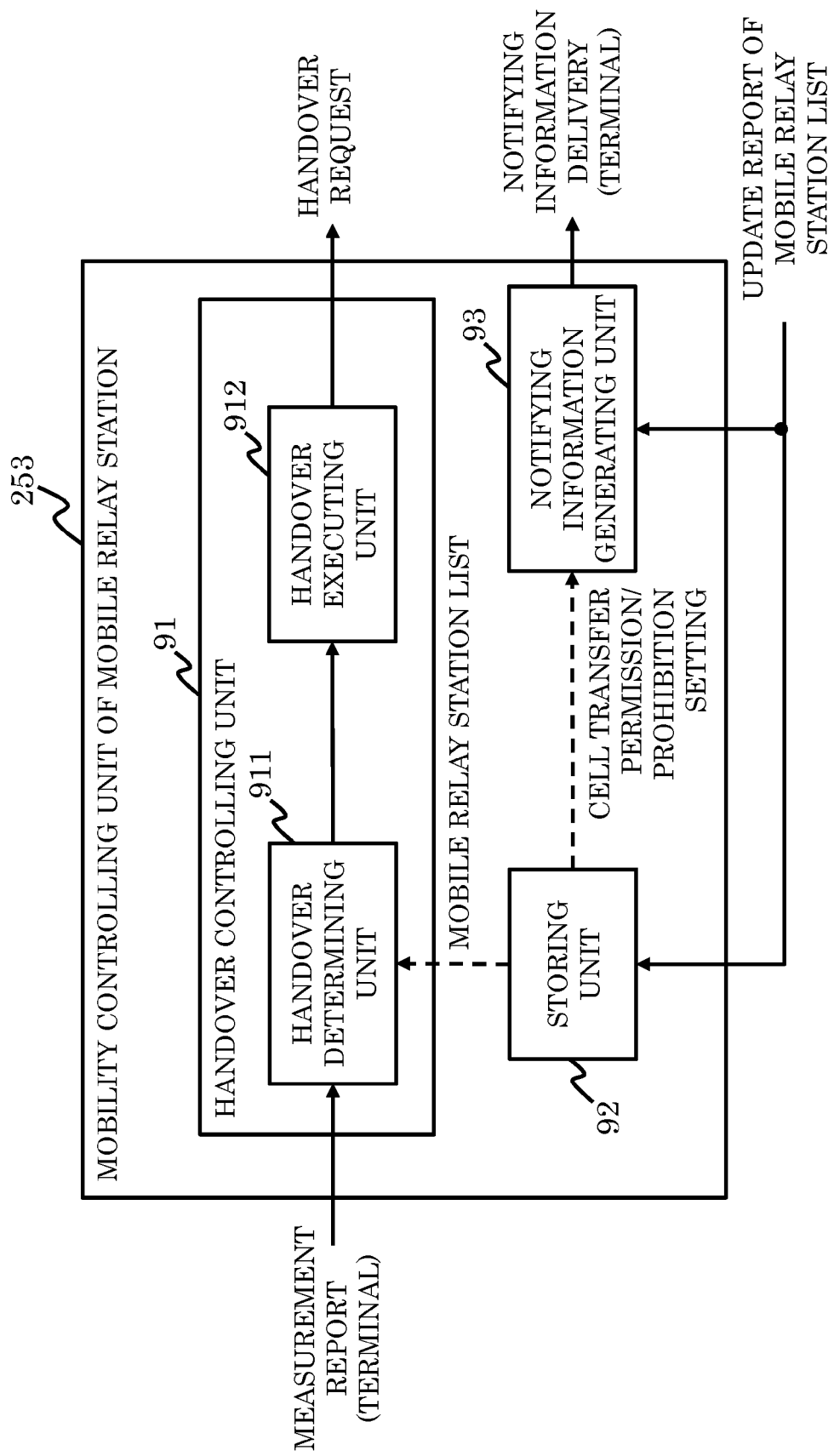
FIG. 15 is a diagram illustrating a configuration example of a mobility controlling unit of the mobile relay station.

FIG. 15 is a diagram illustrating a configuration example of the mobility controlling unit 253 of the mobile relay station 2. The mobility controlling unit 253 of the mobile relay station 2 includes a handover controlling unit 91, a storing unit 92, and a notifying information generating unit 93.

The storing unit 92 holds the identification number of its own station, the preset cell transfer permission/prohibition setting of its own station, and the mobile relay station list. "Not Permitted" is set to the cell transfer permission/prohibition setting of the mobile relay station 2 (see FIG. 8).

For example, when receiving the update report of the mobile relay station list from another station, the notifying information generating unit 93 delivers notifying information including the mobile relay station list held in the storing unit 92, to the mobile terminal 4 under the mobile relay station 2.

Upon the reception of a measurement report from the mobile terminal 4 that connects to its own station through the layer 2 processing unit 24, the handover controlling unit 91 executes a process relating to the handover of the mobile terminal 4. The handover controlling unit 91 includes a handover determining unit 911 and a handover executing unit 912.

The handover determining unit 911 determines whether or not the transfer target candidate station of the mobile terminal 4 included in the measurement report is a mobile relay station. If the transfer target candidate station is a mobile relay station, the handover determining unit 911 does not permit the handover of the mobile terminal 4 on the basis of the cell transfer permission/prohibition setting of its own station, abandons the measurement report, and stops the handover determination process. If the transfer target candidate station is not a mobile relay station, the handover determining unit 911 permits the handover of the mobile terminal 4, and instructs the handover executing unit 912 to execute the handover of the mobile terminal 4. The handover determining unit 911 corresponds to the "determining unit" according to one of the aspects of the present invention.

Upon the reception of the instruction to execute the handover of the mobile terminal 4 from the handover determining unit 911, the handover executing unit 912 transmits a handover request for requesting the execution of the handover, to the transfer target candidate station. If a handover request ACK is received from the transfer target candidate station, the handover executing unit 912 transmits a handover command for giving an instruction to execute the handover, to the mobile terminal 4, and ends the handover determination process.

Figure 16:
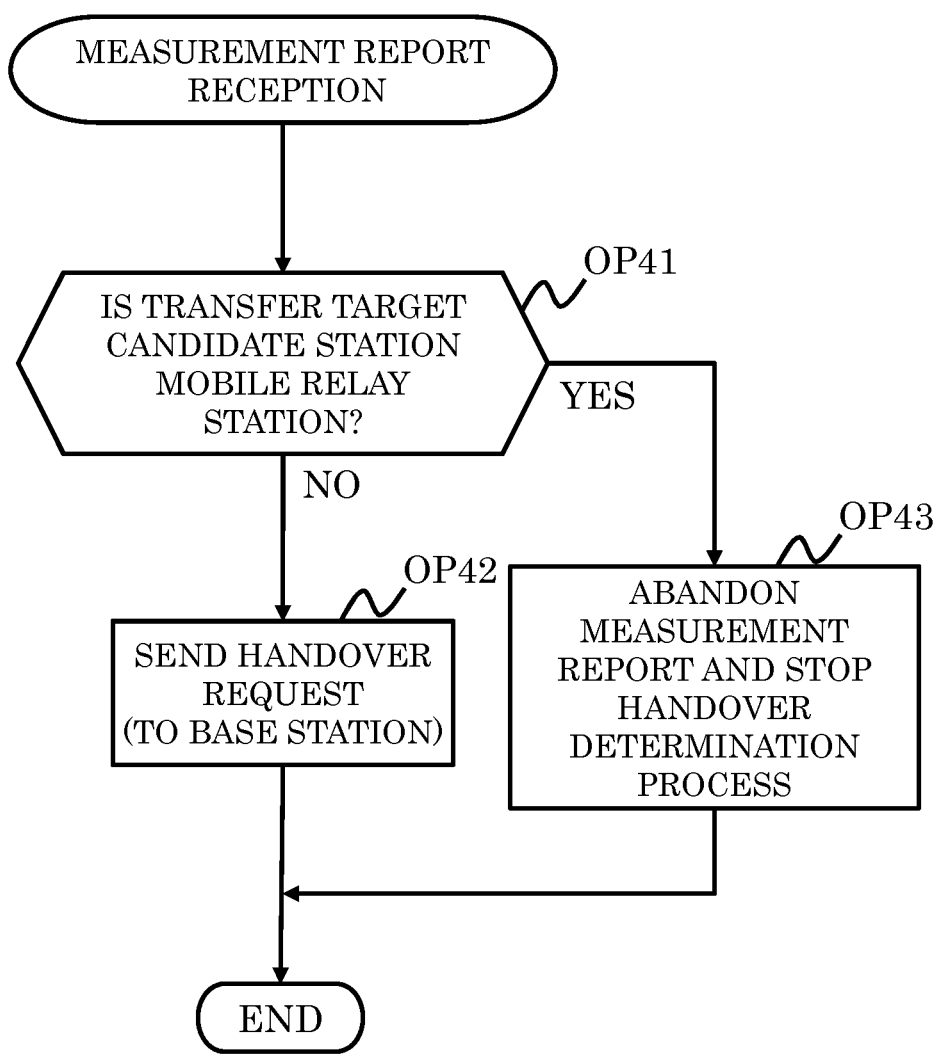
FIG. 16 is a diagram illustrating a flow example of a handover determination process of the mobile relay station.

FIG. 16 is a diagram illustrating a flow example of the handover determination process of the mobile relay station 2. Upon the reception of the measurement report from the mobile terminal 4 that connects to its own station, the mobile relay station 2 starts the handover determination process.

The handover determining unit 911 of the mobile relay station 2 determines whether or not the transfer target candidate station of the mobile terminal 4 included in the measurement report is a mobile relay station (OP41). The handover determining unit 911 compares the mobile relay station list held in the storing unit 92 with the identification number of the transfer target candidate station included in the measurement report, to thereby determine whether or not the transfer target candidate station is a mobile relay station.

If the transfer target candidate station is a mobile relay station (OP41: Yes), the handover from its own station (mobile relay station) is not permitted on the basis of the cell transfer permission/prohibition setting (see FIG. 8). The handover determining unit 911 abandons the measurement report, and stops the handover determination process (OP43).

If the transfer target candidate station is not a mobile relay station (OP41: No), the handover from its own station is permitted. The handover determining unit 911 instructs the handover executing unit 912 to execute the handover to the transfer target candidate station. Upon the reception of the instruction, the handover executing unit 912 transmits a handover request for requesting the handover, to the transfer target candidate station (OP42). If a handover request ACK is received from the transfer target candidate station, the handover executing unit 912 transmits a handover command to the mobile terminal 4, and thus gives an instruction to execute the handover. This ends the handover determination process.

<Registration Process of Mobile Relay Station into Mobile Relay Station List>

Figure 17:
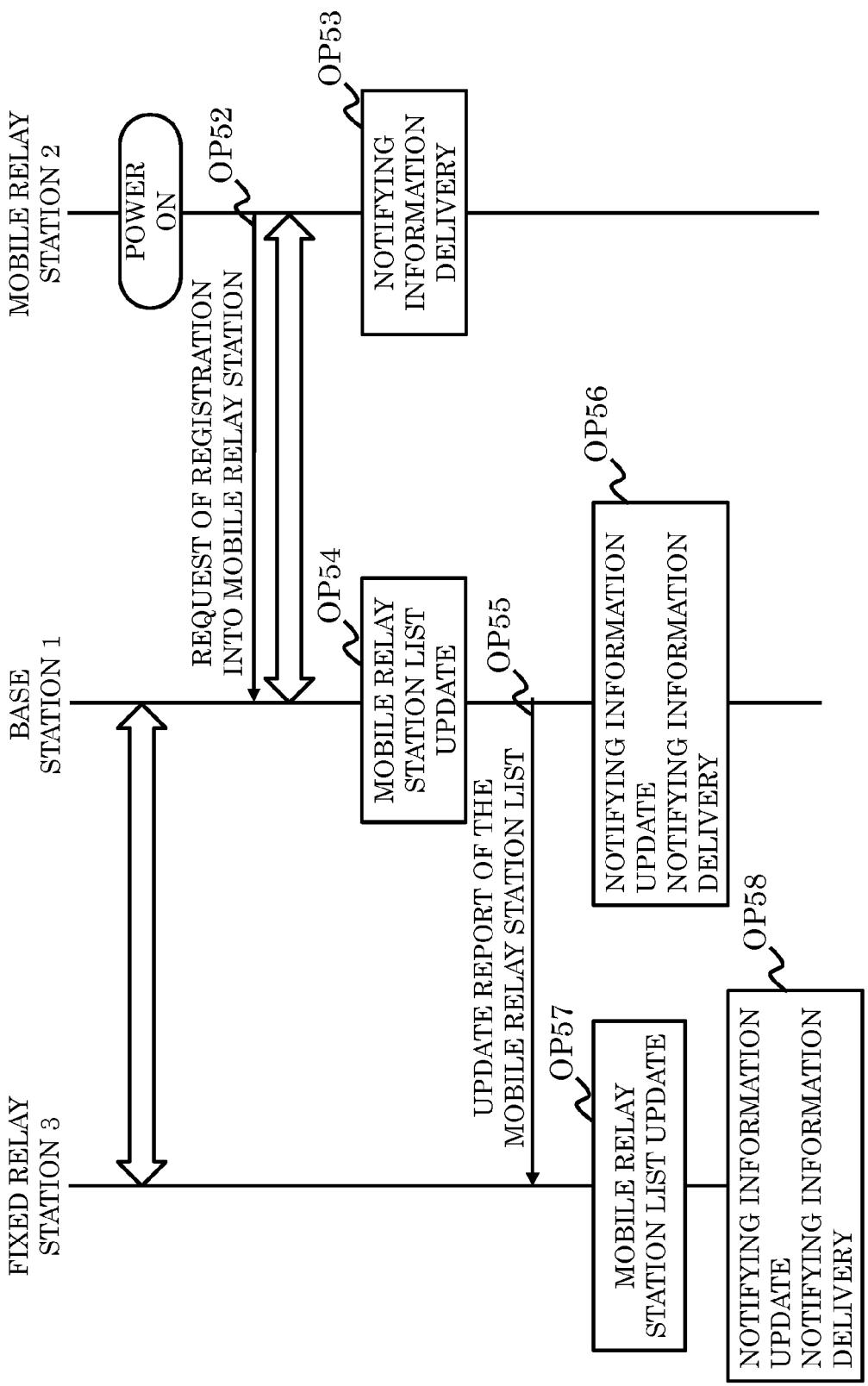
FIG. 17 is a diagram illustrating an example of a registration process of a mobile relay station into a mobile relay station list in the example illustrated in FIG. 1, the registration process being performed when the mobile relay station is newly added.

FIG. 17 is a diagram illustrating an example of a registration process of the mobile relay station 2 into the mobile relay station list in the example illustrated in FIG. 1, the registration process being performed when the mobile relay station 2 is newly added. In the example illustrated in FIG. 1, it is assumed that the fixed relay station 3 is under the base station 1. It is also assumed that the mobile relay station 2 is powered on in the cell of the base station 1.

When the mobile relay station 2 is powered on, the mobile relay station 2 detects the base station 1 as an upper station to which its own station is to connect. The radio resource controlling unit 25 of the mobile relay station 2 transmits a registration request of the mobile relay station list to the base station 1 (OP52). The registration request of the mobile relay station list includes the identification number and the cell transfer permission/prohibition setting of its own station.

The notifying information generating unit 93 of the mobile relay station 2 generates notifying information including the mobile relay station list held in the storing unit 92, and delivers the notifying information to the mobile terminal 4 under the mobile relay station 2 (OP53).

Upon the reception of the registration request of the mobile relay station list, the notifying information updating unit 73 of the base station 1 registers the identification number of the mobile relay station 2 into the mobile relay station list, and thus updates the mobile relay station list (OP54).

Upon the completion of the update of the mobile relay station list, the notifying information updating unit 73 of the base station 1 transmits an update report of the mobile relay station list to stations including the fixed relay station 3 under the base station 1 (OP55). The update report of the mobile relay station list is a message for reporting information on the additionally registered mobile relay station 2 to the stations under the base station 1. The notifying information updating unit 73 of the base station 1 updates the notifying information with the updated mobile relay station list, and delivers the updated information to the mobile terminal 4 under the base station 1 (OP56).

The fixed relay station 3 that has received the update report of the mobile relay station list updates the mobile relay station list (OP57). The fixed relay station 3 updates the notifying information with the updated mobile relay station list, and delivers the updated information to the mobile terminal 4 under the fixed relay station 3 (OP58).

In this way, the information on the newly added mobile relay station 2 is delivered through the wireless communication network system 100.

Operation Example 1

Example Case in which Mobile Terminal 4A Makes Handover from Base Station 1 to Mobile Relay Station 2

Figure 18:
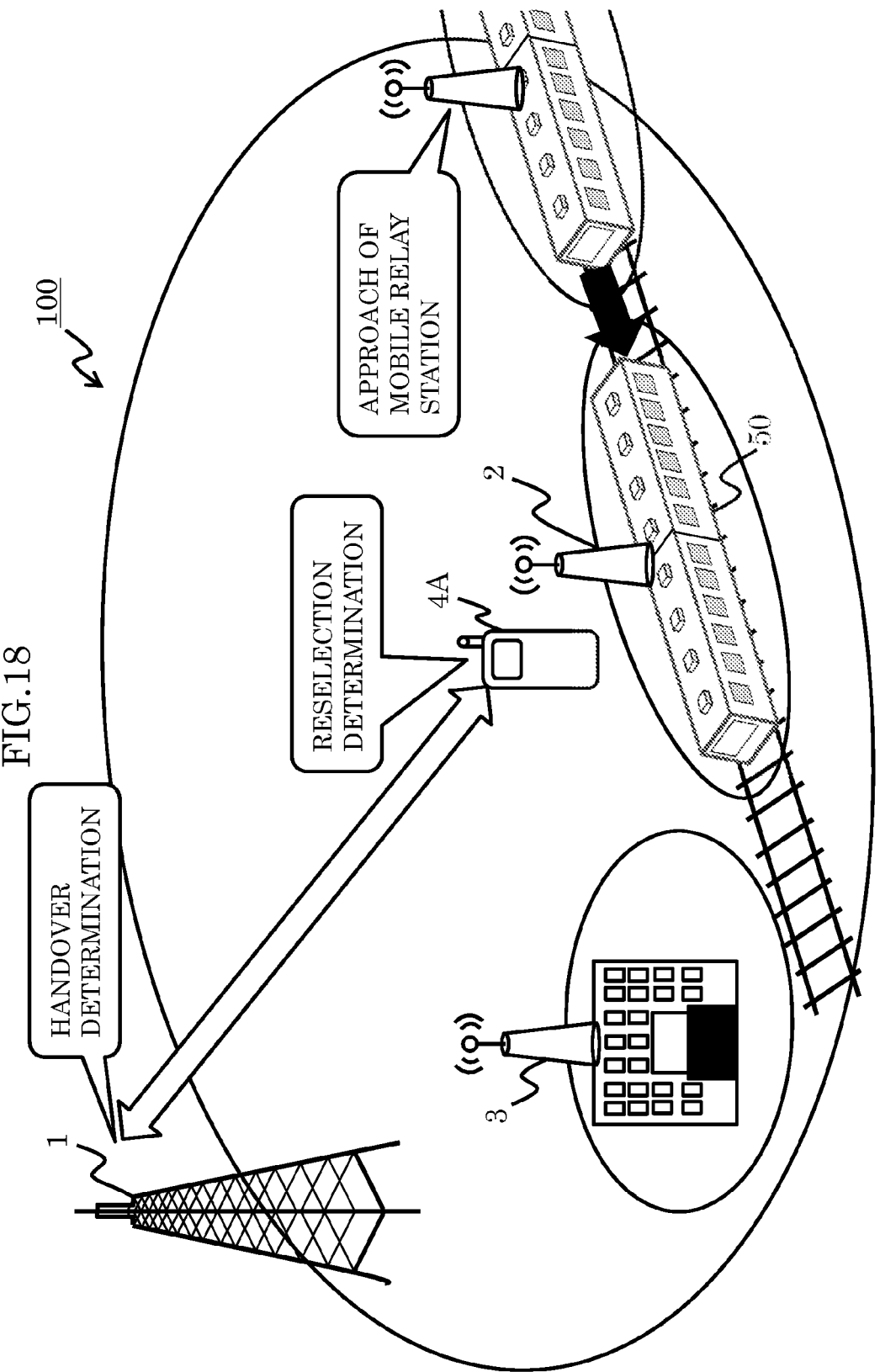
FIG. 18 is a diagram for describing Operation Example 1.

FIG. 18 is a diagram for describing Operation Example 1. Note that a wireless communication network system 100 illustrated in FIG. 18 is similar to the wireless communication network system 100 illustrated in FIG. 1. In FIG. 18, the mobile terminal 4A is located in the cell of the base station 1, and is connecting to the base station 1 to make communication. The mobile relay station 2 is moving in the cell of the base station 1, and relays connection between the mobile terminal located in its own cell and the base station 1.

In Operation Example 1, the following example is described. That is, in reaction to the approach of the mobile relay station 2, the mobile terminal 4A that is connecting to the base station 1 to make communication transmits a request of the handover to the mobile relay station 2, and the base station 1 determines the permission or prohibition of the handover of the mobile terminal 4A. In the wireless communication network system 100, the handover of the mobile terminal 4A from the base station 1 to the mobile relay station is prohibited, and hence the base station 1 does not permit the handover of the mobile terminal 4A to the mobile relay station.

Figure 19:
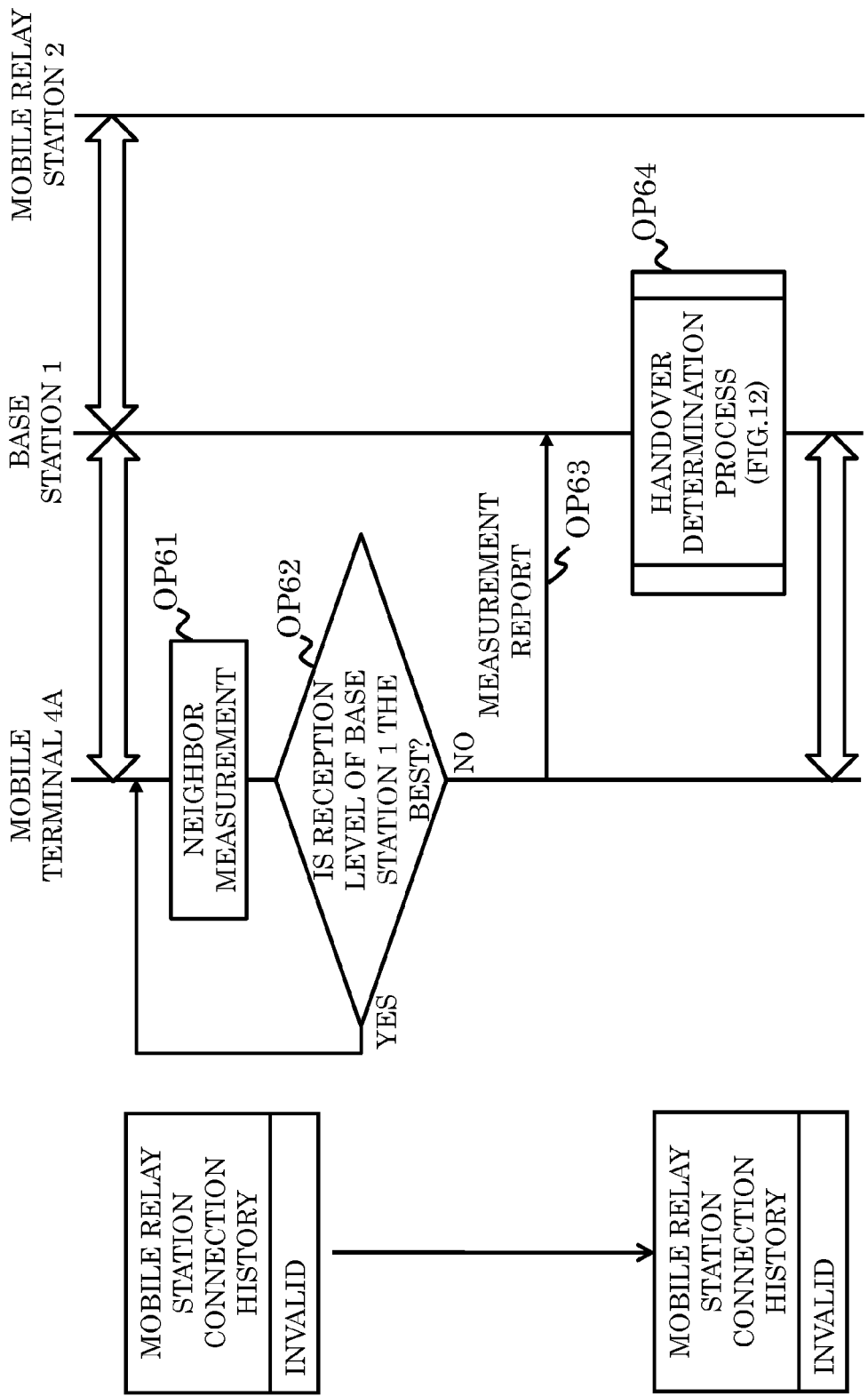
FIG. 19 is a diagram illustrating a flow of Operation Example 1.

FIG. 19 is a diagram illustrating a flow of Operation Example 1. It is assumed that the mobile relay station connection history of the mobile terminal 4A does not have a history of connection to the mobile relay station 2 before the mobile terminal 4A connects to the base station 1, that is, is in its initial state (Invalid).

The mobile terminal 4A detects neighboring stations, and measures the reception quality of a signal from each station (OP61). On the basis of a result of the measurement, the mobile terminal 4A determines whether or not the reception quality of the signal from the base station 1 as the currently selected station is the best (OP62). In FIG. 18, when the mobile relay station 2 approaches the mobile terminal 4A due to the movement of the train 50, the reception quality of the signal from the mobile relay station 2 may become better than that of the signal from the base station 1 in some cases. If the reception quality of the signal from the mobile relay station 2 becomes better, the mobile terminal 4A determines that the reception quality from the mobile relay station 2 is the best (OP62: No).

Because the station having the best reception quality has changed, the mobile terminal 4A transmits a measurement report for requesting the handover, to currently connected the base station 1 (OP63). The measurement report at this time includes: the terminal identification number of the mobile terminal 4A itself; the identification number of the mobile relay station 2 as the transfer target candidate station; and the mobile relay station connection history held by the mobile terminal 4A.

Upon the reception of the measurement report from the mobile terminal 4A, the base station 1 executes the handover determination process of the mobile terminal 4A (OP64). The handover determination process of the base station 1 according to Operation Example 1 is performed in the following manner with reference to FIG. 12.

The base station 1 (first handover determining unit 711) determines whether or not the transfer target candidate station is a mobile relay station, on the basis of the measurement report received from the mobile terminal 4A (FIG. 12, OP31). Because the transfer target candidate station is the mobile relay station 2 (FIG. 12, OP31: Yes), the processing proceeds to OP32.

The base station 1 (first handover determining unit 711) determines whether or not the handover from its own station to the mobile relay station 2 is possible, on the basis of the cell transfer permission/prohibition setting of its own station (FIG. 12, OP32). The base station 1 is a base station installed in a location other than the boarding/exiting facility (train station) on the route of the train 50, and hence the cell transfer permission/prohibition setting of the base station 1 is "Not Permitted" (see FIG. 8). Accordingly, the handover from the base station 1 to the mobile relay station 2 is not permitted (FIG. 12, OP32: No), and the processing proceeds to OP35.

The base station 1 (second handover determining unit 712) determines whether or not the mobile terminal 4A has ever connected to the mobile relay station as the transfer target candidate, on the basis of the mobile relay station connection history contained in the measurement report (FIG. 12, OP35). Because the mobile relay station connection history of the mobile terminal 4A does not have a history of connection to the mobile relay station (FIG. 12, OP35: No), the base station 1 abandons the measurement report, and ends the handover determination process (FIG. 12, OP34).

Accordingly, as a result of the handover determination process of the base station 1, the handover of the mobile terminal 4A from the base station 1 to the mobile relay station 2 is not permitted, and the mobile terminal 4A does not execute the handover, and continues the communication while keeping the connection to the base station 1. The mobile relay station connection history of the mobile terminal 4A remains in its initial state (Invalid) because the handover has not been executed.

In this way, it is possible to prevent the mobile terminal 4A from making the handover: from the base station 1 to which to the mobile terminal 4A can be stably connected; to the mobile relay station 2. As a result, an instant interruption of communication of the mobile terminal 4A can be avoided, the network load can be reduced, and efficient communication can be provided.

Operation Example 2

Example Case in which Mobile Terminal 4B Makes Handover in Order of Mobile Relay Station 2→Base Station 1→Mobile Relay Station 2

FIG. 20 is a diagram for describing Operation Example 2. Note that a wireless communication network system 100 illustrated in FIG. 20 is similar to the wireless communication network system 100 illustrated in FIG. 1. In FIG. 20, the mobile terminal 4B is a terminal owned by a passenger of the train 50, and is connecting to the mobile relay station 2 to make communication. The mobile relay station 2 is moving in the cell of the base station 1, and relays connection between the mobile terminal 4B located in its own cell and the base station 1.

In Operation Example 2, the following example is described. That is, when the train 50 passes near the base station 1, the mobile terminal 4B makes the handover to the base station 1. Further, when the train 50 moves away from the base station 1, the mobile terminal 4B makes the handover back to the mobile relay station 2.

FIG. 21A and FIG. 21B are diagrams each illustrating a flow of Operation Example 2. The mobile terminal 4B is connected to the mobile relay station 2, and the mobile relay station connection history holds the identification number of the mobile relay station 2.

The mobile terminal 4B periodically executes a detection process of neighboring stations and a measurement process of the reception quality of a signal from each station (OP71). As a result of the measurement, the mobile terminal 4B determines whether or not the reception quality of the signal from the mobile relay station 2 as the selected station is the best (OP72). In FIG. 20, when the mobile relay station 2 approaches the base station 1 due to the movement of the train 50, the reception quality of the signal from the base station 1 may become better than that of the signal from the mobile relay station 2 in some cases. In this case, the mobile terminal 4B determines that the reception quality from the base station 1 is the best (OP72: No).

Because the station having the best reception quality has changed, the mobile terminal 4B transmits a measurement report for requesting the handover, to the currently connected mobile relay station 2 (OP73). The measurement report at this time includes: the terminal identification number of the mobile terminal 4B itself; the identification number of the base station 1 as the transfer target candidate station; and the mobile relay station connection history held by the mobile terminal 4B.

Upon the reception of the measurement report from the mobile terminal 4B, the mobile relay station 2 executes the handover determination process of the mobile terminal 4B (OP74). The handover determination process of the mobile relay station according to Operation Example 2 is performed in the following manner with reference to FIG. 16.

The mobile relay station 2 (handover determining unit 911) determines whether or not the transfer target candidate station is a mobile relay station, on the basis of the measurement report received from the mobile terminal 4B (FIG. 16, OP41). Because the transfer target candidate station is the base station 1 (FIG. 16, OP41: No), the handover from the mobile relay station 2 to the base station 1 is permitted (see FIG. 2).

The mobile relay station 2 transmits a handover request for requesting the handover of the mobile terminal 4B, to the base station 1 as the transfer target candidate station (FIG. 16, OP42; FIG. 21A, OP75).

Upon the reception of the handover request from the mobile relay station 2, the base station 1 transmits a handover request ACK representing the permission of the handover of the mobile terminal 4B, to the mobile relay station 2 (OP76).

Upon the reception of the handover request ACK from the base station 1, the mobile relay station 2 transmits a handover command for giving an instruction to execute the handover, to the mobile terminal 4B (OP77).

Upon the reception of the handover command, the mobile terminal 4B executes the handover from the mobile relay station 2 to the base station 1 (OP78). Upon the transmission of a handover complete from the mobile terminal 4B to the base station 1 as the transfer target (OP79), the handover is completed, and the mobile terminal 4B connects to the base station 1 to make communication. At this time, because the handover is not made to a mobile relay station, the mobile relay station connection history of the mobile terminal 4B is not changed, and keeps holding the identification number of the mobile relay station 2.

As the train 50 moves away from the base station 1, reception environments of the mobile terminal 4B change, and the reception quality from the mobile relay station 2 becomes better than that from the base station 1.

The mobile terminal 4B periodically executes a detection process of neighboring stations and a measurement process of the reception quality of a signal from each station (OP80), and determines that the reception quality from the mobile relay station 2 is better than that from the base station 1 (OP81: No).

Because the station having the best reception quality has changed, the mobile terminal 4B transmits a measurement report for requesting the handover, to the currently connected base station 1 (OP82). The measurement report at this time includes: the terminal identification number of the mobile terminal 4B itself; the identification number of the mobile relay station 2 as the transfer target candidate station; and the mobile relay station connection history held by the mobile terminal 4B. The mobile relay station connection history of the mobile terminal 4B at this time stores the identification number of the last connected mobile relay station 2.

Upon the reception of the measurement report from the mobile terminal 4B, the base station 1 executes the handover determination process of the mobile terminal 4B (OP83). The handover determination process of the base station 1 according to Operation Example 2 is performed in the following manner with reference to FIG. 12.

The base station 1 (first handover determining unit 711) determines whether or not the transfer target candidate station is a mobile relay station, on the basis of the measurement report received from the mobile terminal 4B (FIG. 12, OP31). Because the transfer target candidate station is the mobile relay station 2 (FIG. 12, OP31: Yes), the processing proceeds to OP32.

The base station 1 (first handover determining unit 711) determines whether or not the handover from its own station to the mobile relay station is possible, on the basis of the cell transfer permission/prohibition setting of its own station (FIG. 12, OP32). The cell transfer permission/prohibition setting of the base station 1 is "Not Permitted" (see FIG. 8), and hence the handover from the base station 1 to the mobile relay station is not permitted (FIG. 12, OP32: No).

The base station 1 (second handover determining unit 712) determines whether or not the mobile terminal 4B has ever connected to the transfer target candidate station, on the basis of the mobile relay station connection history included in the measurement report (OP35). Because the last connected mobile relay station 2 is stored in the mobile relay station connection history of the mobile terminal 4B (FIG. 12, OP35: Yes), the base station 1 permits the handover of the mobile terminal 4B to the mobile relay station 2.

The base station 1 transmits a handover request for requesting the handover of the mobile terminal 4B, to the mobile relay station 2 as the transfer target candidate station (FIG. 12, OP36; FIG. 21B, OP84).

Upon the reception of the handover request from the base station 1, the mobile relay station 2 transmits a handover request ACK representing the permission of the handover of the mobile terminal 4B, to the base station 1 (OP85).

Upon the reception of the handover request ACK from the mobile relay station 2, the base station 1 transmits a handover command for giving an instruction to execute the handover, to the mobile terminal 4B (OP86).

Upon the reception of the handover command, the mobile terminal 4B executes the handover from the base station 1 to the mobile relay station 2 (OP87). Because the handover target of the mobile terminal 4B is a mobile relay station, the mobile relay station connection history is overwritten and updated with the identification number of the mobile relay station 2. Upon the transmission of a handover complete from the mobile terminal 4B to the base station 1 as the transfer target (OP88), the handover is completed, and the mobile terminal 4B connects to the mobile relay station 2 to make communication.

In this way, even in the case where the cell transfer permission/prohibition setting of the base station 1 is "Not Permitted", if the mobile relay station connection history of the mobile terminal 4B has the same mobile relay station as the transfer target candidate station, that is, if the last connected mobile relay station is coincident with the transfer target candidate station, the handover from the base station 1 to the mobile relay station 2 is permitted. As a result, the mobile terminal 4B that connects to the mobile relay station 2 can make the handover from the mobile relay station 2 to the base station 1, and further can make the handover from the base station 1 back to the mobile relay station 2.

Operation Example 3

Example Case in which Mobile Terminal 4C Makes Handover from Fixed Relay Station 3 to Mobile Relay Station 2

FIG. 22 is a diagram for describing Operation Example 3. Note that a wireless communication network system 100 illustrated in FIG. 22 is similar to the wireless communication network system 100 illustrated in FIG. 1. In FIG. 22, the mobile terminal 4C is located in the cell of the fixed relay station 3, and is connecting to the fixed relay station 3 to make communication. The fixed relay station 3 is located in the cell of the base station 1, and relays connection between the mobile terminal 4C located in its own cell and the base station 1.

In Operation Example 3, the following example is described. That is, when the mobile relay station 2 approaches the fixed relay station 3, the fixed relay station 3 determines the permission or prohibition of the handover of the mobile terminal 4C to the mobile relay station 2, the mobile terminal 4C connecting to the fixed relay station 3 to make communication. In the wireless communication network system 100, the handover of the mobile terminal 4C from the fixed relay station 3 to the mobile relay station 2 is permitted, and hence the mobile terminal 4C can make the handover to the mobile relay station 2.

FIG. 23 is a diagram illustrating a flow of Operation Example 3. It is assumed that the mobile terminal 4C does not have a history of connection to a mobile relay station before the mobile terminal 4C connects to the fixed relay station 3 and that the mobile relay station connection history is in its initial state (Invalid).

The mobile terminal 4C periodically executes a detection process of neighboring stations and a measurement process of the reception quality of a signal from each station (OP91). In FIG. 22, when the mobile relay station 2 approaches the mobile terminal 4C due to the movement of the train 50, the reception quality of the signal from the mobile relay station 2 may become better than that of the signal from the fixed relay station 3 in some cases. As a result of the measurement, the mobile terminal 4C determines that the reception quality of the signal from the mobile relay station 2 is better than that from the fixed relay station 3 as the selected station (OP92: No).

The mobile terminal 4C transmits a measurement report for requesting the handover, to the currently connected fixed relay station 3 (OP93). The measurement report at this time includes: the terminal identification number of the mobile terminal 4C itself; the identification number of the mobile relay station 2 as the transfer target candidate station; and the mobile relay station connection history held by the mobile terminal 4C.

Upon the reception of the measurement report from the mobile terminal 4C, the fixed relay station 3 executes the handover determination process of the mobile terminal 4C (OP94). The handover determination process of the fixed relay station 3 according to Operation Example 3 is performed in the following manner with reference to FIG. 12.

The fixed relay station 3 (first handover determining unit 711) determines that the transfer target candidate station is a mobile relay station, on the basis of the measurement report received from the mobile terminal 4C (FIG. 12, OP31: Yes).

Next, the fixed relay station 3 (first handover determining unit 711) determines whether or not the handover from its own station to the mobile relay station 2 is possible, on the basis of the cell transfer permission/prohibition setting of its own station (FIG. 12, OP32). Because the fixed relay station 3 is the fixed relay station (Type 1) installed near the boarding/exiting facility (train station) for the train 50, the cell transfer permission/prohibition setting of the fixed relay station 3 is "Permitted" (see FIG. 8). Accordingly, the handover from the fixed relay station 3 to the mobile relay station 2 is permitted (FIG. 12, OP32: Yes).

The fixed relay station 3 transmits a handover request for requesting the handover of the mobile terminal 4C, to the mobile relay station 2 as the transfer target candidate station (FIG. 12, OP36; FIG. 23, OP95). The handover request is transmitted to the mobile relay station 2 via the base station 1.

Upon the reception of the handover request from the fixed relay station 3, the mobile relay station 2 transmits a handover request ACK representing the permission of the handover of the mobile terminal 4C, to the fixed relay station 3 (OP96).

Upon the reception of the handover request ACK from the mobile relay station 2 via the base station 1, the fixed relay station 3 transmits a handover command for giving an instruction to execute the handover, to the mobile terminal 4C (OP97).

Upon the reception of the handover command, the mobile terminal 4C executes the handover from the fixed relay station 3 to the mobile relay station 2 (OP98). Because the handover target of the mobile terminal 4C is a mobile relay station, the identification number of the mobile relay station 2 is stored for update in the mobile relay station connection history. Upon the transmission of a handover complete from the mobile terminal 4C to the mobile relay station 2 as the transfer target (OP99), the handover is completed, and the mobile terminal 4C connects to the mobile relay station 2 to make communication.

In this way, the mobile terminal 4C that connects for communication to the fixed relay station 3 installed near the boarding/exiting facility (train station) for the train 50 can make the handover from the fixed relay station 3 to the mobile relay station 2.

Operation Example 4

Example Case in which Mobile Terminal 4A Makes Reselection from Base Station 1 to Mobile Relay Station 2

In Operation Example 4, the following example is described. That is, in FIG. 18, the mobile terminal 4A in a stand-by state, the selected station of which is the base station 1, determines the permission or prohibition of the reselection to the mobile relay station 2, in reaction to the approach of the mobile relay station 2. In the wireless communication network system 100, the reselection of the mobile terminal 4A from the base station 1 to the mobile relay station 2 is not permitted, and hence the mobile terminal 4A does not execute the reselection to the mobile relay station 2.

FIG. 24 is a diagram illustrating a flow of Operation Example 4. The mobile terminal 4A is in a stand-by state, and the selected station thereof is the base station 1. It is assumed that the mobile terminal 4A does not have a history of connection to the mobile relay station 2 before the mobile terminal 4A connects to the base station 1 and that the mobile relay station connection history is in its initial state (Invalid).

The mobile terminal 4A executes a detection process of neighboring stations and a measurement process of the reception quality of a signal from each station (OP101). As a result of the measurement, the mobile terminal 4A determines whether or not the reception quality of the signal from the base station 1 as the selected station is the best (OP102). In FIG. 18, when the mobile relay station 2 approaches the mobile terminal 4A due to the movement of the train 50, the reception quality of the signal from the mobile relay station 2 may become better than that of the signal from the base station 1 in some cases. In this case, the mobile terminal 4A determines that the reception quality from the mobile relay station 2 is the best (OP102: No).

Because the station having the best reception quality has changed, the mobile terminal 4A executes the reselection determination process (OP103). The reselection determination process of the mobile terminal 4A according to Operation Example 4 is performed in the following manner with reference to FIG. 9.

The mobile terminal 4A (first reselection determining unit 62) determines whether or not the transfer target candidate station is a mobile relay station (FIG. 9, OP21). Because the transfer target candidate station is the mobile relay station 2 (FIG. 9, OP21: Yes), the mobile terminal 4A (first reselection determining unit 62) determines whether or not the reselection from the currently selected station to the mobile relay station is possible (FIG. 9, OP22). The currently selected station of the mobile terminal 4A is the base station 1. Because the base station 1 is the base station (Type 2) installed at a position sufficiently away from the boarding/exiting facility (train station) for the train 50, the cell transfer permission/prohibition setting of the base station 1 is "Not Permitted". Accordingly, the mobile terminal 4A (first reselection determining unit 612) determines that the reselection from the base station 1 to the mobile relay station 2 is not permitted (FIG. 9, OP22: No).

The mobile terminal 4A (first reselection determining unit 612) determines whether or not the mobile relay station to which the mobile terminal 4A last connects is coincident with the mobile relay station 2 as the transfer target candidate station, on the basis of the mobile relay station connection history held in the storing unit 66 (FIG. 9, OP25). The mobile relay station connection history of the mobile terminal 4A holds Invalid, and does not have a history of connection to the mobile relay station (OP25: No). Hence, the mobile terminal 4A (first reselection determining unit 612) ends the reselection determination process (FIG. 9, OP24).

Accordingly, as a result of the reselection determination process of the mobile terminal 4A, the reselection from the base station 1 to the mobile relay station 2 is not permitted, and the mobile terminal 4A does not execute the reselection. In addition, because the reselection has not been made, the mobile relay station connection history of the mobile terminal 4A is not changed, and keeps holding Invalid.

In this way, it is possible to avoid the reselection: from the base station 1 to which the mobile terminal 4A can be stably connected; to the mobile relay station 2 and to enhance the network efficiency.

Operation Example 5

Example Case in which Mobile Terminal 4B Makes Reselection in Order of Mobile Relay Station 2→Base Station 1→Mobile Relay Station 2

In Operation Example 5, the following example is described. That is, in FIG. 20, when the train 50 passes near the base station 1, the mobile terminal 4B in a stand-by state makes the reselection to the base station 1, and further makes the reselection back to the mobile relay station 2.

Figure 25A:
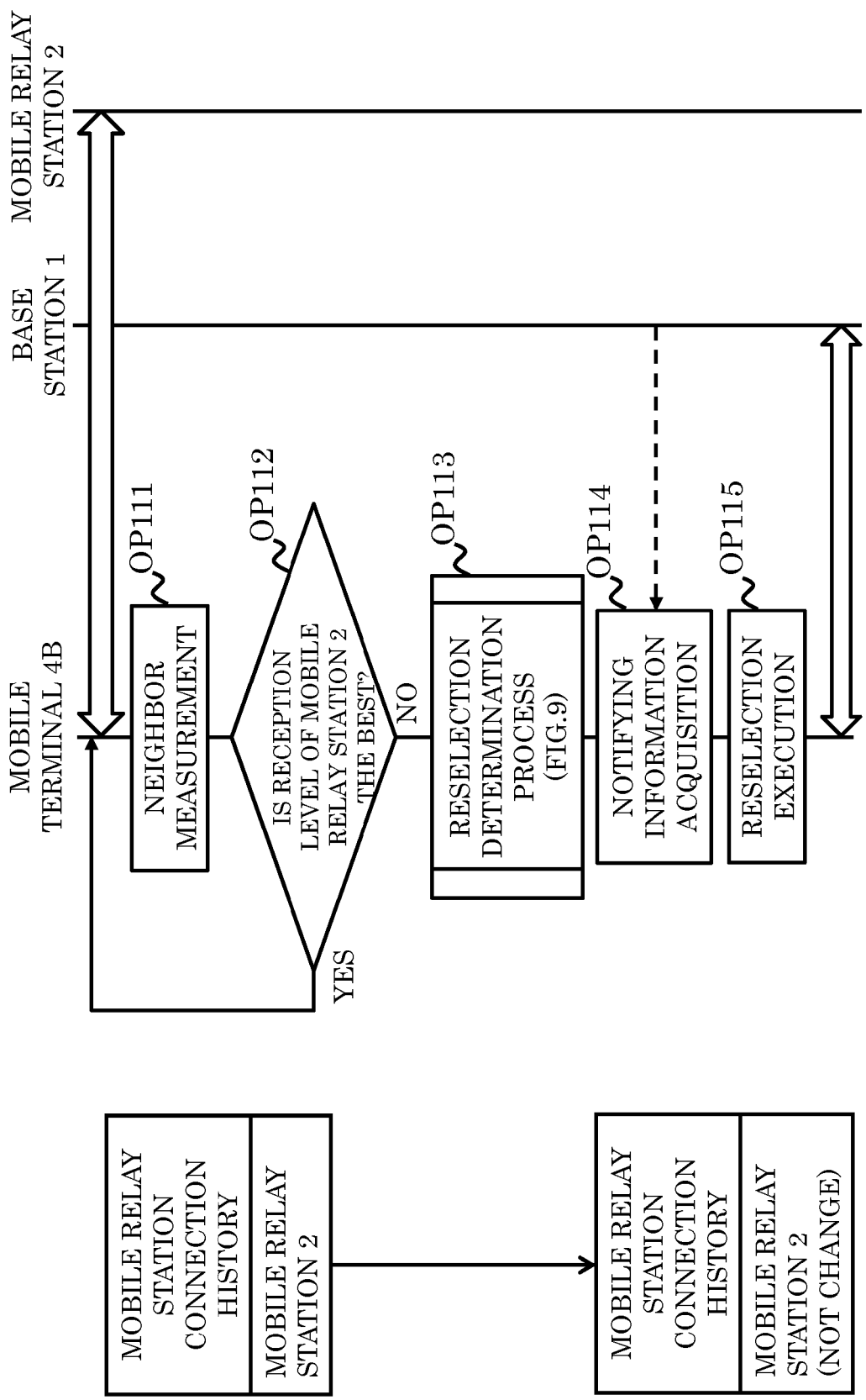
FIG. 25A is a diagram illustrating a flow of Operation Example 5.
Figure 25B:
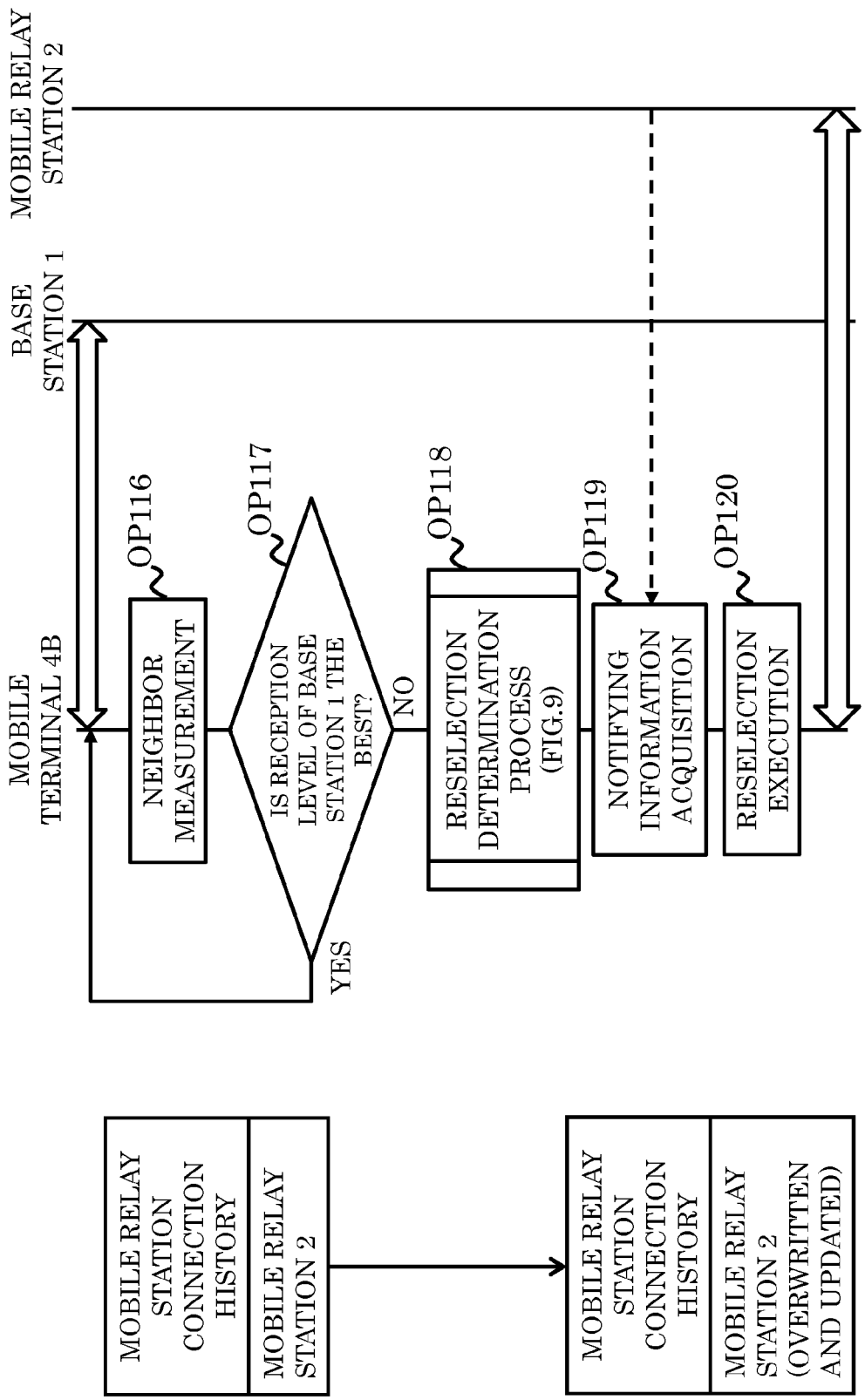
FIG. 25B is a diagram illustrating the flow of Operation Example 5.

FIG. 25A and FIG. 25B are diagrams each illustrating a flow of Operation Example 5. The currently selected station of the mobile terminal 4B is the mobile relay station 2, and the identification number of the mobile relay station 2 is held in the mobile relay station connection history.

The mobile terminal 4B periodically executes a detection process of neighboring stations and a measurement process of the reception quality of a signal from each station (OP111). As a result of the measurement, the mobile terminal 4B determines whether or not the reception quality of the signal from the mobile relay station 2 as the selected station is the best (OP112). In FIG. 20, when the mobile relay station 2 approaches the base station 1 due to the movement of the train 50, the reception quality of the signal from the base station 1 may become better than that of the signal from the mobile relay station 2 in some cases. In this case, the mobile terminal 4B determines that the reception quality from the base station 1 is the best (OP112: No).

Because the station having the best reception quality has changed, the mobile terminal 4B executes the reselection determination process (OP113). The reselection determination process of the mobile terminal 4B according to Operation Example 5 is performed in the following manner with reference to FIG. 9.

The mobile terminal 4B (first reselection determining unit 62) determines whether or not the transfer target candidate station is a mobile relay station (FIG. 9, OP21). Because the transfer target candidate station is the base station 1 (FIG. 9, OP21: No), the reselection from the mobile relay station 2 to the base station 1 is permitted.

The mobile terminal 4B acquires notifying information from the base station 1 as the transfer target candidate station (OP114), and executes the reselection from the mobile relay station 2 as the currently selected station to the base station 1 (FIG. 9, OP26; FIG. 25A, OP115). The reselection target is the base station 1, which is not a mobile relay station, and hence the mobile relay station connection history is not changed, and keeps holding the identification number of the mobile relay station 2.

As the train 50 moves away from the base station 1, reception environments of the mobile terminal 4B change, and the reception quality from the mobile relay station 2 becomes better than that from the base station 1.

The mobile terminal 4B periodically executes a detection process of neighboring stations and a measurement process of the reception quality of a signal from each station (OP116), and determines that the reception quality from the mobile relay station 2 is better than that from the base station (OP117: No).

Because the station having the best reception quality has changed from the base station 1 to the mobile relay station 2, the mobile terminal 4B executes the reselection determination process (OP118). The reselection determination process of the mobile terminal 4B according to Operation Example 5 is performed in the following manner with reference to FIG. 9.

The mobile terminal 4B (first reselection determining unit 62) determines whether or not the transfer target candidate station is a mobile relay station (FIG. 9, OP21). The transfer target candidate station is the mobile relay station 2 (FIG. 9, OP21: Yes), and the cell transfer permission/prohibition setting of the base station 1 as the currently selected station is "Not Permitted" (FIG. 9, OP22: No).

The mobile terminal 4B (second reselection determining unit 63) determines whether or not the last connected mobile relay station is coincident with the mobile relay station 2 as the transfer target candidate station, on the basis of the mobile relay station connection history held in the storing unit 66 (FIG. 9, OP25). The identification number of the last connected mobile relay station 2 is stored in the mobile relay station connection history of the mobile terminal 4B, and the last connected mobile relay station 2 is coincident with the transfer target candidate station (FIG. 9, OP25: Yes). Hence, the mobile terminal 4B permits the reselection to the mobile relay station 2.

The mobile terminal 4B acquires notifying information from the mobile relay station 2 as the transfer target candidate station (OP119), and executes the reselection from the base station 1 as the currently selected station to the mobile relay station 2 (FIG. 9, OP26; FIG. 25B, OP120). Upon the completion of the reselection, the mobile terminal 4B overwrites and updates the mobile relay station connection history with the identification number of the mobile relay station 2 (FIG. 9, OP27).

In this way, even in the case where the cell transfer permission/prohibition setting of the base station 1 is "Not Permitted", if the mobile relay station held in the mobile relay station connection history of the mobile terminal 4B is coincident with the mobile relay station as the transfer target candidate station, the reselection from the base station 1 to the mobile relay station 2 is permitted. As a result, the mobile terminal 4B that connects to the mobile relay station 2 can make the reselection from the mobile relay station 2 to the base station 1, and further can make the reselection from the base station 1 back to the mobile relay station 2.

Operation Example 6

Example Case in which Mobile Terminal 4C Makes Reselection from Fixed Relay Station 3 to Mobile Relay Station 2

In Operation Example 6, the following example is described. That is, in the example illustrated in FIG. 22, when the mobile relay station 2 approaches the fixed relay station 3, the mobile terminal 4C in a stand-by state makes the reselection from the fixed relay station 3 to the mobile relay station 2. In the wireless communication network system 100, the reselection of the mobile terminal 4C from the fixed relay station 3 to the mobile relay station 2 is permitted, and hence the mobile terminal 4C can make the reselection to the mobile relay station 2.

FIG. 26 is a diagram illustrating a flow of Operation Example 6. It is assumed that the mobile terminal 4C does not have a history of connection to the mobile relay station before the mobile terminal 4C connects to the fixed relay station and that the mobile relay station connection history is in its initial state (Invalid).

The mobile terminal 4C periodically executes a detection process of neighboring stations and a measurement process of the reception quality of a signal from each station (OP121). In FIG. 22, when the mobile relay station 2 approaches the mobile terminal 4C due to the movement of the train 50, the reception quality of the signal from the mobile relay station 2 may become better than that of the signal from the fixed relay station 3 in some cases. As a result of the measurement, the mobile terminal 4C determines that the reception quality of the signal from the mobile relay station 2 is better than that from the fixed relay station 3 as the selected station (OP122: No).

The mobile terminal 4C executes the reselection determination process (OP123). The reselection determination process of the fixed relay station 3 according to Operation Example 6 is performed in the following manner with reference to FIG. 9.

The mobile terminal 4C (first reselection determining unit 62) determines whether or not the transfer target candidate station is a mobile relay station (FIG. 9, OP21). Because the transfer target candidate station is the mobile relay station 2 (FIG. 9, OP21: Yes), the mobile terminal 4C (first reselection determining unit 62) determines whether or not the reselection from the fixed relay station 3 as the currently selected station to the mobile relay station 2 is possible. Because the fixed relay station 3 is the fixed relay station (Type 1) installed near the boarding/exiting facility (train station) for the train 50, the cell transfer permission/prohibition setting of the fixed relay station 3 is "Permitted" (see FIG. 8). Accordingly, the reselection from the fixed relay station 3 to the mobile relay station 2 is permitted (FIG. 9, OP22: Yes).

The mobile terminal 4C acquires notifying information from the mobile relay station 2 as the transfer target candidate station (OP124), and executes the reselection from the fixed relay station 3 as the currently selected station to the mobile relay station 2 (FIG. 9, OP26; FIG. 26, OP125). Upon the completion of the reselection, because the reselection target of the mobile terminal 4C is the mobile relay station, the mobile terminal 4C updates the mobile relay station connection history with the identification number of the mobile relay station 2 (FIG. 9, OP27).

In this way, the mobile terminal 4C in a stand-by state, the selected station of which is the fixed relay station 3 (Type 1) installed near the boarding/exiting facility for the train 50, can make the reselection from the fixed relay station 3 to the mobile relay station 2.

Operations and Effects of First Embodiment

In the first embodiment, the permission or prohibition of the cell transfer from a base station and a fixed relay station to a mobile relay station is set depending on whether or not the station is installed near a boarding/exiting facility for a mobile body of public transportation, such as a train and a bus, the mobile body passing in a given route. As a result, for example, the mobile terminal 4A illustrated in FIG. 1 can avoid unfavorable processing, such as the handover and the reselection from the base station 1 to the mobile relay station 2, so that the network load is reduced.

In addition, in the case where the last connected mobile relay station is coincident with the mobile relay station as the transfer target candidate station, the cell transfer from a base station and a fixed relay station that is not installed near a boarding/exiting facility for a mobile body to a mobile relay station is permitted. As a result, for example, the mobile terminal 4B illustrated in FIG. 1 can make the handover from the mobile relay station 2 to the base station 1, and further can make the handover from the base station 1 back to the mobile relay station 2, along with the movement of the train 50.

According to the disclosed wireless communication network system, the connection target of a mobile terminal can be efficiently switched.

In the first embodiment, the base station 1, the mobile relay station 2, and the fixed relay station 3 each determine the permission or prohibition of the handover of the mobile terminal 4 from its own station to another station. In the case where the mobile relay station 2 and the fixed relay station 3 do not have a processing capacity that is high enough to determine the permission or prohibition of the handover, the base station 1 may determine the permission or prohibition of the handover in a unified manner. This can be achieved by the configuration in which the base station 1 acquires the cell transfer permission/prohibition setting of each station from notifying information and the like and receives a measurement report from a mobile terminal via the mobile relay station 2 or the fixed relay station 3.

Second Embodiment

In the first embodiment, the handover determination process is performed by stations such as the base station, the fixed relay station, and the mobile relay station. In the second embodiment, the handover determination process is performed by the mobile terminal. In the second embodiment, description common to that of the first embodiment is omitted.

<<Configuration Example of Mobility Controlling Unit of Mobile Terminal>>

FIG. 27 is a diagram illustrating a configuration example of the mobility controlling unit 453 of the mobile terminal 4. The mobility controlling unit 453 of the mobile terminal 4 includes the measurement value acquiring unit 61, the first reselection determining unit 62, the second reselection determining unit 63, the reselection executing unit 64, the handover executing unit 65, and the storing unit 66 that are described in the first embodiment, and further includes a first handover determining unit 67 and a second handover determining unit 68.

Upon the report of a transfer target candidate station from the measurement value acquiring unit 61, the first handover determining unit 67 determines whether or not the transfer target candidate station is the same as the currently selected station. In the case where the transfer target candidate station is different from the currently selected station, that is, in the case where the station having the best reception quality of the signal has changed, the first handover determining unit 67 starts a handover determination process. The first handover determining unit 67 determines whether or not the transfer target candidate station is a mobile relay station, and determines the permission or prohibition of the handover from the currently selected station to the transfer target candidate station. As a result of the determination, in the case where the handover from the currently selected station to the transfer target candidate station is possible, the first handover determining unit 67 instructs the handover executing unit 65 to execute the handover.

In the case where the handover is not permitted by the first handover determining unit 67, the second handover determining unit 68 determines the permission or prohibition of the handover on the basis of the mobile relay station connection history held in the storing unit 66. As a result of the determination, in the case where the handover from the currently selected station to the transfer target candidate station is possible, the second handover determining unit 68 instructs the handover executing unit 65 to execute the handover.

The first handover determining unit 67 and the second handover determining unit 68 correspond to the "determining unit" according to one of the aspects of the present invention.

Figure 28:
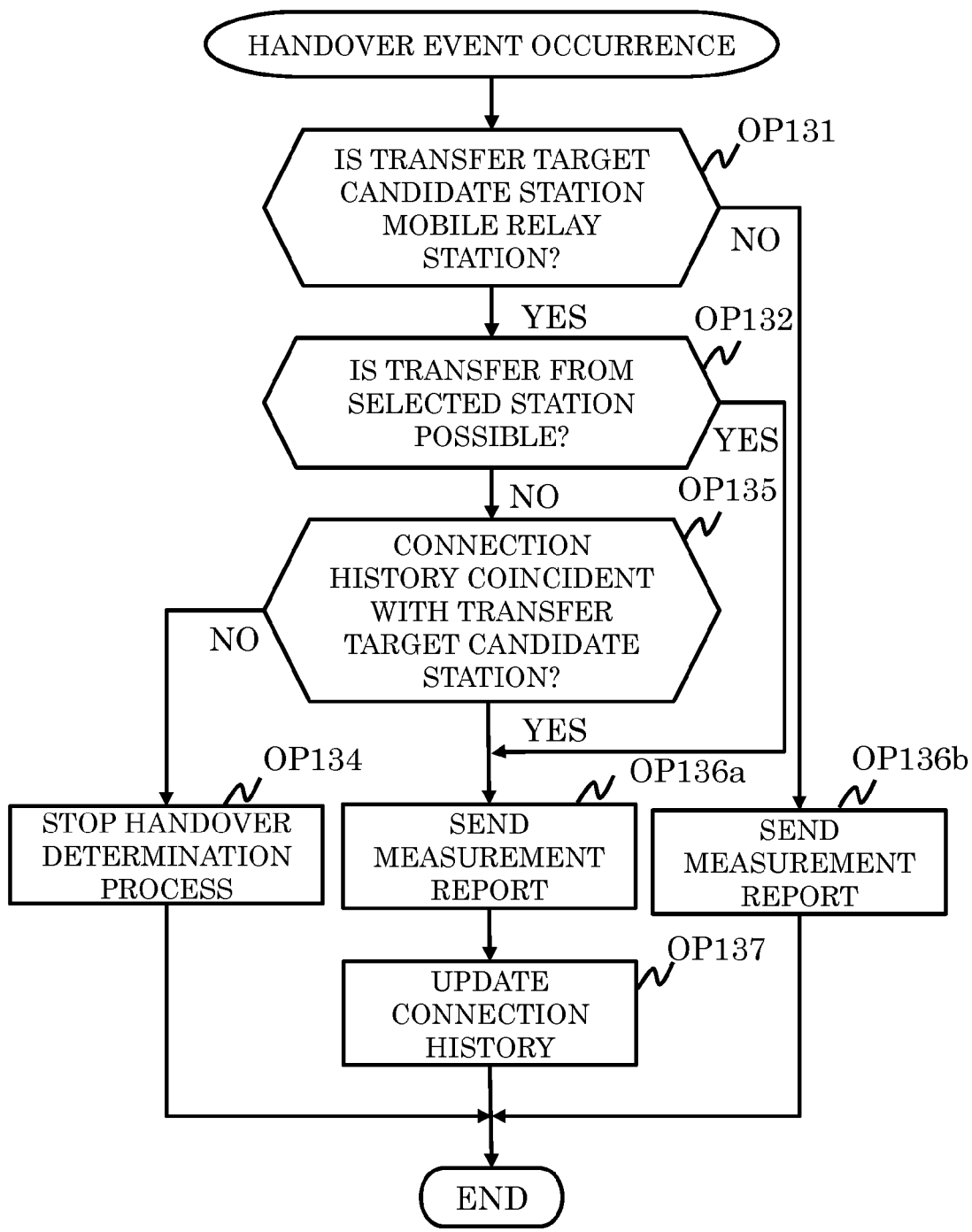
FIG. 28 is a diagram illustrating a flow example of a handover determination process of the mobile terminal.

FIG. 28 is a diagram illustrating a flow example of the handover determination process of the mobile terminal 4. In the case where the station having the best reception quality has changed as a result of the measurement of the reception quality from each station that is acquired by the measurement value acquiring unit 61, the mobile terminal 4 starts the handover determination process.

The first handover determining unit 67 determines whether or not the transfer target candidate station is a mobile relay station (OP131). The first handover determining unit 67 compares the mobile relay station list held in the storing unit 66 with the identification number of the transfer target candidate station, to thereby determine whether or not the transfer target candidate station is a mobile relay station.

If the transfer target candidate station is not a mobile relay station (OP131: No), the handover from the currently selected station is permitted (see FIG. 2). The first handover determining unit 67 determines the permission of the handover, and instructs the handover executing unit 65 to execute the handover. The handover executing unit 65 that has received the instruction transmits a measurement report for requesting the handover from the currently selected station to the transfer target candidate station, to the currently selected station (OP136*b*), and ends the handover determination process.

If the transfer target candidate station is a mobile relay station (OP131: Yes), the handover to the mobile relay station as the transfer target candidate station is restricted depending on the type of the currently selected station of the mobile terminal 4 (see FIG. 2).

Accordingly, if the transfer target candidate station of the mobile terminal 4 is a mobile relay station (OP131: Yes), the first handover determining unit 67 determines whether or not the transfer from the currently selected station to the transfer target candidate station (mobile relay station) is possible (OP132). That is, the first handover determining unit 67 determines whether or not the cell transfer permission/prohibition setting of the currently selected station held in the storing unit 66 is "Permitted".

If the cell transfer permission/prohibition setting of the currently selected station is "Permitted" (OP132: Yes), the handover to the mobile relay station as the transfer target candidate station is permitted. This means that the selected station is the base station or the fixed relay station (Type 1) installed near the boarding/exiting facility for the mobile body. The first handover determining unit 67 determines the permission of the handover, and instructs the handover executing unit 65 to execute the handover. The handover executing unit 65 that has received the instruction transmits a measurement report for requesting the handover from the currently selected station to the transfer target candidate station, to the currently selected station (OP136*a*).

If the cell transfer permission/prohibition setting of the currently selected station is "Not Permitted" (OP132: No), this means that the currently selected station is a mobile relay station or is the base station or the fixed relay station (Type 2) other than Type 1. In this case, the permission or prohibition of the handover is determined depending on whether or not the mobile relay station to which the mobile terminal 4 last connects is coincident with the transfer target candidate station (see FIG. 2). Accordingly, the processing moves from the first handover determining unit 67 to the second handover determining unit 68, and the second handover determining unit 68 refers to the mobile relay station connection history held in the storing unit 66. The second handover determining unit 68 determines whether or not the mobile relay station to which the mobile terminal 4 last connects is coincident with the transfer target candidate station (OP135). If the mobile relay station to which the mobile terminal 4 last connects is not coincident with the transfer target candidate station (OP135: No), the second handover determining unit 68 determines the non-permission of the handover, and stops the handover determination process (OP134). This ends the handover determination process.

If the mobile relay station to which the mobile terminal 4 last connects is coincident with the transfer target candidate station (OP135: Yes), the second handover determining unit 68 determines the permission of the handover, and instructs the handover executing unit 65 to execute the handover. The handover executing unit 65 that has received the instruction transmits a measurement report for requesting the handover from the currently selected station to the transfer target candidate station, to the currently selected station (OP136*a*).

Upon the completion of the handover, the handover executing unit 65 updates the mobile relay station connection history in the storing unit 66 with the identification number of the mobile relay station as the transfer target, in the case where the transfer target candidate station is a mobile relay station (OP137). Upon the completion of the update of the mobile relay station connection history, the handover determination process is ended.

The mobile terminal 4 holds the identification number and the cell transfer permission/prohibition setting of each neighboring station on the basis of the notifying information from each station, and thus can determine the permission or prohibition of the handover. The handover determination process is performed not by the stations but by the mobile terminal, and hence the transmission of a wasteful measurement report can be avoided in the case where the handover is not permitted, so that the network load can be reduced.

<<Configuration Example of Mobility Controlling Units of Base Station and Fixed Relay Station>>

Figure 29:
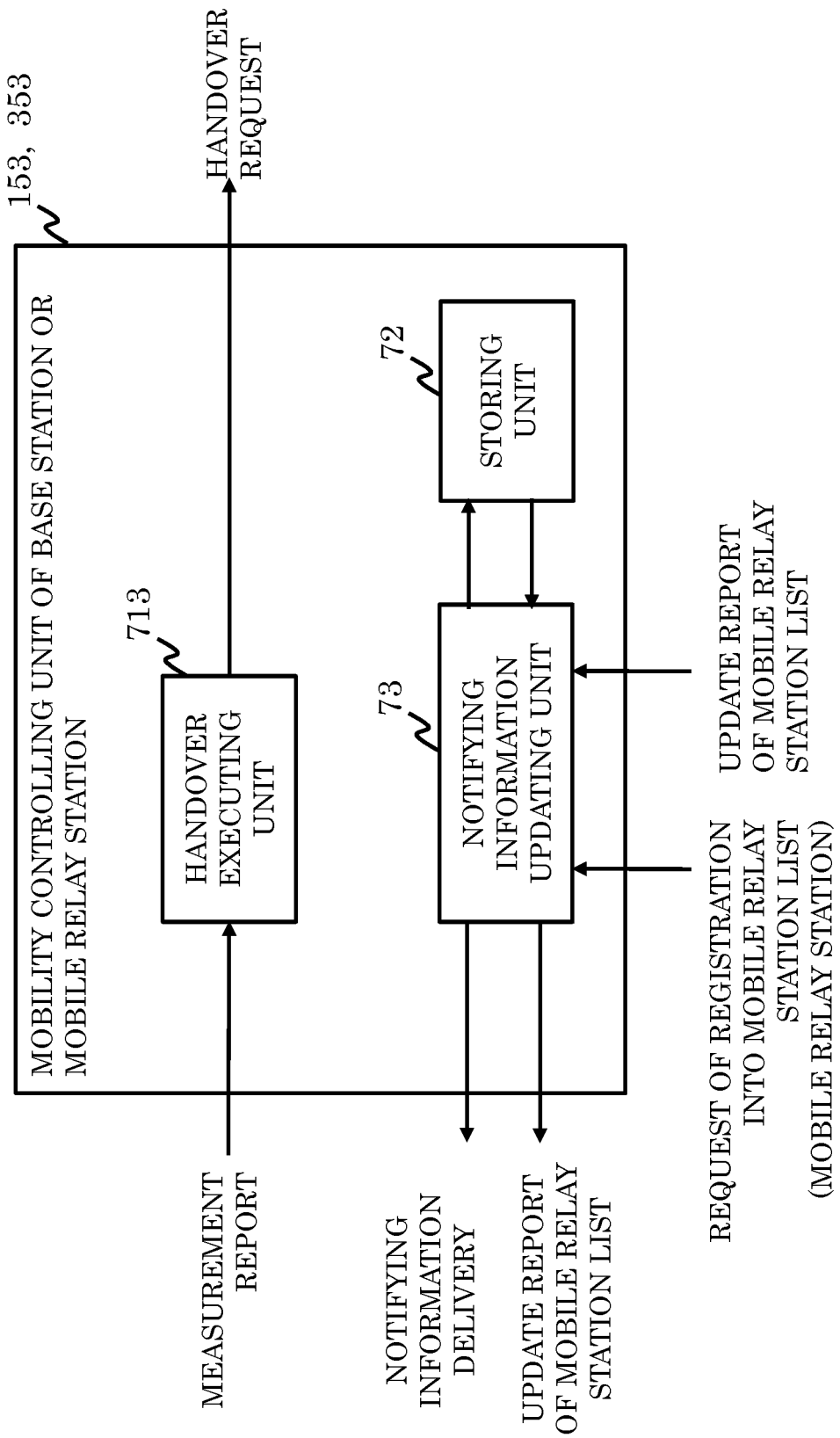
FIG. 29 is a diagram illustrating a configuration example of the mobility controlling units of the base station and the fixed relay station.

FIG. 29 is a diagram illustrating a configuration example of the mobility controlling units 153 and 353 of the base station 1 and the fixed relay station 3.

The mobility controlling units 153 and 353 each include the handover executing unit 713, the storing unit 72, and the notifying information updating unit 73.

Upon the reception of a measurement report from the mobile terminal 4, the handover executing unit 713 transmits a handover request for requesting the handover, to the transfer target candidate station.

The storing unit 72 and the notifying information updating unit 73 are as described in the first embodiment, and hence description thereof is omitted.

<<Configuration Example of Mobility Controlling Unit of Mobile Relay Station>>

Figure 30:
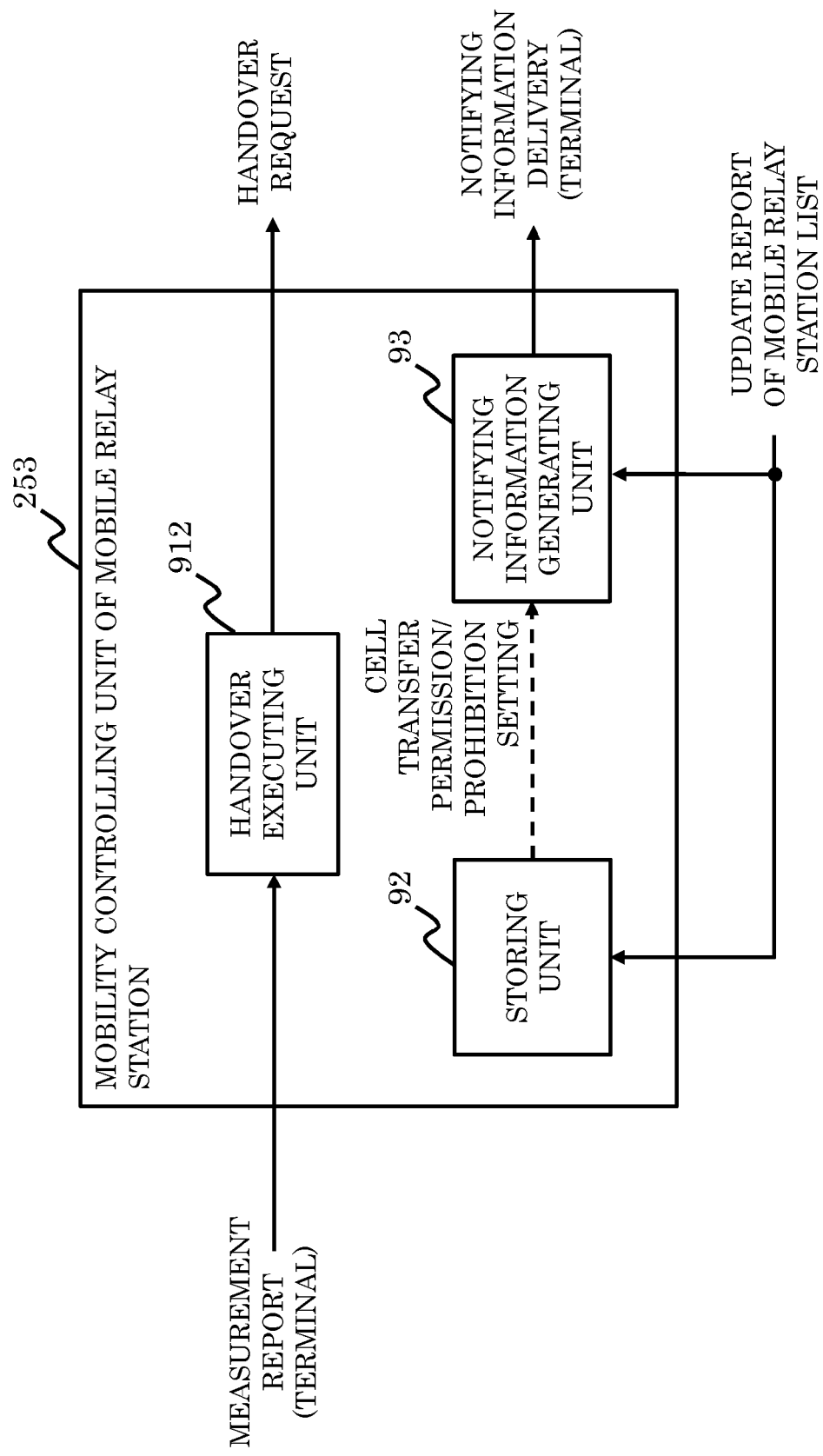
FIG. 30 is a diagram illustrating a configuration example of the mobility controlling unit of the mobile relay station.

FIG. 30 is a diagram illustrating a configuration example of the mobility controlling unit 253 of the mobile relay station 2.

The mobility controlling unit 253 of the mobile relay station 2 includes the handover executing unit 912, the notifying information generating unit 93, and the storing unit 92.

Upon the reception of a measurement report from the mobile terminal 4, the handover executing unit 912 transmits a handover request for requesting the handover, to the transfer target candidate station.

The storing unit 92 and the notifying information generating unit 93 are as described in the first embodiment, and hence description thereof is omitted.

Operation Example 7

Example Case in which Mobile Terminal 4A Makes Handover from Base Station 1 to Mobile Relay Station 2

In Operation Example 7, the following example is described. That is, in the wireless communication network system 100 illustrated in FIG. 18, the mobile terminal 4A itself that is connecting to the base station 1 to make communication determines the permission or prohibition of the handover, in reaction to the approach of the mobile relay station 2. In the wireless communication network system 100, the handover of the mobile terminal 4A from the base station 1 to the mobile relay station is prohibited, and hence the mobile terminal 4A does not permit its own handover to the mobile relay station.

Figure 31:
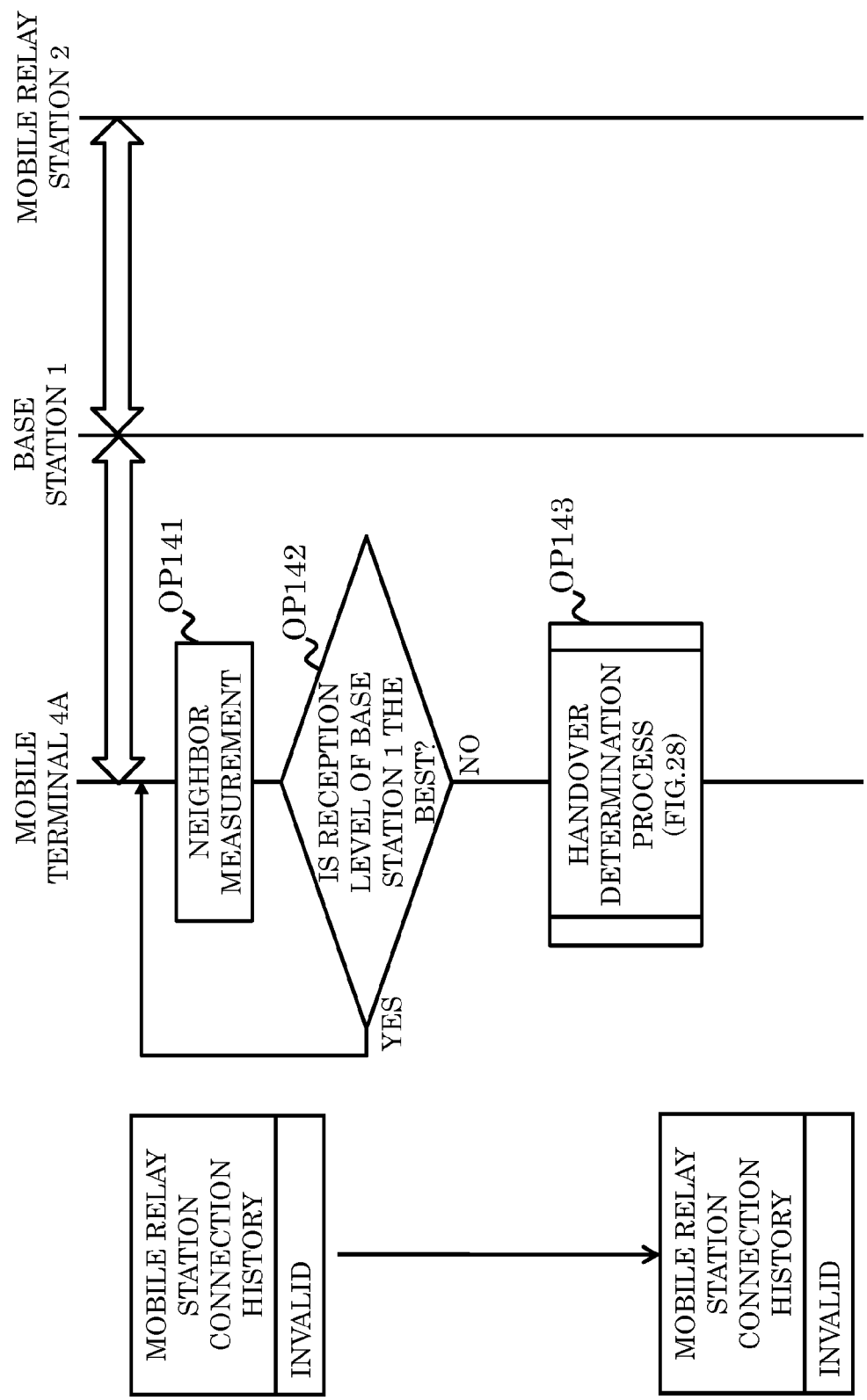
FIG. 31 is a diagram illustrating a flow of Operation Example 7.

FIG. 31 is a diagram illustrating a flow of Operation Example 7. It is assumed that the mobile terminal 4A does not have a history of connection to the mobile relay station 2 before the mobile terminal 4A connects to the base station 1 and that the mobile relay station connection history is in its initial state (Invalid).

The mobile terminal 4A detects neighboring stations, and measures the reception quality of a signal from each station (OP141). As a result of the measurement, the mobile terminal 4A determines whether or not the reception quality of the signal from the base station 1 as the selected station is the best (OP142). In FIG. 18, when the mobile relay station 2 approaches the mobile terminal 4A due to the movement of the mobile body 50, the reception quality of the signal from the mobile relay station 2 may become better than that of the signal from the base station 1 in some cases. Accordingly, the mobile terminal 4A determines that the reception quality from the mobile relay station 2 is the best (OP142: No).

The mobile terminal 4A executes the handover determination process (OP143). The handover determination process of the mobile terminal 4A according to Operation Example 7 is performed in the following manner with reference to FIG. 28.

The mobile terminal 4A (first handover determining unit 67) determines whether or not the transfer target candidate station is a mobile relay station (FIG. 28, OP131). Because the transfer target candidate station is the mobile relay station 2 (FIG. 28, OP131: Yes), the mobile terminal 4A (first handover determining unit 67) determines whether or not the handover from the base station 1 as the currently selected station to the mobile relay station 2 is possible (FIG. 28, OP132). Because the base station 1 is the base station (Type 2) installed at a position sufficiently away from the boarding/exiting facility (train station) for the train 50, the cell transfer permission/prohibition setting of the base station 1 is "Not Permitted" (see FIG. 8). Accordingly, the handover from the base station 1 to the mobile relay station 2 is not permitted (FIG. 28, OP132: No), and the processing proceeds to OP135.

The mobile terminal 4A (second handover determining unit 68) determines whether or not the last connected mobile relay station is coincident with the mobile relay station as the transfer target candidate station, on the basis of the mobile relay station connection history held in the storing unit 66 (FIG. 28, OP135). Because the mobile relay station connection history of the mobile terminal 4A does not have a history of connection to the mobile relay station (FIG. 28, OP135: No), the mobile terminal 4A ends the handover determination process (OP134).

Accordingly, as a result of the handover determination process of the mobile terminal 4A, the handover from the base station 1 to the mobile relay station 2 is not permitted, and the mobile terminal 4A does not execute the handover, and continues the communication while keeping the connection to the base station 1.

In this way, it is possible to prevent the mobile terminal 4A from making the handover: from the base station 1 to which to the mobile terminal 4A can be stably connected; to the mobile relay station 2, so that efficient communication can be provided. In addition, the mobile terminal 4A itself determines the permission or prohibition of the handover, and hence the transmission of a wasteful measurement report can be avoided in the case where the handover is not permitted.

Operation Example 8

Example Case in which Mobile Terminal 4B Makes Handover in Order of Mobile Relay Station 2→Base Station 1→Mobile Relay Station 2

In Operation Example 8, the following example is described. That is, in the example illustrated in FIG. 20, when the train 50 passes near the base station 1, the mobile terminal 4B makes the handover to the base station 1, and further makes the handover back to the mobile relay station 2.

Figure 32A:
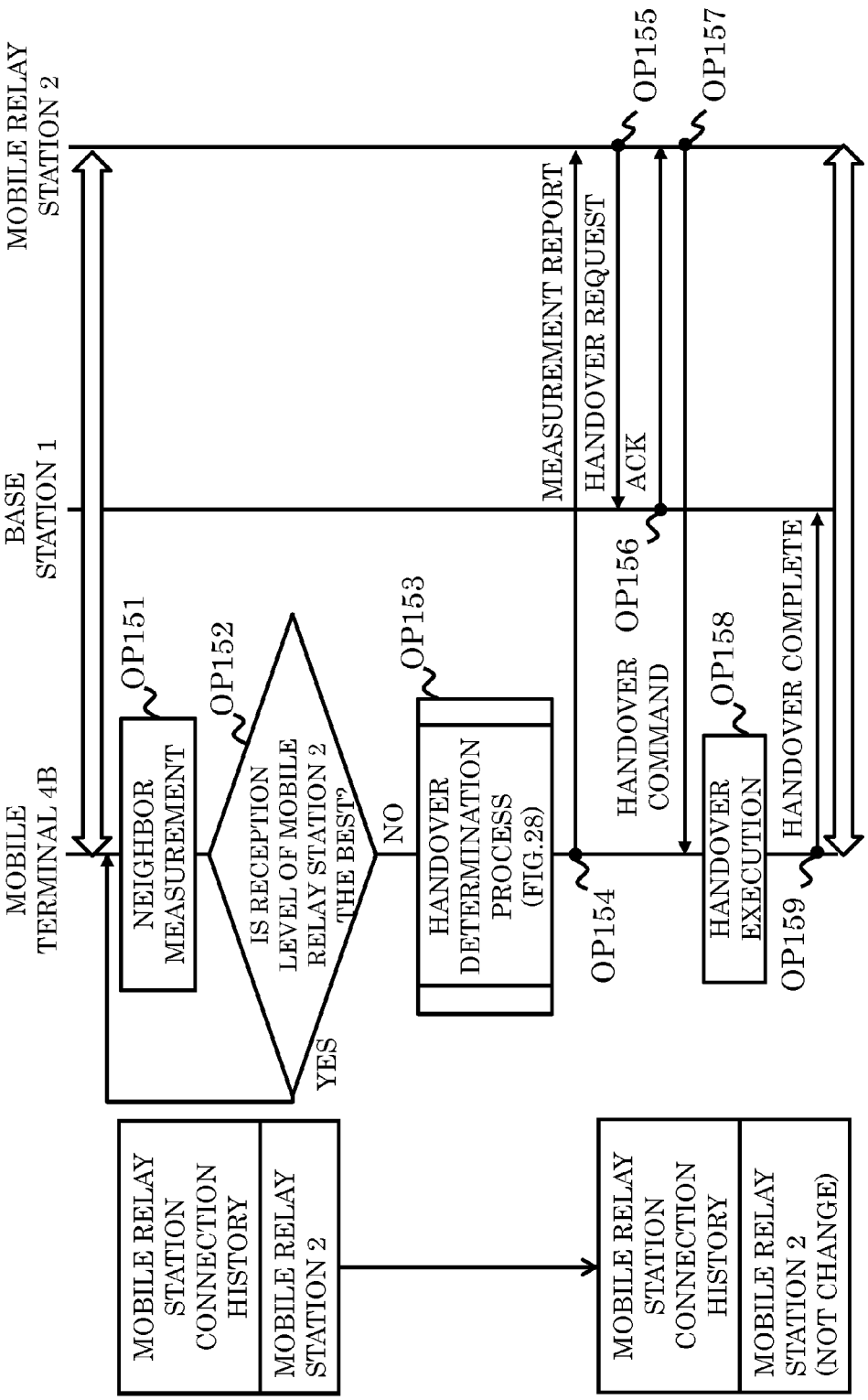
FIG. 32A is a diagram illustrating a flow of Operation Example 8.

FIG. 32A and FIG. 32B are diagrams each illustrating a flow of Operation Example 8. The mobile terminal 4B is connected to the mobile relay station 2, and the mobile relay station connection history holds the identification number of the mobile relay station 2.

The mobile terminal 4B periodically executes a detection process of neighboring stations and a measurement process of the reception quality of a signal from each station (OP151). In FIG. 20, when the mobile relay station 2 approaches the base station 1 due to the movement of the train 50, the reception quality of the signal from the base station 1 may become better than that of the signal from the mobile relay station 2 in some cases. As a result of the measurement, the mobile terminal 4B determines that the reception quality from the base station 1 is better than the reception quality of the signal from the mobile relay station 2 as the selected station (OP152: No).

Because the station having the best reception quality has changed, the mobile terminal 4B executes the handover determination process (OP153). The handover determination process of the mobile relay station according to Operation Example 8 is performed in the following manner with reference to FIG. 28.

The mobile terminal 4B (first handover determining unit 67) determines whether or not the transfer target candidate station is a mobile relay station (FIG. 28, OP131). Because the transfer target candidate station is the base station 1 (FIG. 28, OP131: No), the handover from the mobile relay station 2 to the base station 1 is permitted (see FIG. 2).

The mobile terminal 4B transmits a measurement report for requesting the handover, to the currently connected mobile relay station 2 (OP154). The measurement report at this time includes: the terminal identification number of the mobile terminal 4B itself; and the identification number of the base station 1 as the transfer target candidate station.

Upon the reception of the measurement report from the mobile terminal 4B, the mobile relay station 2 transmits a handover request for requesting the handover of the mobile terminal 4B, to the base station 1 as the transfer target candidate station (OP155).

Upon the reception of the handover request from the mobile relay station 2, the base station 1 transmits a handover request ACK representing the permission of the handover of the mobile terminal 4B, to the mobile relay station 2 (OP156).

Upon the reception of the handover request ACK from the base station 1, the mobile relay station 2 transmits a handover command for giving an instruction to execute the handover, to the mobile terminal 4B (OP157).

Upon the reception of the handover command, the mobile terminal 4B (handover executing unit 65) executes the handover from the mobile relay station 2 to the base station 1 (OP158). Upon the transmission of a handover complete from the mobile terminal 4B to the base station 1 as the transfer target (OP159), the handover is completed, and the mobile terminal 4B connects to the base station 1 to make communication. At this time, because the handover target is the base station 1, which is not a mobile relay station, the mobile relay station connection history is not changed, and the identification number of the mobile relay station 2 is held without any change.

After that, as the train 50 moves away from the base station 1, reception environments of the mobile terminal 4B change, and the reception quality from the mobile relay station 2 becomes better than that from the base station 1.

The mobile terminal 4B periodically executes a detection process of neighboring stations and a measurement process of the reception quality of a signal from each station (OP160), and determines that the reception quality from the mobile relay station 2 is better than that from the base station (OP161: No).

The mobile terminal 4B (first handover determining unit 67) executes the handover determination process (OP162). The handover determination process of the mobile terminal 4B according to Operation Example 8 is performed in the following manner with reference to FIG. 28.

The mobile terminal 4B (first handover determining unit 67) determines whether or not the handover from the currently selected station (base station 1) to the mobile relay station 2 is possible, on the basis of the cell transfer permission/prohibition setting held in the storing unit 66 (FIG. 28, OP131 and OP132). Because the cell transfer permission/prohibition setting of the base station 1 is "Not Permitted" (see FIG. 8), the handover from the base station 1 to the mobile relay station 2 is not permitted (FIG. 28, OP132: No).

The mobile terminal 4B (second handover determining unit 68) determines whether or not the last connected mobile relay station is the mobile relay station 2 as the transfer target candidate station, on the basis of the mobile relay station connection history held in the storing unit 66 (FIG. 28, OP135). Because the mobile relay station connection history of the mobile terminal 4B stores the mobile relay station 2 as the last connected mobile relay station (FIG. 28, OP135: Yes), the mobile terminal 4B permits the handover to the mobile relay station 2.

The mobile terminal 4B transmits a measurement report for requesting the handover, to the currently connected base station 1 (FIG. 28, OP136a; FIG. 32B, OP163). The measurement report at this time includes: the terminal identification number of the mobile terminal 4B itself; and the identification number of the mobile relay station 2 as the transfer target candidate station.

Upon the reception of the measurement report from the mobile terminal 4A, the base station 1 transmits a handover request for requesting the handover of the mobile terminal 4B, to the mobile relay station 2 as the transfer target candidate station (OP164).

Upon the reception of the handover request from the base station 1, the mobile relay station 2 transmits a handover request ACK representing the permission of the handover of the mobile terminal 4B, to the base station 1 (OP165).

Upon the reception of the handover request ACK from the mobile relay station 2, the base station 1 transmits a handover command for giving an instruction to execute the handover, to the mobile terminal 4B (OP166).

Upon the reception of the handover command, the mobile terminal 4B executes the handover from the base station 1 to the mobile relay station 2 (OP167). The mobile terminal 4B overwrites and updates the mobile relay station connection history with the identification number of the mobile relay station 2 (FIG. 28, OP137). Upon the transmission of a handover complete from the mobile terminal 4B to the mobile relay station 2 as the transfer target (OP168), the handover is completed, and the mobile terminal 4B connects to the mobile relay station 2 to make communication.

Operation Example 9

Example Case in which Mobile Terminal 4C Makes Handover from Fixed Relay Station 3 to Mobile Relay Station 2

In Operation Example 9, the following example is described. That is, in the example illustrated in FIG. 22, when the mobile relay station 2 approaches the fixed relay station 3, the mobile terminal 4C during communication determines the permission or prohibition of the handover to the mobile relay station 2. In the wireless communication network system 100, the handover of the mobile terminal 4C from the fixed relay station 3 to the mobile relay station 2 is permitted, and hence the mobile terminal 4C can make the handover to the mobile relay station 2.

FIG. 33 is a diagram illustrating a flow of Operation Example 9. It is assumed that the mobile terminal 4C does not have a history of connection to the mobile relay station before the mobile terminal 4C connects to the fixed relay station 3 and that the mobile relay station connection history is in its initial state (Invalid).

The mobile terminal 4C periodically executes a detection process of neighboring stations and a measurement process of the reception quality of a signal from each station (OP171). In FIG. 22, when the mobile relay station 2 approaches the mobile terminal 4C due to the movement of the train 50, the reception quality of the signal from the mobile relay station 2 becomes better than that of the signal from the fixed relay station 3. As a result of the measurement, the mobile terminal 4C determines that the reception quality of the signal from the mobile relay station 2 is better than that from the fixed relay station 3 as the selected station (OP172: No).

The mobile terminal 4C executes the handover determination process (OP173). The handover determination process of the fixed relay station 3 according to Operation Example 9 is performed in the following manner with reference to FIG. 28.

The mobile terminal 4C (first handover determining unit 67) determines that the transfer target candidate station is a mobile relay station (FIG. 28, OP131: Yes).

Next, the mobile terminal 4C (first handover determining unit 67) determines whether or not the handover from the currently selected station to the mobile relay station 2 is possible, on the basis of the cell transfer permission/prohibition setting (FIG. 28, OP132). Because the fixed relay station 3 is the fixed relay station (Type 1) installed near the boarding/exiting facility for the train 50, the cell transfer permission/prohibition setting of the fixed relay station 3 is "Permitted" (see FIG. 8). Accordingly, the handover from the fixed relay station 3 to the mobile relay station 2 is permitted (FIG. 28, OP132: Yes).

The mobile terminal 4C transmits a measurement report for requesting the handover, to the currently connected fixed relay station 3 (FIG. 28, OP136a; FIG. 33, OP174). The measurement report at this time includes: the terminal identification number of the mobile terminal 4C itself; and the identification number of the mobile relay station 2 as the transfer target candidate station.

The fixed relay station 3 transmits a handover request for requesting the handover of the mobile terminal 4C, to the mobile relay station 2 as the transfer target candidate station (OP175). The handover request is transmitted to the mobile relay station 2 via the base station 1.

Upon the reception of the handover request from the fixed relay station 3, the mobile relay station 2 transmits a handover request ACK representing the permission of the handover of the mobile terminal 4C, to the fixed relay station 3 (OP176).

Upon the reception of the handover request ACK from the mobile relay station 2 via the base station 1, the fixed relay station 3 transmits a handover command for giving an instruction to execute the handover, to the mobile terminal 4C (OP177).

Upon the reception of the handover command, the mobile terminal 4C executes the handover from the fixed relay station 3 to the mobile relay station 2 (OP178). Because the handover target of the mobile terminal 4C is the mobile relay station, the identification number of the mobile relay station 2 is stored for update in the mobile relay station connection history (FIG. 28, OP137). Upon the transmission of a handover complete from the mobile terminal 4C to the mobile relay station 2 as the transfer target (OP179), the handover is completed, and the mobile terminal 4C connects to the mobile relay station 2 to make communication.

In this way, even in the case where the mobile terminal 4C determines the permission or prohibition of the handover, the mobile terminal 4C can make the handover from the fixed relay station 3 to the mobile relay station 2.

Operations and Effects of Second Embodiment

The mobile terminal itself determines the permission or prohibition of the handover, and hence the transmission of a wasteful measurement report can be avoided in the case where the handover is not permitted, so that the network band occupation can be reduced.

[Others]
<Regarding Hardware Components and Software Components>

The hardware components refer to a hardware circuit, and examples thereof include a field-programmable gate array (FPGA), an application-specific integrated circuit (ASIC), a gate array, the combination of logical gates, a signal processing circuit, and an analog circuit.

The software components refer to parts (fragments) that implement the above-mentioned functions in the form of software, and do not refer to a concept that limits languages, development environments, and the like that implement the software. Examples of the software components include a task, a process, a thread, a driver, firmware, a database, a table, a function, a procedure, a subroutine, a predetermined part of a program code, a data structure, a sequence, a variable, and a parameter. These software components are implemented on one or more memories (one or more processors (for example, a CPU (Central Processing Unit) and a DSP (Digital Signal Processor)).

Note that the above-mentioned embodiments do not limit a method of implementing the above-mentioned processing units, and hence the processing units may be each implemented by the hardware components or the software components or by the combination thereof according to a method that can be achieved by a normal technical person who belongs to the technical field of the present invention.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication network system comprising:
a mobile terminal that transmits a switching request for requesting to switch a connection target from a currently connected first wireless communication apparatus to a second wireless communication apparatus mounted on a mobile body; and
a wireless communication apparatus that determines permission or prohibition that the mobile terminal switches the connection target from its own apparatus to the second wireless communication apparatus, based on permission/prohibition setting of switching the connection target from the first wireless communication apparatus to the second wireless communication apparatus in accordance with a type of the first wireless communication apparatus, wherein
the permission/prohibition setting is made such that it is possible to switch the connection target from the first wireless communication apparatus to the second wireless communication apparatus, when the type of the first wireless communication apparatus represents a first fixed apparatus that is installed for a mobile terminal in a boarding/exiting facility for the mobile body,
the permission/prohibition setting is made such that it is impossible to switch the connection target from the first wireless communication apparatus to the second wireless communication apparatus, when the type of the first wireless communication apparatus represents a fixed apparatus other than the first fixed apparatus, and
the permission/prohibition setting is made such that it is impossible to switch the connection target from the first wireless communication apparatus to the second wireless communication apparatus, when the type of the first wireless communication apparatus represents a mobile apparatus mounted on the mobile body.

2. A wireless communication network system comprising:
a mobile terminal that transmits a switching request for requesting to switch a connection target from a currently connected first wireless communication apparatus to a second wireless communication apparatus mounted on a mobile body; and a wireless communication apparatus that determines permission or prohibition that the mobile terminal switches the connection target from its own apparatus to the second wireless communication apparatus, based on permission/prohibition setting of switching the connection target from the first wireless communication apparatus to the second wireless communication apparatus in accordance with a type of the first wireless communication apparatus, wherein the mobile terminal transmits the switching request including a history of connection to the second wireless communication apparatus, the wireless communication apparatus determines whether or not the switching request includes the history of connection to the second wireless communication apparatus before the mobile terminal connects to the first wireless communication apparatus, when it is determined that the connection target switching is impossible based on the permission/prohibition setting, the wireless communication apparatus permits the mobile terminal to switch the connection target from the first wireless communication apparatus to the second wireless communication apparatus, when the switching request includes the history of connection to the second wireless communication apparatus before the mobile terminal connects to the first wireless communication apparatus, and the wireless communication apparatus prohibits the mobile terminal from switching the connection target from the first wireless communication apparatus to the second wireless communication apparatus, when the switching request does not include the history of connection to the second wireless communication apparatus before the mobile terminal connects to the first wireless communication apparatus.

3. A wireless communication apparatus comprising:

a storing unit that holds permission/prohibition setting of switching connection target: from a first wireless communication apparatus to which a mobile terminal is currently connected; to a second wireless communication apparatus mounted on a mobile body, in accordance with a type of the first wireless communication apparatus; and a determining unit that determines, when receiving a switching request from the mobile terminal, permission or prohibition that the mobile terminal switches the connection target from its own apparatus to the second wireless communication apparatus, based on the permission/prohibition setting, wherein the permission/prohibition setting is made such that it is possible to switch the connection target from the first wireless communication apparatus to the second wireless communication apparatus, when the type of the first wireless communication apparatus represents a first fixed apparatus that is installed for a mobile terminal in a boarding/exiting facility for the mobile body, the permission/prohibition setting is made such that it is impossible to switch the connection target from the first wireless communication apparatus to the second wireless communication apparatus, when the type of the first wireless communication apparatus represents a fixed apparatus other than the first fixed apparatus, and the permission/prohibition setting is made such that it is impossible to switch the connection target from the first wireless communication apparatus to the second wireless communication apparatus, when the type of the first wireless communication apparatus represents a mobile apparatus mounted on the mobile body.

4. A wireless communication apparatus comprising:

a storing unit that holds permission/prohibition setting of switching connection target: from a first wireless communication apparatus to which a mobile terminal is currently connected; to a second wireless communication apparatus mounted on a mobile body, in accordance with a type of the first wireless communication apparatus; and a determining unit that determines, when receiving a switching request from the mobile terminal, permission or prohibition that the mobile terminal switches the connection target from its own apparatus to the second wireless communication apparatus, based on the permission/prohibition setting, wherein the determining unit determines whether or not the switching request includes a history of connection to the second wireless communication apparatus before the mobile terminal connects to the first wireless communication apparatus, when it is determined that the connection target switching is impossible based on the permission/prohibition setting, the determining unit permits the mobile terminal to switch the connection target from the first wireless communication apparatus to the second wireless communication apparatus, when the switching request includes the history of connection to the second wireless communication apparatus before the mobile terminal connects to the first wireless communication apparatus, and the determining unit prohibits the mobile terminal from switching the connection target from the first wireless communication apparatus to the second wireless communication apparatus, when the switching request does not include the history of connection to the second wireless communication apparatus before the mobile terminal connects to the first wireless communication apparatus.

5. A wireless communication apparatus, the wireless communication apparatus being a first wireless communication apparatus mounted on a first mobile body, the first wireless communication apparatus comprising:

a determining unit that does not permit a mobile terminal that connects to the first wireless communication apparatus to switch its connection target from the first wireless communication apparatus to a second wireless communication apparatus mounted on a second mobile body, and permits the mobile terminal to switch its connection target from the first wireless communication apparatus to a third wireless communication apparatus that is not mounted on a mobile body; and a storage unit coupled to the determining unit.

6. A mobile terminal comprising:

a storing unit that holds permission/prohibition setting of connection target change from a currently connected first wireless communication apparatus to a second wireless communication apparatus mounted on a mobile body in accordance with a type of the first wireless communication apparatus; and a determining unit that determines permission or prohibition of the connection target change from the first wireless communication apparatus to the second wireless communication apparatus, based on the permission/prohibition setting held in the storing unit.

7. The mobile terminal according to claim 6, wherein
the permission/prohibition setting is made such that it is possible to change the connection target from the first wireless communication apparatus to the second wireless communication apparatus, when the type of the first wireless communication apparatus represents a first fixed apparatus that is installed for a mobile terminal in a boarding/exiting facility for the mobile body,
the permission/prohibition setting is made such that it is impossible to change the connection target from the first wireless communication apparatus to the second wireless communication apparatus, when the type of the first wireless communication apparatus represents a fixed apparatus other than the first fixed apparatus, and
the permission/prohibition setting is made such that it is impossible to change the connection target from the first wireless communication apparatus to the second wireless communication apparatus, when the type of the first wireless communication apparatus represents a mobile apparatus mounted on the mobile body.

8. The mobile terminal according to claim 6, wherein
the storing unit further holds a history of connection to the second wireless communication apparatus,
the determining unit determines whether or not the storing unit holds the history of connection to the second wireless communication apparatus before the mobile terminal connects to the first wireless communication apparatus, when it is determined that the connection target change is impossible based on the permission/prohibition setting,
the determining unit permits the mobile terminal to change its connection target from the first wireless communication apparatus to the second wireless communication apparatus, when the storing unit holds the history of connection to the second wireless communication apparatus before the mobile terminal connects to the first wireless communication apparatus, and
the determining unit prohibits the mobile terminal from changing its connection target from the first wireless communication apparatus to the second wireless communication apparatus, when the storing unit does not hold the history of connection to the second wireless communication apparatus before the mobile terminal connects to the first wireless communication apparatus.

* * * * *